United States Patent
Fan et al.

(10) Patent No.: US 11,886,106 B2
(45) Date of Patent: Jan. 30, 2024

(54) PHOTOGRAPHING MODULE AND ELECTRONIC DEVICE

(71) Applicant: LARGAN PRECISION CO., LTD., Taichung (TW)

(72) Inventors: Chen Wei Fan, Taichung (TW); Ming-Ta Chou, Taichung (TW); Te-Sheng Tseng, Taichung (TW); Chen-Yi Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 46 days.

(21) Appl. No.: 17/832,470

(22) Filed: Jun. 3, 2022

(65) Prior Publication Data
US 2023/0176447 A1   Jun. 8, 2023

Related U.S. Application Data

(60) Provisional application No. 63/285,382, filed on Dec. 2, 2021.

(51) Int. Cl.
*G03B 5/02* (2021.01)
*H04N 23/68* (2023.01)
*H04N 23/55* (2023.01)

(52) U.S. Cl.
CPC ............... *G03B 5/02* (2013.01); *H04N 23/55* (2023.01); *H04N 23/687* (2023.01); *G03B 2205/0069* (2013.01)

(58) Field of Classification Search
USPC ............... 396/55; 348/208.1–208.16, 208.99
See application file for complete search history.

(56) References Cited

U.S. PATENT DOCUMENTS

| | | | |
|---|---|---|---|
| 8,174,583 B2* | 5/2012 | Ko | G02B 27/646 348/208.7 |
| 8,208,032 B2* | 6/2012 | Kurosawa | H04N 23/68 348/208.99 |

(Continued)

FOREIGN PATENT DOCUMENTS

| | | |
|---|---|---|
| CN | 101373936 A1 | 2/2009 |
| CN | 102193268 A1 | 9/2011 |

(Continued)

OTHER PUBLICATIONS

Extended European Search Report issued in corresponding application No. 22194408.5, dated Apr. 18, 2023.

*Primary Examiner* — Clayton E. LaBalle
*Assistant Examiner* — Warren K Fenwick
(74) *Attorney, Agent, or Firm* — Maschoff Brennan

(57) ABSTRACT

A photographing module includes a lens assembly, a reflection element, an image sensor, and lens element, reflection element and image sensor driving modules. An axial voice coil motor of the lens element driving module moves the lens assembly along a lens optical axis. A rotating connection part and a curved recess structure are disposed between a holder and a carrier movable relative to the holder. A lateral voice coil motor of the reflection element driving module drives the carrier carrying the reflection element to rotate around an axis passing through the rotating connection part. A plurality of rollable elements are located between and in contact with the fixed member and the movable plate. A lateral voice coil motor of the image sensor driving module drives the movable plate carrying the image sensor to move based on a dynamic axis orthogonal to the lens optical axis.

27 Claims, 52 Drawing Sheets

(56) References Cited

U.S. PATENT DOCUMENTS

| | | |
|---|---|---|
| 8,279,293 B2 | 10/2012 | Noto |
| 8,711,235 B2 * | 4/2014 | Chan ................. H04N 23/6812 |
| | | 348/208.5 |
| 9,207,462 B2 * | 12/2015 | Shihoh ................. G02B 27/646 |
| 9,285,566 B2 | 3/2016 | Chan et al. |
| 11,336,828 B2 | 5/2022 | Chang et al. |
| 2009/0002500 A1 | 1/2009 | Kawai et al. |
| 2011/0221915 A1 | 9/2011 | Takano et al. |
| 2014/0028862 A1 | 1/2014 | Kawai |
| 2014/0375829 A1 * | 12/2014 | Nishihara ........... H04N 23/687 |
| | | 348/208.7 |
| 2015/0042870 A1 | 2/2015 | Chan et al. |
| 2019/0141248 A1 | 5/2019 | Hubert et al. |
| 2019/0331933 A1 | 10/2019 | Jeong et al. |
| 2019/0361261 A1 | 11/2019 | Lee et al. |
| 2020/0084308 A1 | 3/2020 | Yoon et al. |
| 2020/0137274 A1 | 4/2020 | Lee et al. |
| 2020/0379243 A1 | 12/2020 | Li et al. |
| 2020/0412958 A1 | 12/2020 | Li et al. |
| 2021/0136261 A1 * | 5/2021 | Lee ........................ G03B 30/00 |
| 2021/0165183 A1 | 6/2021 | Kameyama et al. |
| 2021/0258491 A1 | 8/2021 | Park |
| 2021/0329170 A1 | 10/2021 | Osaka |
| 2022/0019052 A1 | 1/2022 | Wu et al. |
| 2022/0082786 A1 | 3/2022 | Chang et al. |
| 2022/0407993 A1 * | 12/2022 | Tsai ....................... H04N 23/55 |

FOREIGN PATENT DOCUMENTS

| | | |
|---|---|---|
| CN | 103389606 A | 11/2013 |
| CN | 108780207 A | 11/2018 |
| CN | 209330246 U | 8/2019 |
| CN | 110262156 A | 9/2019 |
| CN | 111295820 A | 6/2020 |
| CN | 111596435 A | 8/2020 |
| CN | 211741798 U | 10/2020 |
| CN | 212391698 U | 1/2021 |
| CN | 112312000 A | 2/2021 |
| CN | 113542579 A | 10/2021 |
| CN | 113572918 A | 10/2021 |
| EP | 3 779 550 A1 | 2/2021 |
| JP | 2011133828 A | 7/2011 |
| JP | 5788280 B2 | 4/2013 |
| JP | 2014026147 A | 2/2014 |
| JP | 2014123852 A | 7/2014 |
| JP | 2014191283 A | 10/2014 |
| JP | 2015118279 A | 6/2015 |
| TW | I743898 B | 2/2022 |
| WO | 2021/025518 A1 | 2/2021 |
| WO | 2021/108972 A1 | 6/2021 |
| WO | 2021206469 A1 | 10/2021 |

* cited by examiner

PHOTOGRAPHING MODULE AND ELECTRONIC DEVICE

RELATED APPLICATIONS

This application claims priority to U.S. Provisional Application 63/285,382, filed on Dec. 2, 2021, which is incorporated by reference herein in its entirety.

BACKGROUND

Technical Field

The present disclosure relates to a photographing module and an electronic device, more particularly to a photographing module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and compactness. Conventional telephoto optical systems usually have shortcomings of overly long total length, poor image quality or overly large size, which is unable to meet the requirements of the current technology trends. To achieve compactness, the optical systems may be configured to have a folded optical axis so as to reduce the dimension of the optical systems in a specific direction, thereby reducing the total system size. Moreover, the optical systems can be configured with anti-vibration function for achieving high image quality. However, to meet the abovementioned requirements, a driving unit of complex structure is required to drive an optical axis folding element, which results in more complex structure and more weight of the optical systems.

Accordingly, how to improve the optical systems for simplifying the structure of the lens assembly, achieving a compact size and maintaining high image quality so as to meet the requirement of high-end-specification electronic devices is an important topic in this field nowadays.

SUMMARY

According to one aspect of the present disclosure, a photographing module includes a lens assembly, a reflection element, an image sensor, a lens element driving module, a reflection element driving module and an image sensor driving module. The lens assembly includes at least one lens element. The reflection element is located on an object side of the lens assembly, and the reflection element has a reflection surface. The reflection surface is configured to redirect an incident light traveling along an incident optical axis towards the lens assembly. The image sensor is disposed on an image surface of the lens assembly, and the image sensor is configured to receive light coming from the lens assembly. The lens element driving module includes an axial voice coil motor, and the lens element driving module drives the lens assembly to move along a lens optical axis of the lens assembly by the axial voice coil motor. The reflection element driving module includes a carrier, a holder, a rotating connection part, a curved recess structure and a first lateral voice coil motor. The reflection element is disposed on the carrier. The holder and the carrier are disposed corresponding to each other, and the carrier is movable relative to the holder. The rotating connection part and the curved recess structure are located between the holder and the carrier. The rotating connection part is disposed on one of the holder and the carrier, and the curved recess structure is disposed on another one of the holder and the carrier. The rotating connection part is in physical contact with the curved recess structure, and the curved recess structure is rotatable relative to the rotating connection part. The first lateral voice coil motor is configured to drive the carrier to rotate around a first axis, and the first axis passes through the rotating connection part. The image sensor driving module includes a fixed member, a movable plate, a plurality of rollable elements and a second lateral voice coil motor. The image sensor is disposed on the movable plate, and the movable plate has a degree of freedom and is movable relative to the fixed member. The degree of freedom is defined by the first dynamic axis, and the first dynamic axis is orthogonal to the lens optical axis. The rollable elements are located between and in physical contact with the fixed member and the movable plate. The second lateral voice coil motor is configured to drive the movable plate to move so that the image sensor can be moved in directions based on the first dynamic axis.

According to another aspect of the present disclosure, a photographing module includes a lens assembly, a reflection element, an image sensor, a lens element driving module and a reflection element driving module. The lens assembly includes at least one lens element. The reflection element is located on an object side of the lens assembly, and the reflection element has a reflection surface. The reflection surface is configured to redirect an incident light traveling along an incident optical axis towards the lens assembly. The image sensor is disposed on an image surface of the lens assembly, and the image sensor is configured to receive light coming from the lens assembly. The lens element driving module includes an axial voice coil motor, and the lens element driving module drives the lens assembly to move along a lens optical axis of the lens assembly by the axial voice coil motor. The reflection element driving module includes a carrier, a holder, a rotating connection part, a curved recess structure and a lateral voice coil motor. The reflection element is disposed on the carrier. The holder and the carrier are disposed corresponding to each other, and the carrier is movable relative to the holder. The rotating connection part and the curved recess structure are located between the holder and the carrier. The rotating connection part is disposed on one of the holder and the carrier, and the curved recess structure is disposed on another one of the holder and the carrier. The rotating connection part is in physical contact with the curved recess structure, and the curved recess structure is rotatable relative to the rotating connection part. The lateral voice coil motor is configured to drive the carrier to rotate around a first axis and rotate around a second axis. The first axis is orthogonal to the incident optical axis, the first axis is orthogonal to the lens optical axis, the second axis is parallel to the incident optical axis, and the first axis and the second axis pass through the rotating connection part. In addition, when a curvature radius of the curved recess structure is Rc, and a curvature radius of the rotating connection part is Rb, the following condition is satisfied: 0.7≤Rb/Rc≤1.

According to another aspect of the present disclosure, a photographing module includes a lens assembly, a reflection element, an image sensor, a lens element driving module and an image sensor driving module. The lens assembly includes at least one lens element. The reflection element is located on an object side of the lens assembly, and the reflection element has a reflection surface. The reflection surface is configured to redirect an incident light traveling along an incident optical axis towards the lens assembly. The image sensor is disposed on an image surface of the lens assembly, and the image sensor is configured to receive light coming from the lens assembly. The lens element driving module includes an axial voice coil motor, and the lens element driving module drives the lens assembly to move along a lens optical axis of the lens assembly by the axial voice coil motor. The axial voice coil motor includes an axial motor coil and an axial motor magnet, each of the axial motor coil and the axial motor magnet has an axial motor corresponsive surface, and the two axial motor corresponsive surfaces face each other. The image sensor driving module includes a fixed member, a movable plate, a plurality of rollable elements and a lateral voice coil motor. The image sensor is disposed on the movable plate, and movable plate has a degree of freedom and is movable relative to the fixed member. The degree of freedom is defined by a first dynamic axis, and the first dynamic axis is orthogonal to the lens optical axis. The rollable elements are located between and in physical contact with the fixed member and the movable plate. The lateral voice coil motor is configured to drive the movable plate to move so that the image sensor can be moved in directions based on the first dynamic axis. The lateral voice coil motor includes a lateral motor coil and a lateral motor magnet, each of the lateral motor coil and the lateral motor magnet has a lateral motor corresponsive surface, and the two lateral motor corresponsive surfaces face each other. In addition, the axial motor corresponsive surface and the lateral motor corresponsive surface are parallel to the incident optical axis.

According to another aspect of the present disclosure, an electronic device includes one of the aforementioned photographing modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
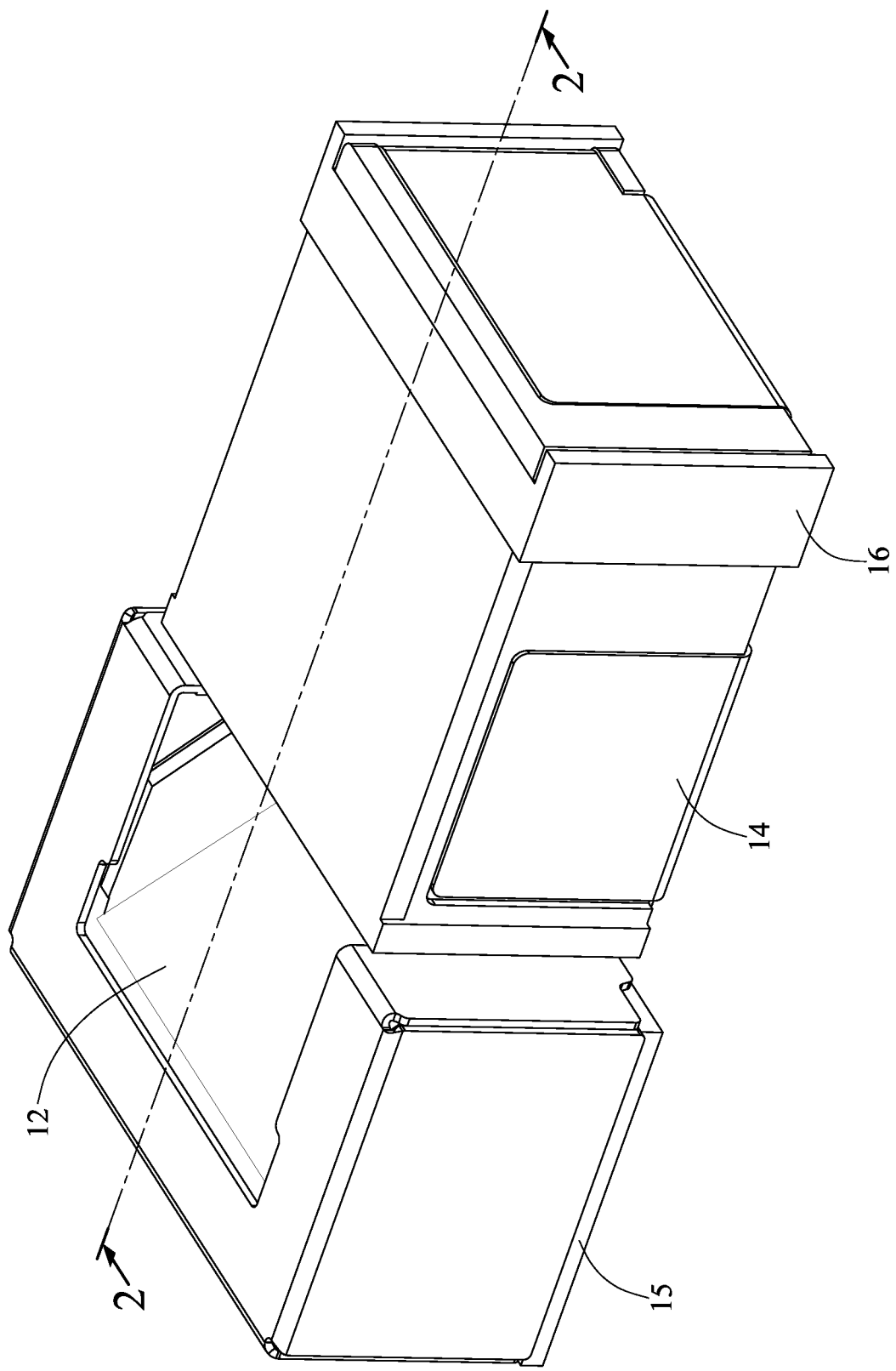
FIG. 1 is a perspective view of a photographing module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a photographing module. The photographing module includes a lens assembly, a reflection element, an image sensor and a lens element driving module. The lens assembly includes at least one lens element. The reflection element is located on an object side of the lens assembly, and the reflection element has a reflection surface configured to redirect an incident light traveling along an incident optical axis towards the lens assembly. The reflection element is, for example, a reflection mirror having a reflection surface or a prism having a reflection surface, but the present disclosure is not limited thereto. Light traveling along the incident optical axis reaches the reflection surface and is reflected by the reflection surface, and the light reflected by the reflection surface changes direction and travels into the lens assembly and passes through the at least one lens element. The image sensor is disposed on an image surface of the lens assembly, and the image sensor is configured to receive light coming from the lens assembly. In some examples, the reflection element may have at least two reflection surfaces, or the photographing module may further include another reflection element located on the object side or an image side of the lens assembly, so that light changes directions at least twice in the photographing module so as to be applicable to various optical systems of different requirements.

The lens element driving module includes an axial voice coil motor, and the lens element driving module drives the lens assembly to move along a lens optical axis of the lens assembly by the axial voice coil motor. The lens element driving module may further include a fixed base, a lens element holding member and a plurality of rollable connection members. The lens assembly is disposed on the lens element holding member, and the lens element holding member is movable relative to the fixed base. The rollable connection members are located between and in physical contact with the fixed base and the lens element holding member. Therefore, it is favorable for improving the module reliability.

According to the present disclosure, the photographing module may further include a reflection element driving module. The reflection element driving module includes a carrier, a holder, a rotating connection part, a curved recess structure and a first lateral voice coil motor. The reflection element is disposed on the carrier. The holder and the carrier are disposed corresponding to each other, and the carrier is movable relative to the holder. The rotating connection part and the curved recess structure are located between the holder and the carrier, the rotating connection part is disposed on one of the holder and the carrier, and the curved recess structure is disposed on the other of the holder and the carrier. The rotating connection part is in physical contact with the curved recess structure, and the curved recess structure is rotatable relative to the rotating connection part. Therefore, the rotating connection part is favorable for increasing the rotation stability of the carrier. In some examples, the rotating connection part and one of the carrier and the holder can be one-piece formed so as to simplify the components of the module.

When a curvature radius of the curved recess structure is Rc, and a curvature radius of the rotating connection part is Rb, the following condition can be satisfied: $0.7 \leq Rb/Rc \leq 1$. Therefore, the curved recess structure and the rotating connection part having close curvature radius values can fit each other much better so as to increase rotation stability and rotation accuracy. Moreover, the following condition can also be satisfied: $0.85 \leq Rb/Rc \leq 1$. Please refer to FIG. 11, which shows a schematic view of Rc and Rb according to the 1st embodiment of the present disclosure.

The first lateral voice coil motor is configured to drive the carrier to rotate around a first axis, and the first axis passes through the rotating connection part. The first axis can be orthogonal to the incident optical axis, and the first axis can be orthogonal to the lens optical axis. Therefore, the height of the photographing module is reduced by using the carrier to bring the reflection element to rotate so as to stabilize the image.

The reflection element driving module may further include an elastic element. The elastic element is connected to the holder and the carrier, and the elastic element exerts a preload force on the carrier in a direction towards the holder. Therefore, the carrier can remain stable when the carrier is not driven.

According to the present disclosure, the photographing module may further include an image sensor driving module. The image sensor driving module includes a fixed member, a movable plate, a plurality of rollable elements and a second lateral voice coil motor. The image sensor is disposed on the movable plate, and the movable plate has a degree of freedom and is movable relative to the fixed member. The degree of freedom is defined by a first dynamic axis, and the first dynamic axis is orthogonal to the lens optical axis. In some examples, the degree of freedom enables linear motion of the movable plate along the first dynamic axis, and the first dynamic axis can be orthogonal to the incident optical axis. Therefore, it is favorable for reducing the thickness of the photographing module. Please refer to FIG. 3 and FIG. 13, which show a moving direction of the movable plate 162 according to the 1st embodiment of the present disclosure, where the degree of freedom of the movable plate 162 is linear motion along the first dynamic axis MAL1, and the first dynamic axis MAL1 is orthogonal to the incident optical axis IOA. In some examples, the degree of freedom enables rotation of the movable plate around the first dynamic axis, and the first dynamic axis can be parallel to the incident optical axis. Therefore, it is favorable for reducing the thickness of the photographing module. Please refer to FIG. 22 and FIG. 31, which show a moving direction of the movable plate 162b according to the 2nd embodiment of the present disclosure, where the degree of freedom may enable rotation of the movable plate 162b around the first dynamic axis MAL1, and the first dynamic axis MAL1 is parallel to the incident optical axis IOA. In some examples, the movable plate may further have another degree of freedom, the another degree of freedom is defined by a second dynamic axis, and the first dynamic axis, the second dynamic axis and the lens optical axis are orthogonal to one another. In addition, the another degree of freedom may be linear motion along the second dynamic axis or may be rotation around the second dynamic axis.

The rollable elements are located between and in physical contact with the fixed member and the movable plate. Therefore, it is favorable for the image sensor driving module to have better reliability.

The second lateral voice coil motor is configured to drive the movable plate to move so that the image sensor can be moved in directions based on the first dynamic axis. In addition, the axial voice coil motor of the lens element driving module may include an axial motor coil and an axial motor magnet, each of the axial motor coil and the axial motor magnet has an axial motor corresponsive surface, and the two axial motor corresponsive surfaces face each other. Furthermore, the second lateral voice coil motor may include a second lateral motor coil and a second lateral motor magnet, each of the second lateral motor coil and the second lateral motor magnet has a second lateral motor corresponsive surface, and the two second lateral motor corresponsive surfaces face each other. In some examples, the axial motor corresponsive surface and the second lateral motor corresponsive surface are parallel to the incident optical axis. Therefore, it is favorable for reducing the height of the lens element driving module and the height of the image sensor driving module, so that the photographing module can be in a compact size.

Furthermore, the first lateral voice coil motor may include a first lateral motor coil and a first lateral motor magnet, each of the first lateral motor coil and the first lateral motor magnet has a first lateral motor corresponsive surface, and the two first lateral motor corresponsive surfaces face each other. In some examples, the axial motor corresponsive surfaces and the first lateral motor corresponsive surfaces are parallel to the incident optical axis. Therefore, it is favorable for reducing the height of the lens element driving module and the height of the reflection element driving module, so that the photographing module can be in a compact size.

The axial motor magnet of the axial voice coil motor can be disposed on the lens element holding member. In some examples, the axial voice coil motor may further include a ferromagnetic element disposed corresponding to the axial motor magnet, such that an attractive force generated between the ferromagnetic element and the axial motor magnet can exert a pre-pressure on the lens element holding member so as to increase driving stability.

The image sensor driving module may further include a flexible printed circuit board connected to the movable plate and the fixed member, and the flexible printed circuit board generates a force acting on the movable plate after the movable plate is driven to move. Therefore, the force generated by the flexible printed circuit board is favorable for moving the movable plate back to its original position without using additional components, thereby reducing the number of components of the module. In some examples, the flexible printed circuit board may include an elastic adjustment structure, the elastic adjustment structure may be a plurality of through holes or additional elastic member, and the elastic modulus of the flexible printed circuit board can be adjusted according to conditions, such as the quantity and the shape of the elastic adjustment structure.

In an example where the photographing module includes both of the reflection element driving module and the image sensor driving module, two-axis image stabilization can be provided by the reflection element driving module and the image sensor driving module. Therefore, the reflection element driving module and the image sensor driving module each provides one-axis image stabilization, so that the thickness of the photographing module can be reduced, and the control difficulty can be reduced.

In an example where the photographing module includes the reflection element driving module but not include an image sensor driving module, two-axis image stabilization can be provided by the reflection element driving module, so that the thickness of the photographing module can be reduced. For example, the first lateral voice coil motor of the reflection element driving module can be configured to drive the carrier to independently rotate around the first axis and rotate around the second axis, where the first axis is orthogonal to the incident optical axis, the first axis is orthogonal to the lens optical axis, the second axis is parallel to the incident optical axis, and the first axis and the second axis pass through the rotating connection part.

In an example where the photographing module includes the image sensor driving module but not include a reflection element driving module, an axial image stabilization can be provided by the image sensor driving module, so that the thickness of the photographing module can be reduced.

According to the present disclosure, in the photographing module, each of the driving modules (i.e., the lens element driving module, the reflection element driving module and the image sensor driving module) may be provided with a position sensing element. The position sensing element measures displacements by detecting a change of magnetic force, and it is favorable for driving controls of the driving modules.

The present disclosure provides an electronic device including the aforementioned photographing module. Therefore, the electronic device provided with the photographing module can be in a compact size.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
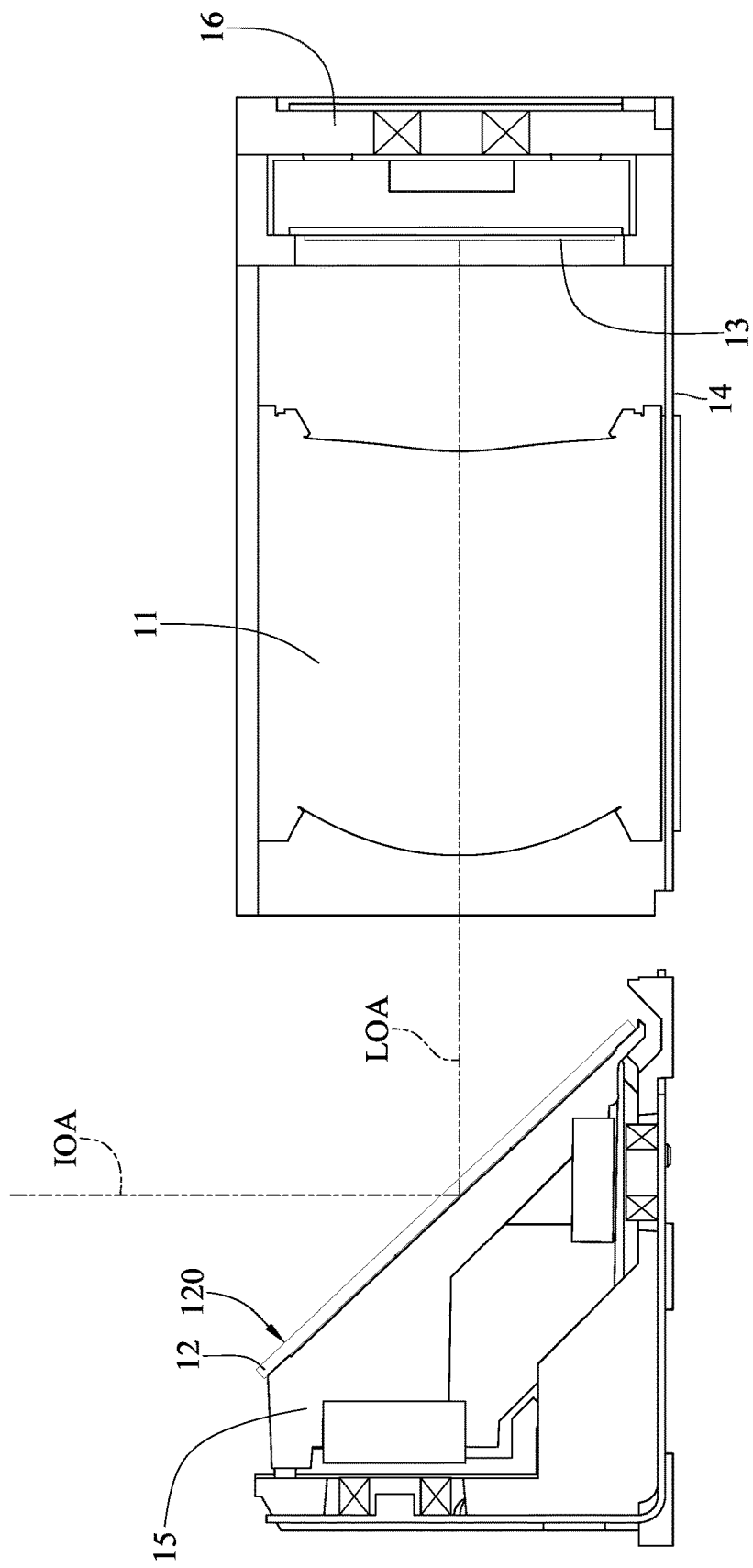
FIG. 2 is a cross-sectional view of the photographing module along line 2-2 in FIG. 1.
Figure 3:
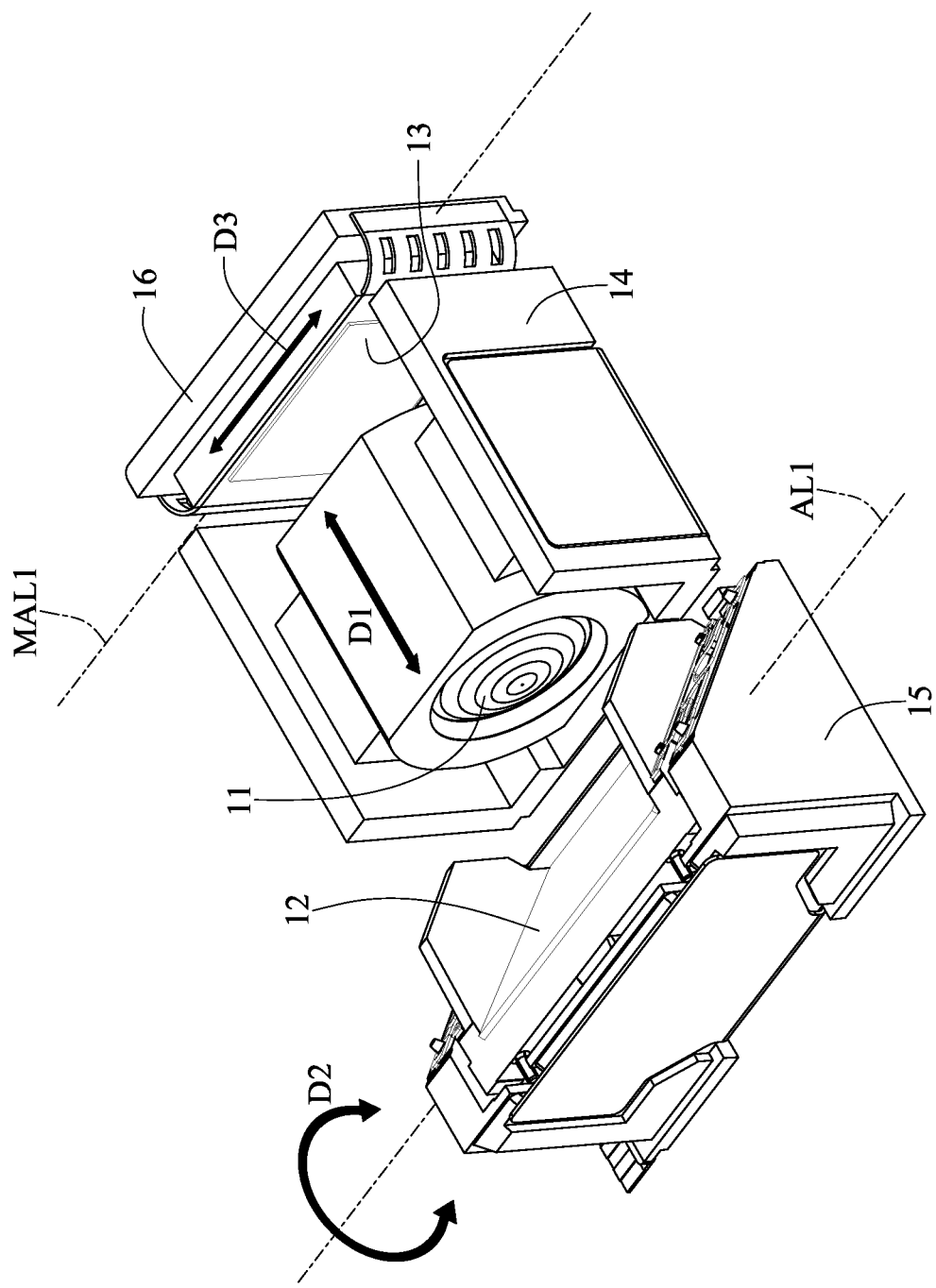
FIG. 3 is a schematic view of driving directions of driving modules of the photographing module in FIG. 1.
Figure 4:
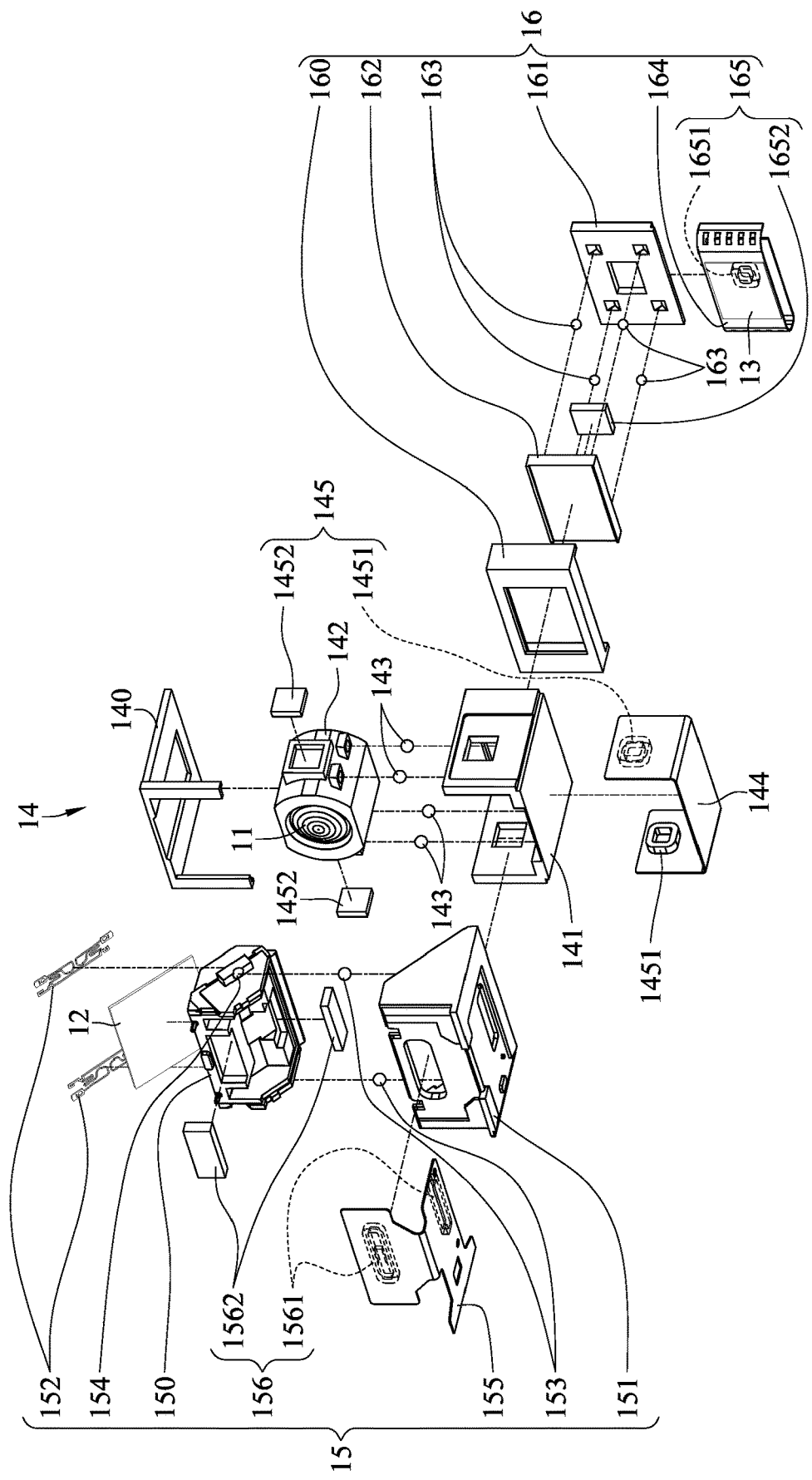
FIG. 4 is an exploded view of the photographing module in FIG. 1.
Figure 5:
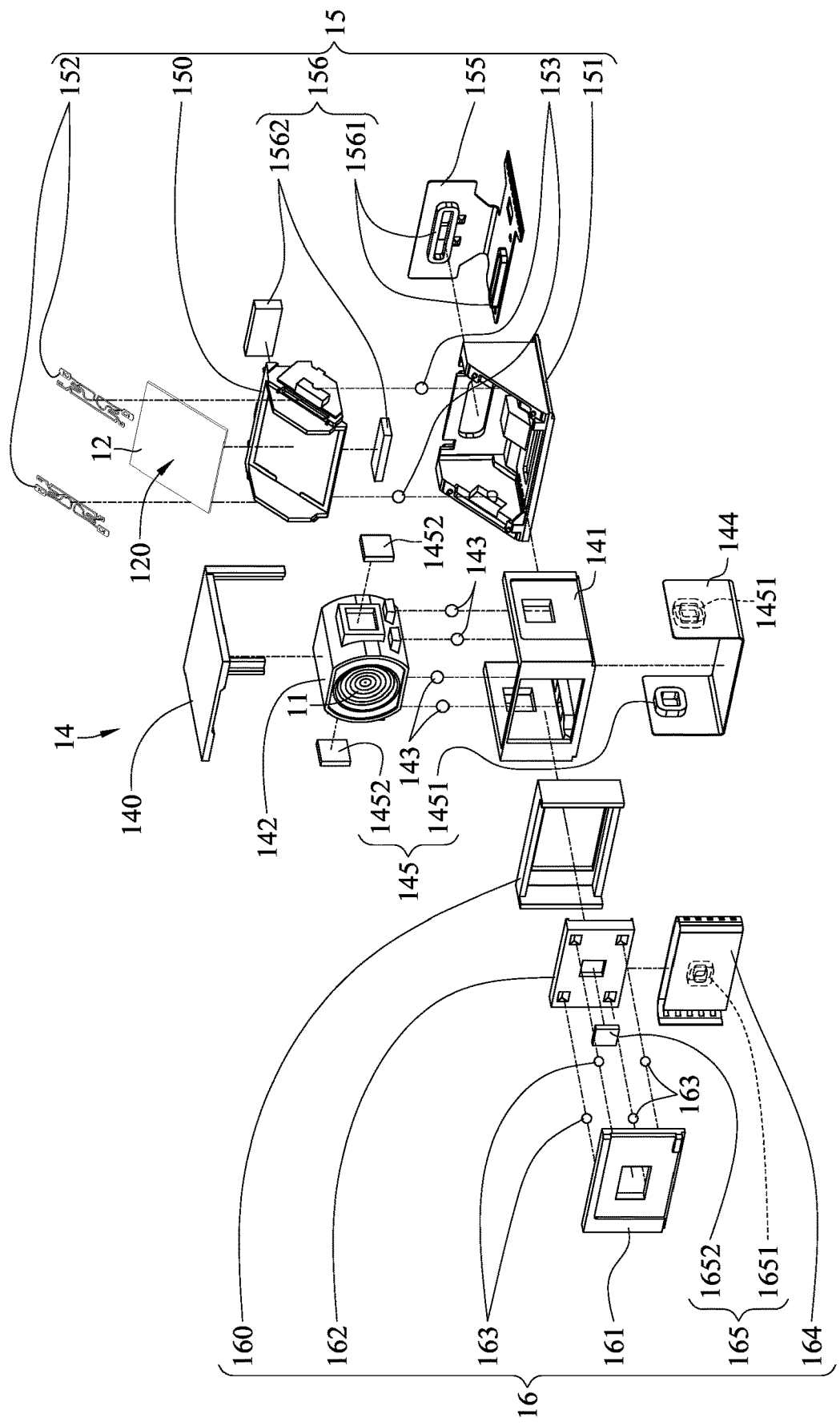
FIG. 5 is another exploded view of the photographing module in FIG. 1.
Figure 6:
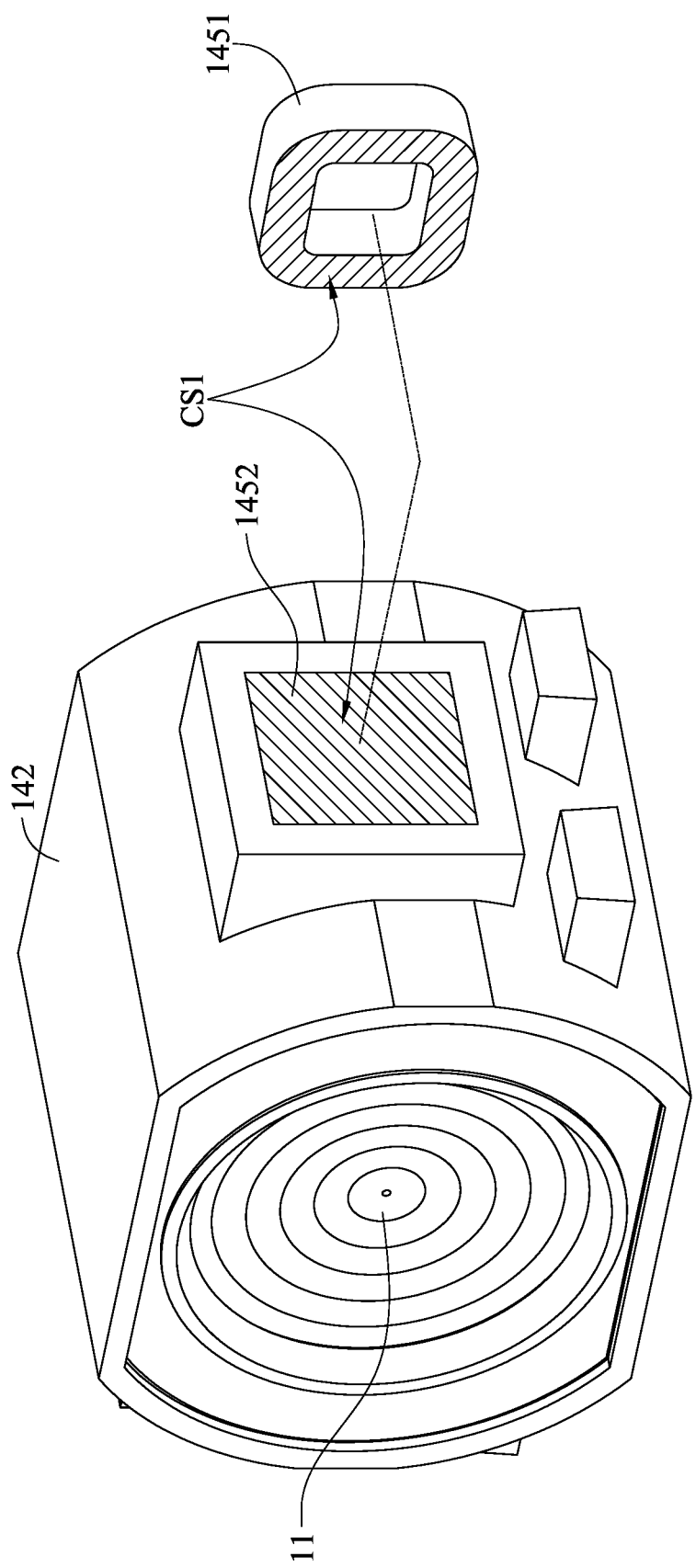
FIG. 6 is a schematic view of the arrangement of some components of a lens assembly and a lens element driving module in FIG. 1.
Figure 7:
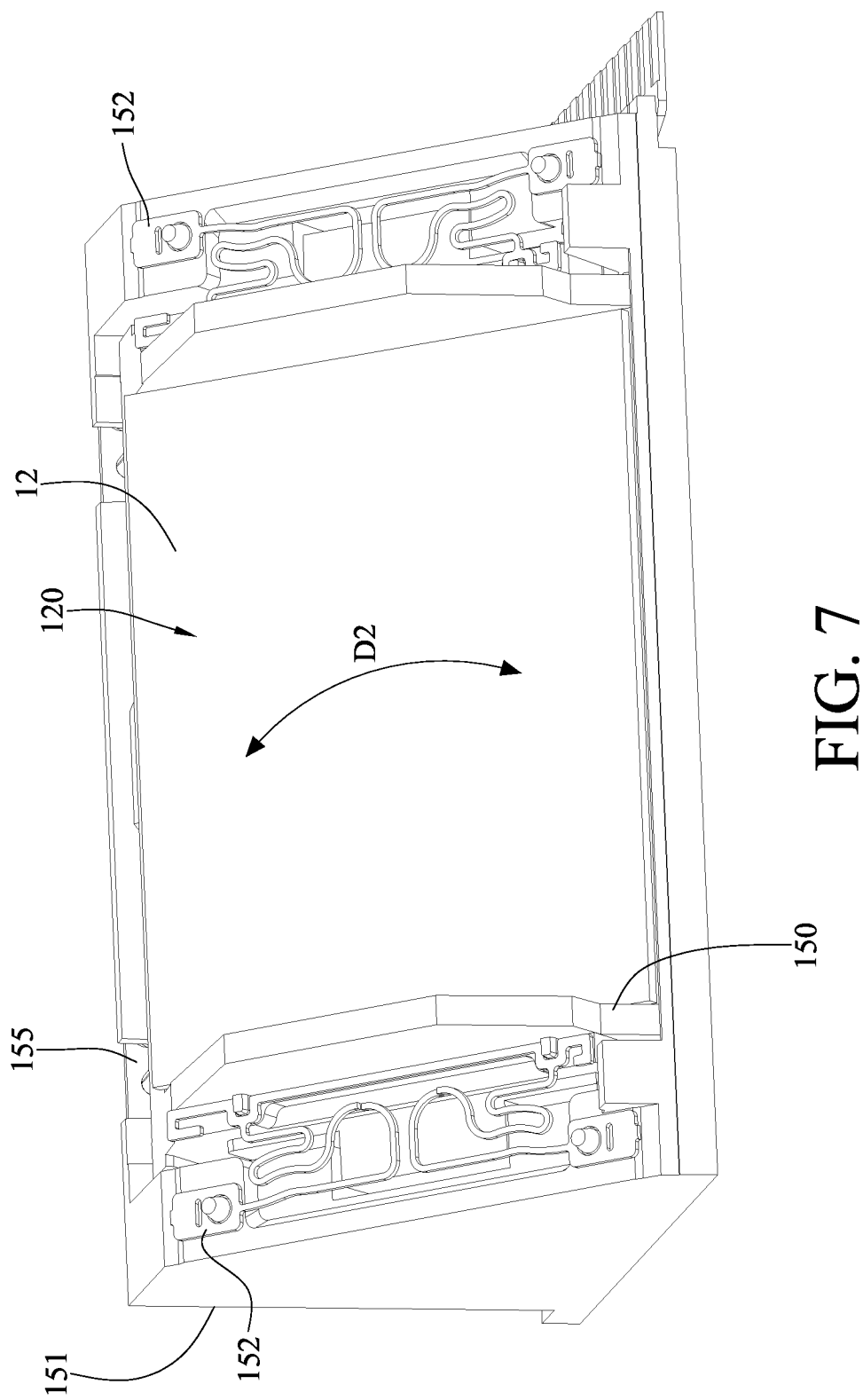
FIG. 7 is a perspective view of a reflection element and a reflection element driving module in FIG. 1.
Figure 8:
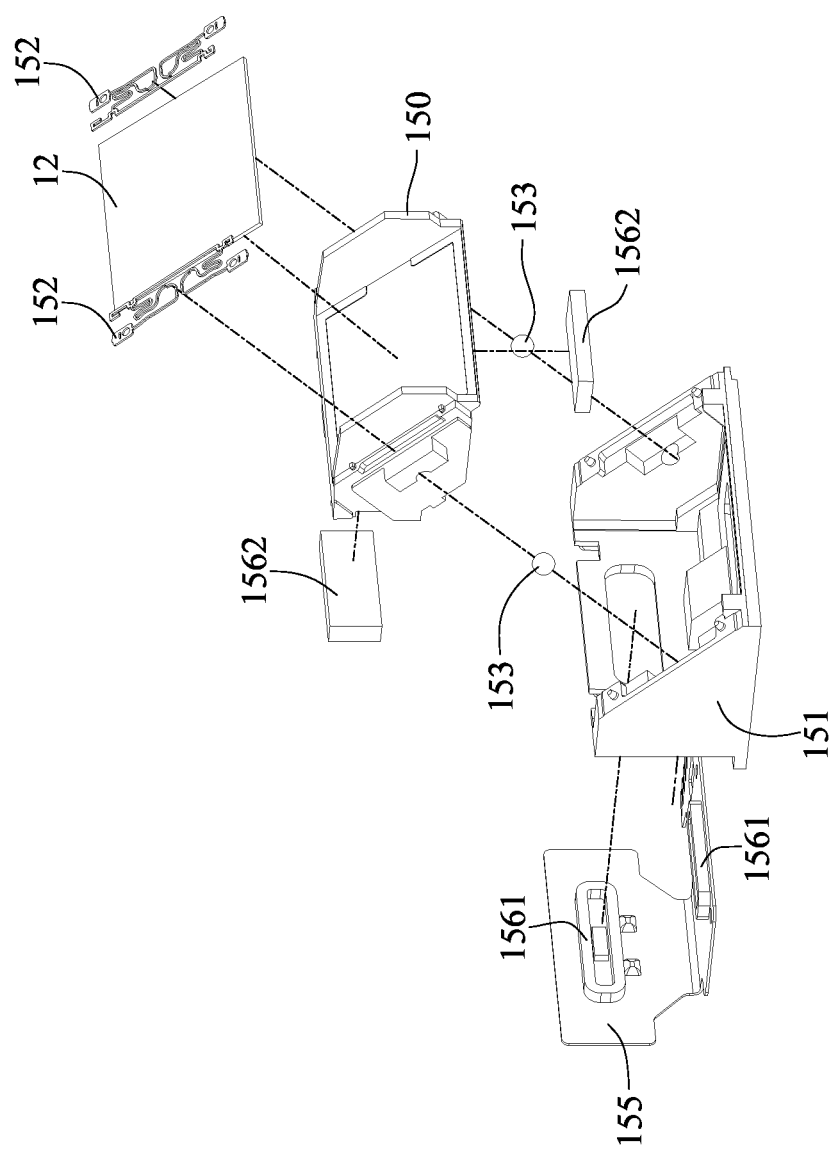
FIG. 8 is an exploded view of the reflection element and the reflection element driving module in FIG. 1.
Figure 9:
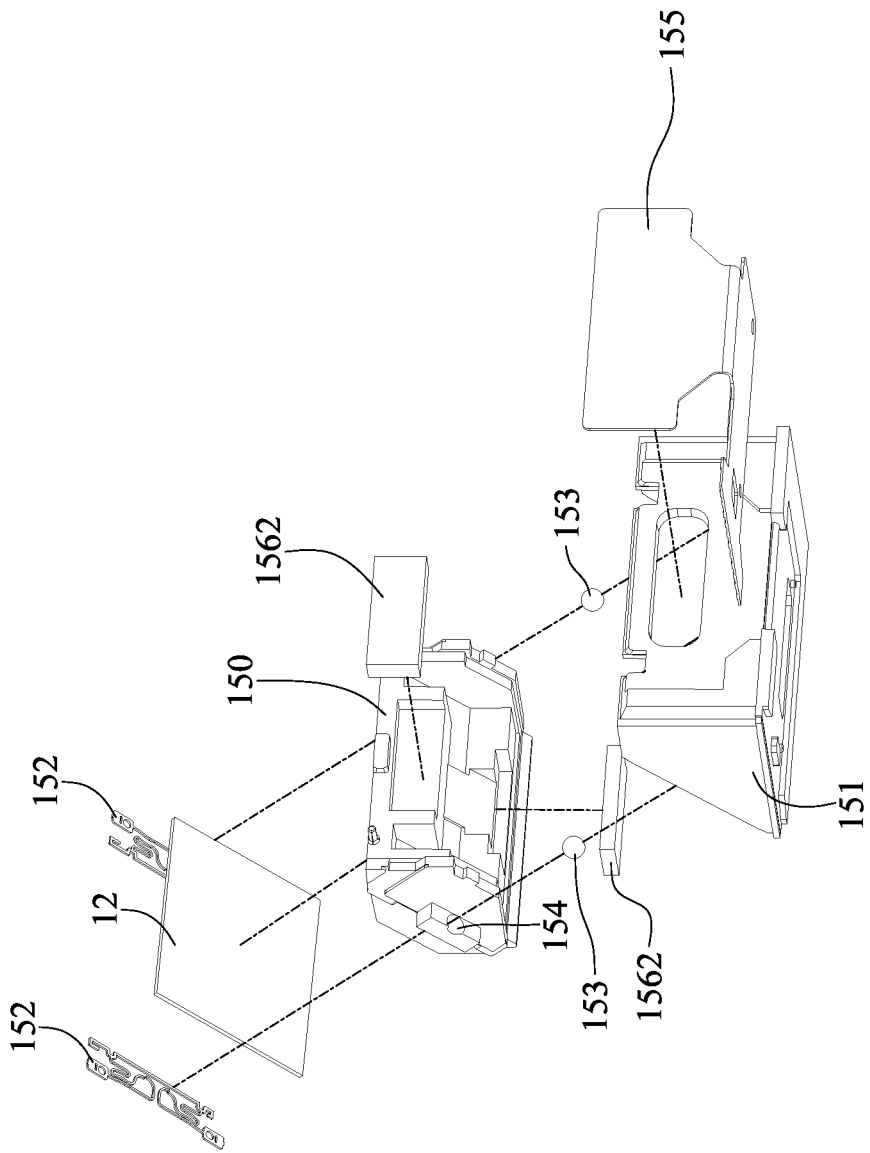
FIG. 9 is another exploded view of the reflection element and the reflection element driving module in FIG. 1.
Figure 10:
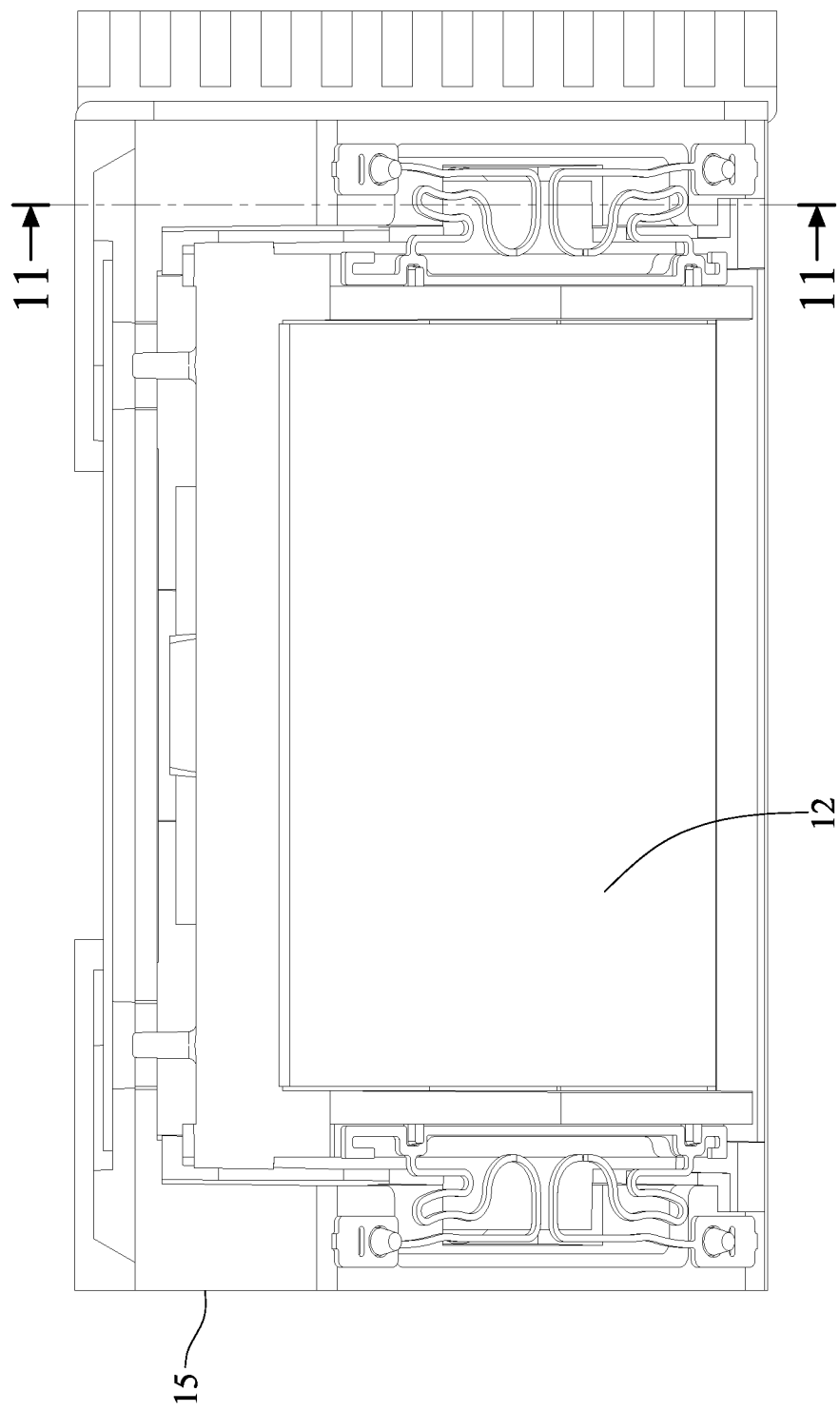
FIG. 10 is a top view of the reflection element and the reflection element driving module in FIG. 1.
Figure 11:
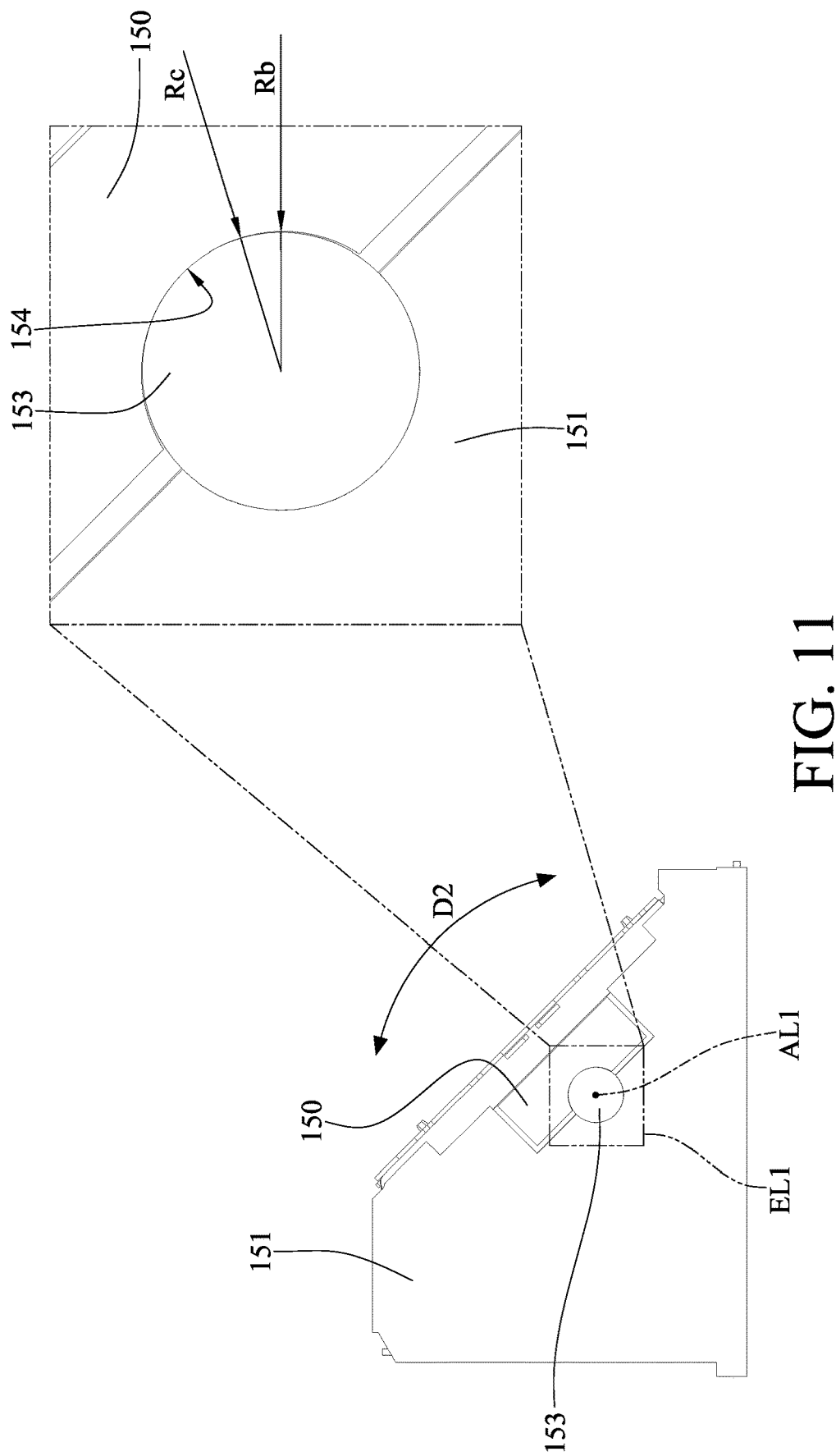
FIG. 11 is a cross-sectional view of the reflection element and the reflection element driving module along line 11-11 in FIG. 10 and an enlarged view of region EL1.
Figure 12:
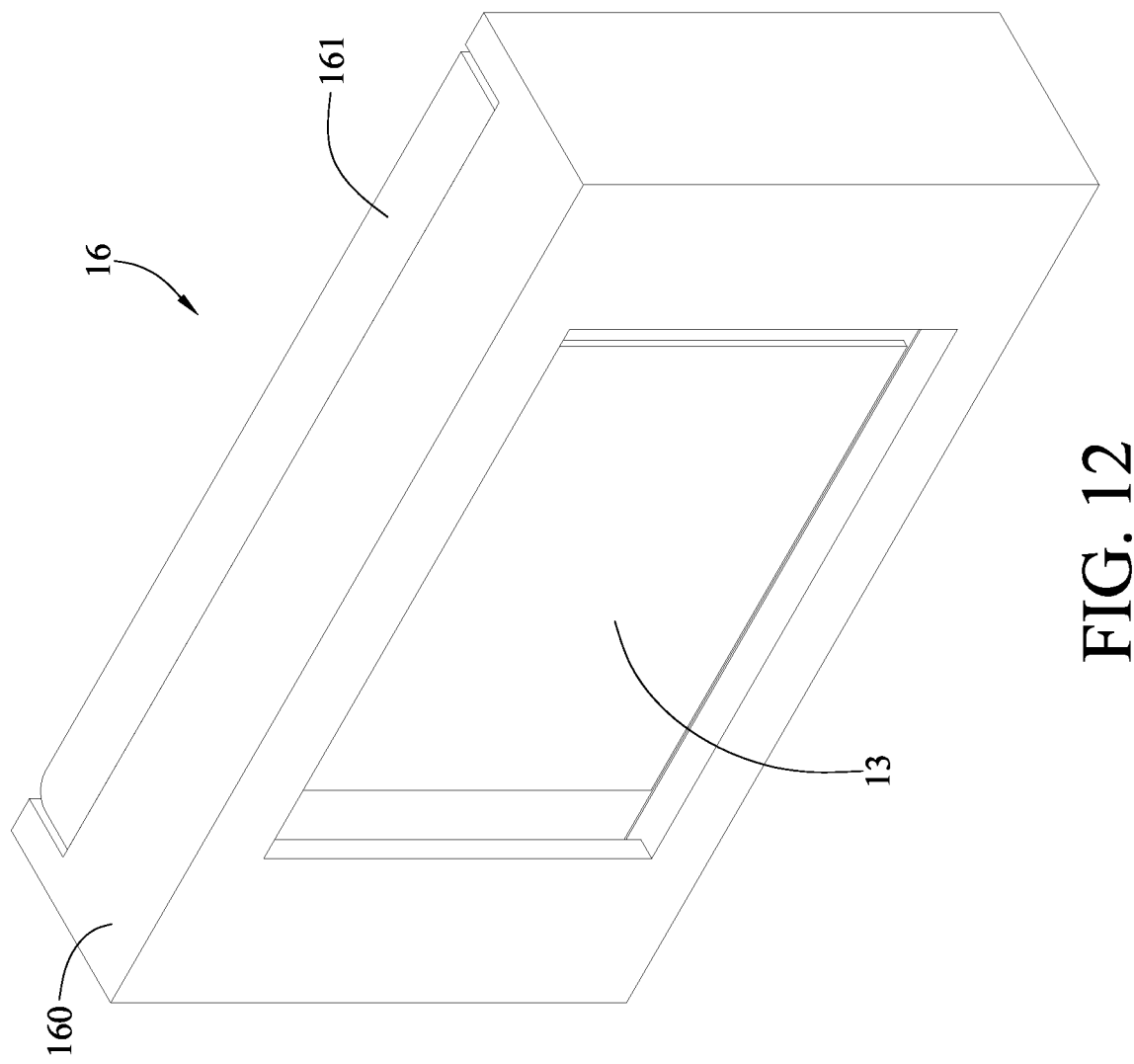
FIG. 12 is a perspective view of an image sensor and an image sensor driving module in FIG. 1.
Figure 13:
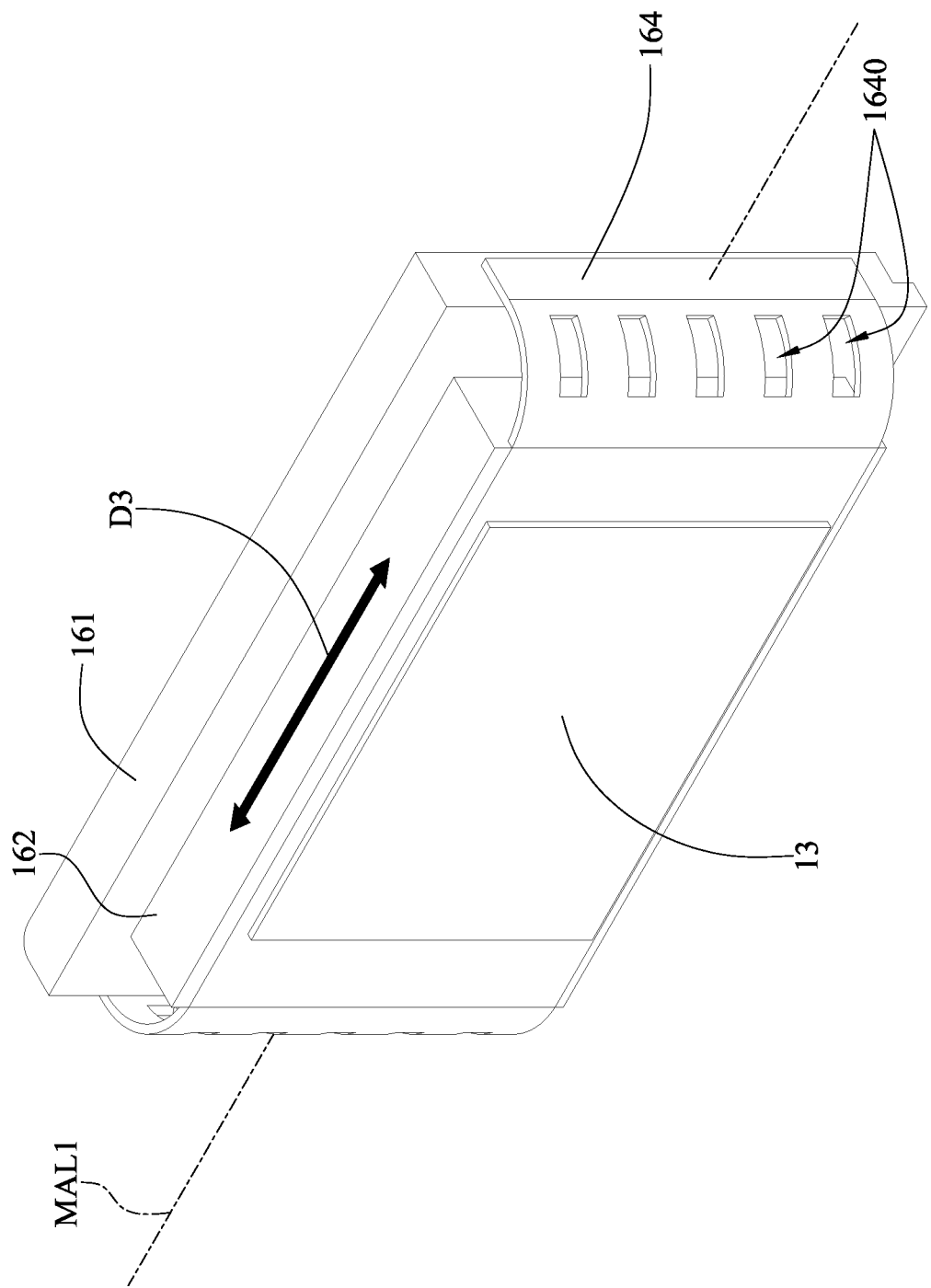
FIG. 13 is a perspective view of the image sensor and the image sensor driving module in FIG. 1 omitting a cover member thereof.
Figure 14:
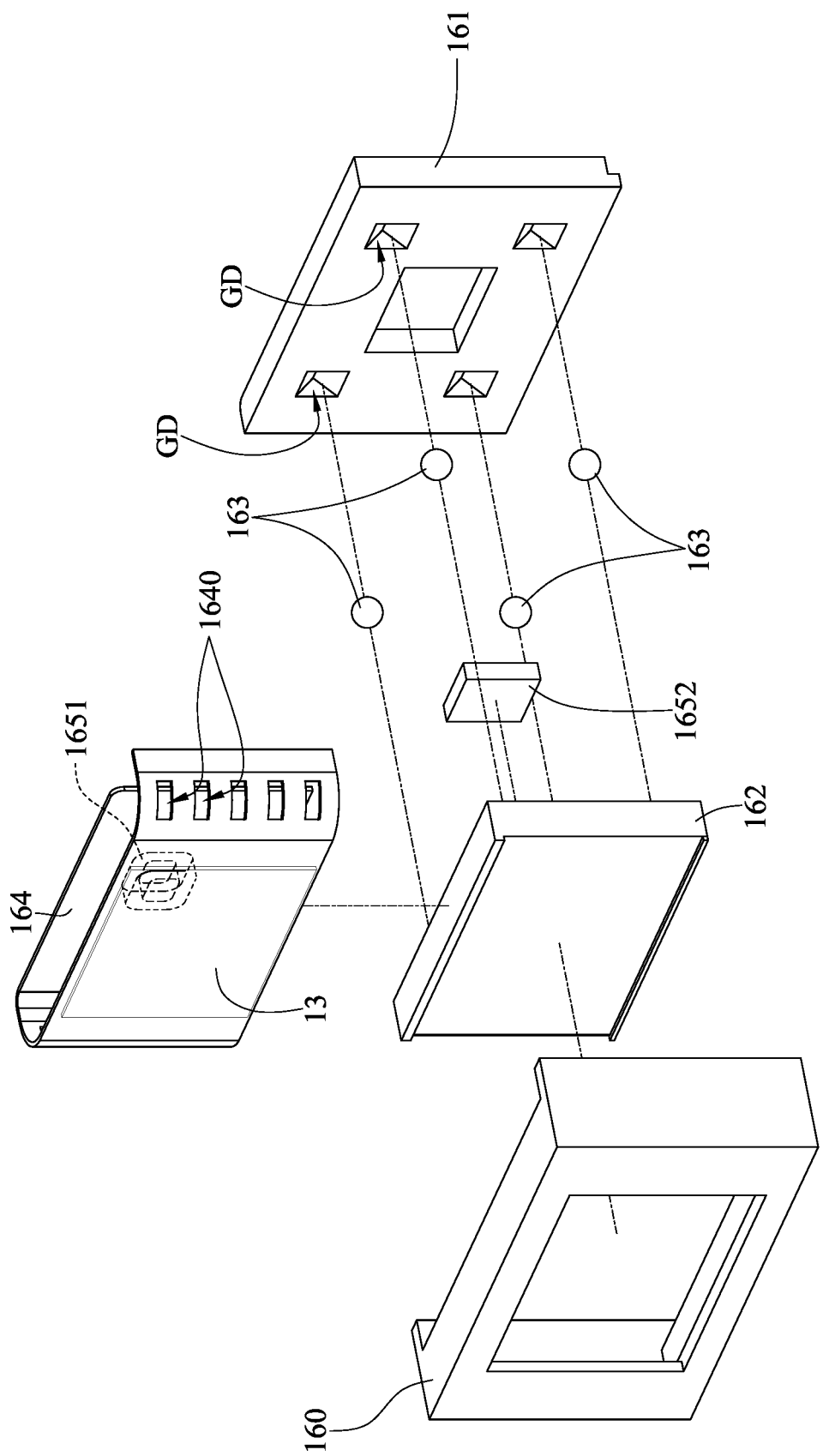
FIG. 14 is an exploded view of the image sensor and the image sensor driving module in FIG. 12.
Figure 15:
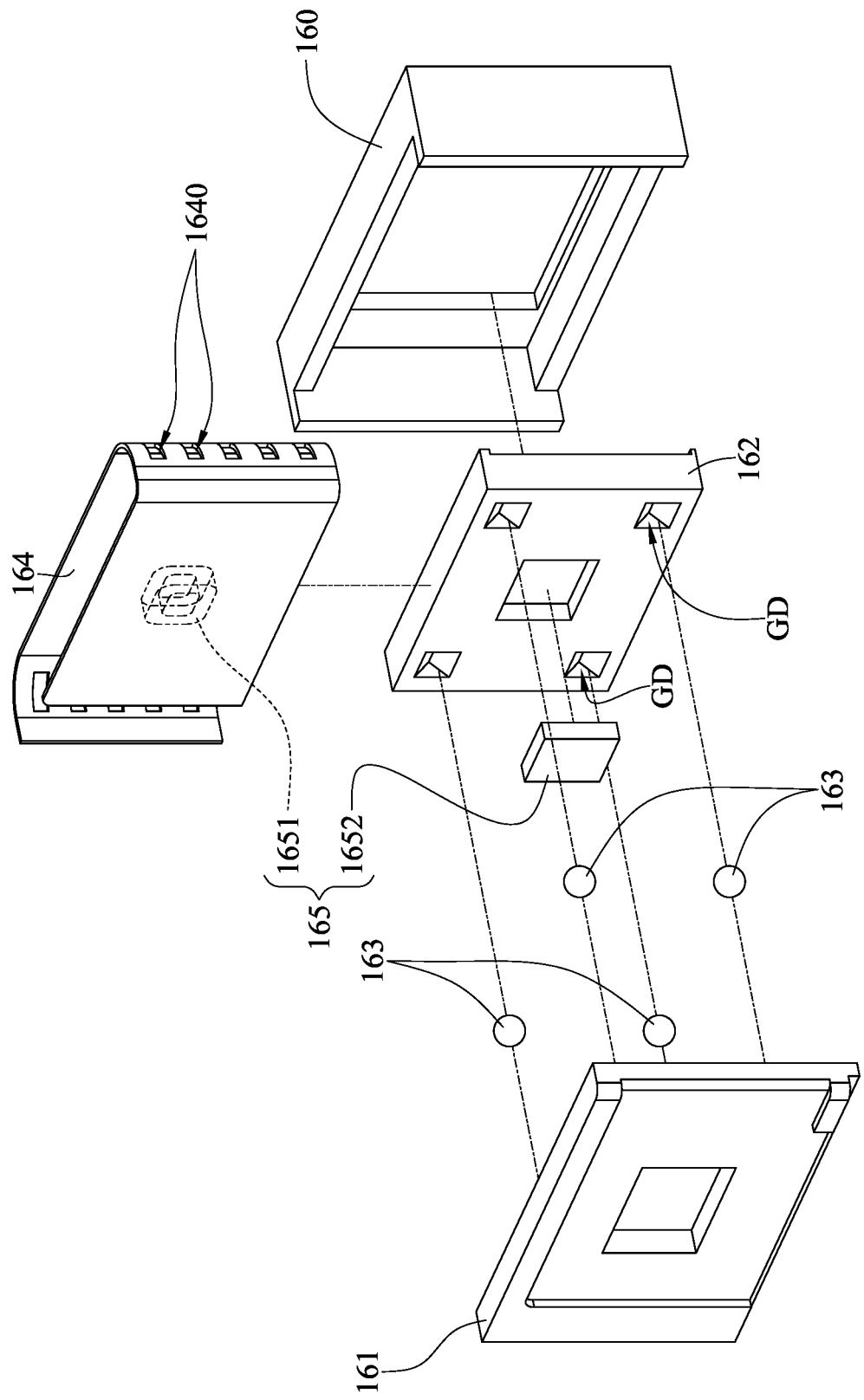
FIG. 15 is another exploded view of the image sensor and the image sensor driving module in FIG. 12.
Figure 16:
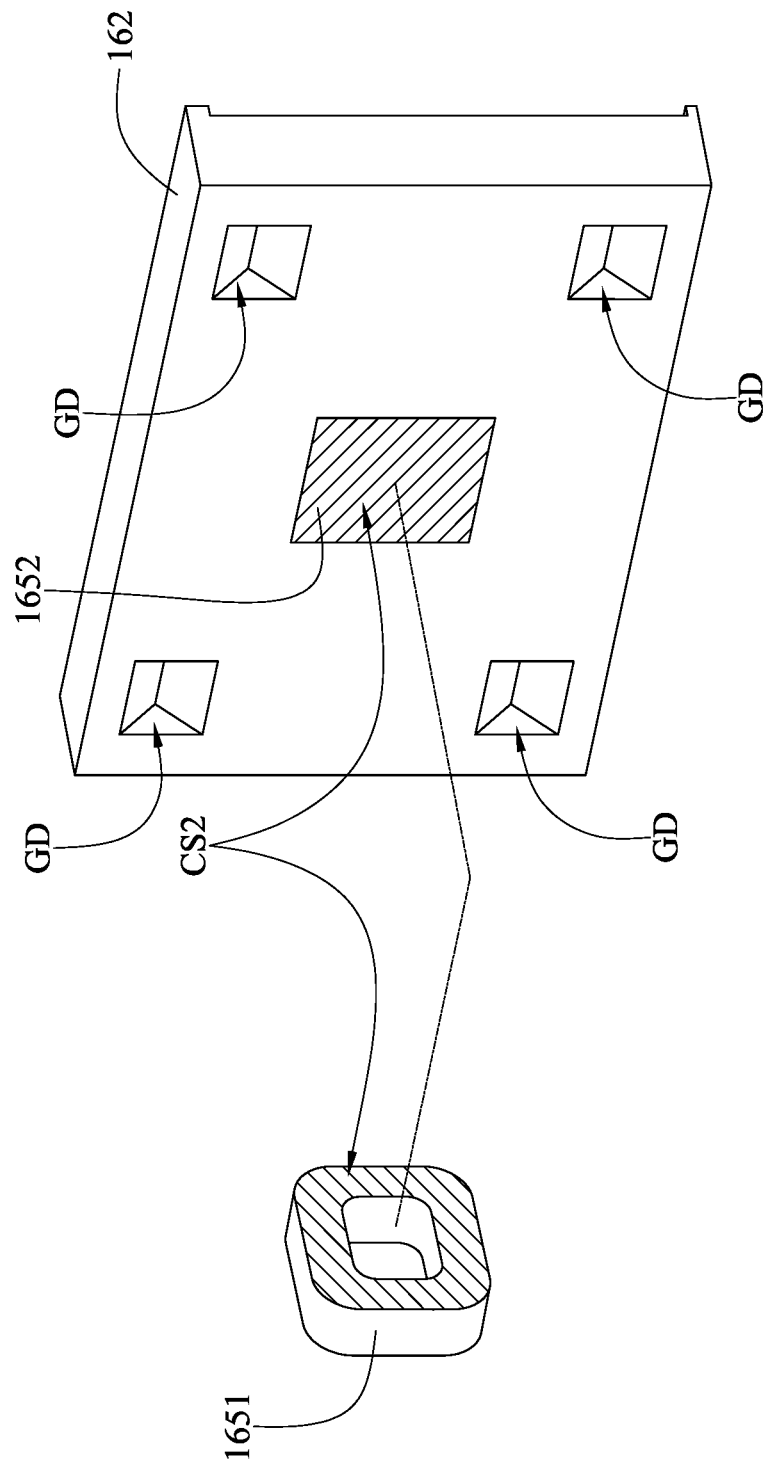
FIG. 16 is a schematic view of the arrangement of a second lateral motor coil and a second lateral motor magnet of a second lateral voice coil motor and a movable plate in FIG. 1.

FIG. 1 is a perspective view of a photographing module according to the 1st embodiment of the present disclosure, FIG. 2 is a cross-sectional view of the photographing module along line 2-2 in FIG. 1, FIG. 3 is a schematic view of driving directions of driving modules of the photographing module in FIG. 1, FIG. 4 is an exploded view of the photographing module in FIG. 1, FIG. 5 is another exploded view of the photographing module in FIG. 1, FIG. 6 is a schematic view of the arrangement of some components of a lens assembly and a lens element driving module in FIG. 1, FIG. 7 is a perspective view of a reflection element and a reflection element driving module in FIG. 1, FIG. 8 is an exploded view of the reflection element and the reflection element driving module in FIG. 1, FIG. 9 is another exploded view of the reflection element and the reflection element driving module in FIG. 1, FIG. 10 is a top view of the reflection element and the reflection element driving module in FIG. 1, FIG. 11 is a cross-sectional view of the reflection element and the reflection element driving module along line 11-11 in FIG. 10 and an enlarged view of region EL1, FIG. 12 is a perspective view of an image sensor and an image sensor driving module in FIG. 1, FIG. 13 is a perspective view of the image sensor and the image sensor driving module in FIG. 1 omitting a cover member thereof, FIG. 14 is an exploded view of the image sensor and the image sensor driving module in FIG. 12, FIG. 15 is another exploded view of the image sensor and the image sensor driving module in FIG. 12, and FIG. 16 is a schematic view of the arrangement of a second lateral motor coil and a second lateral motor magnet of a second lateral voice coil motor and a movable plate in FIG. 1.

In this embodiment, a photographing module 1 includes a lens assembly 11, a reflection element 12, an image sensor 13, a lens element driving module 14, a reflection element driving module 15 and an image sensor driving module 16.

The lens assembly 11 includes at least one lens element. The reflection element 12 is a reflection mirror and located on an object side of the lens assembly 11, and the reflection element 12 has a reflection surface 120 configured to redirect an incident light traveling along an incident optical axis IOA towards the lens assembly 11. The image sensor 13 is disposed on an image surface of the lens assembly 11, and the image sensor 13 is configured to receive light coming from the lens assembly 11. As shown in FIG. 2, light traveling along the incident optical axis IOA hits the reflection surface 120 and is reflected by the reflection surface 120, and the light reflected by the reflection surface 120 changes direction and travels into the lens assembly 11 and passes through the at least one lens element to thereby reach the image sensor 13.

The lens element driving module 14 includes an upper cover 140, a fixed base 141, a lens element holding member 142, a plurality of rollable connection members 143, a flexible printed circuit board 144 and an axial voice coil motor 145.

The upper cover 140 is disposed on the fixed base 141 and together form an accommodation space. The lens element holding member 142 is disposed in the accommodation space, and the lens assembly 11 is disposed on the lens element holding member 142. The rollable connection members 143 are located between and in physical contact with the fixed base 141 and the lens element holding member 142, so that the lens element holding member 142 is movable relative to the fixed base 141. In this embodiment, the rollable connection members 143 are, for example, balls.

The flexible printed circuit board 144 is attached to the fixed base 141.

The axial voice coil motor 145 includes two axial motor coils 1451 and two axial motor magnets 1452. The axial motor coils 1451 are disposed on the flexible printed circuit board 144, and the axial motor magnets 1452 are disposed on the lens element holding member 142. As shown in FIG. 6, each of the axial motor coil 1451 and the axial motor magnet 1452 corresponding to each other has an axial motor corresponsive surface CS1, and the two axial motor corresponsive surfaces CS1 face each other. The lens element driving module 14 is configured to drive the lens assembly 11 to move in a direction D1 parallel to a lens optical axis LOA of the lens assembly 11 (as shown in FIG. 2 and FIG. 3) by applying a force generated by an electromagnetic interaction between the axial motor coils 1451 and the axial motor magnets 1452 of the axial voice coil motor 145.

As shown in FIG. 7 to FIG. 10, the reflection element driving module 15 includes a carrier 150, a holder 151, two rotating connection parts 153, two curved recess structures 154, a flexible printed circuit board 155, a first lateral voice coil motor 156 and two elastic elements 152.

The reflection element 12 is disposed on the carrier 150, and the holder 151 and the carrier 150 are disposed corresponding to each other. Furthermore, the carrier 150 is movable relative to the holder 151.

In detail, the rotating connection parts 153 and the curved recess structures 154 are located between the holder 151 and the carrier 150, the rotating connection parts 153 are balls and disposed on the holder 151, and the curved recess structures 154 are disposed on the carrier 150. The rotating connection parts 153 are respectively in physical contact with the curved recess structures 154, and the curved recess structures 154 are rotatable relative to the rotating connection parts 153, so that the carrier 150 is movable relative to the holder 151. As shown in FIG. 11, when a curvature radius of the curved recess structure 154 is Rc, and a curvature radius of the rotating connection part 153 is Rb, the following conditions are satisfied: Rc=0.51 mm; Rb=0.5 mm; and Rb/Rc=0.98.

The flexible printed circuit board 155 is disposed on the holder 151.

The first lateral voice coil motor 156 includes two first lateral motor coils 1561 and two first lateral motor magnets 1562, the first lateral motor coils 1561 are disposed on the flexible printed circuit board 155, and the first lateral motor magnets 1562 are disposed on the carrier 150. The reflection element driving module 15 is configured to drive the carrier 150 to rotate in a rotation direction D2 around a first axis AL1 (as shown in FIG. 3, FIG. 7 and FIG. 11) by applying a force generated by an electromagnetic interaction between the first lateral motor coils 1561 and the first lateral motor magnets 1562 of the first lateral voice coil motor 156. The first axis AL1 passes through the rotating connection parts 153, and the first axis AL1 is orthogonal to the incident optical axis IOA and orthogonal to the lens optical axis LOA.

The elastic elements 152 are connected to the holder 151 and the carrier 150, and the elastic elements 152 exert a preload force on the carrier 150 in a direction towards the holder 151, so that the carrier 150 can remain stable when the carrier 150 is not driven.

As shown in FIG. 12 to FIG. 15, the image sensor driving module 16 includes a cover member 160, a fixed member 161, a movable plate 162, a plurality of rollable elements 163, a flexible printed circuit board 164 and a second lateral voice coil motor 165.

The cover member 160 is disposed on the fixed member 161 and together form a storage space to accommodate the movable plate 162.

The rollable elements 163 are balls, and the rollable elements 163 are located between and in physical contact with the fixed member 161 and the movable plate 162. In specific, each of the fixed member 161 and the movable plate 162 has a plurality of guiding grooves GD for the rollable elements 163 to be movably disposed therein, and the rollable elements 163 can be guided by the guiding grooves GD to move in a predetermined direction. Therefore, the movable plate 162 has a degree of freedom and is movable relative to the fixed member 161. The degree of freedom is defined by a first dynamic axis MAL1, and the first dynamic axis MAL1 is orthogonal to the lens optical axis LOA. In this embodiment, the degree of freedom of the movable plate 162 is linear motion along the first dynamic axis MAL1, and the first dynamic axis MAL1 is orthogonal to the incident optical axis IOA.

In this embodiment, the movable plate 162 has one degree of freedom as an example, but the present disclosure is not limited thereto. In this and other embodiments, the movable plate may further have another degree of freedom (i.e., the movable plate may have two degrees of freedom), where said another degree of freedom is defined by a second dynamic axis, and the first dynamic axis, the second dynamic axis and the lens optical axis are orthogonal to one another. In addition, said another degree of freedom may be linear motion along the second dynamic axis or may be rotation around the second dynamic axis.

The image sensor 13 is disposed on the flexible printed circuit board 164, the flexible printed circuit board 164 is connected to the movable plate 162 and the fixed member 161, and the flexible printed circuit board 164 is movable along with the movable plate 162 relative to the fixed member 161, so that the image sensor 13 is also movable relative to the fixed member 161. That is, the image sensor 13 is disposed on the movable plate 162 via the flexible printed circuit board 164 and movable along with the movable plate 162. In this embodiment, the flexible printed circuit board 164 includes an elastic adjustment structure 1640, and the elastic adjustment structure 1640 is a plurality of through holes.

The second lateral voice coil motor 165 includes a second lateral motor coil 1651 and a second lateral motor magnet 1652. The second lateral motor coil 1651 is disposed on the flexible printed circuit board 164, and the second lateral motor magnet 1652 is disposed on the movable plate 162. As shown in FIG. 16, each of the second lateral motor coil 1651 and the second lateral motor magnet 1652 has a second lateral motor corresponsive surface CS2, and the two second lateral motor corresponsive surfaces CS2 face each other. The image sensor driving module 16 is configured to drive the movable plate 162 to move in a direction D3 parallel to the first dynamic axis MAL1 (as shown in FIG. 3 and FIG. 13) by applying a force generated by an electromagnetic interaction between the second lateral motor coil 1651 and the second lateral motor magnet 1652 of the second lateral voice coil motor 165, so that the image sensor 13 disposed on the flexible printed circuit board 164 can be moved in direction(s) based on the first dynamic axis MAL1. In this embodiment, the axial motor corresponsive surfaces CS1 and the second lateral motor corresponsive surfaces CS2 are parallel to the incident optical axis 10A.

In this embodiment, the fixed member 161 may be provided with a ferromagnetic element (not shown) corresponding to the second lateral motor magnet 1652, such that an attractive force is generated between the movable plate 162 and the fixed member 161 so as to increase driving stability.

Figure 17:
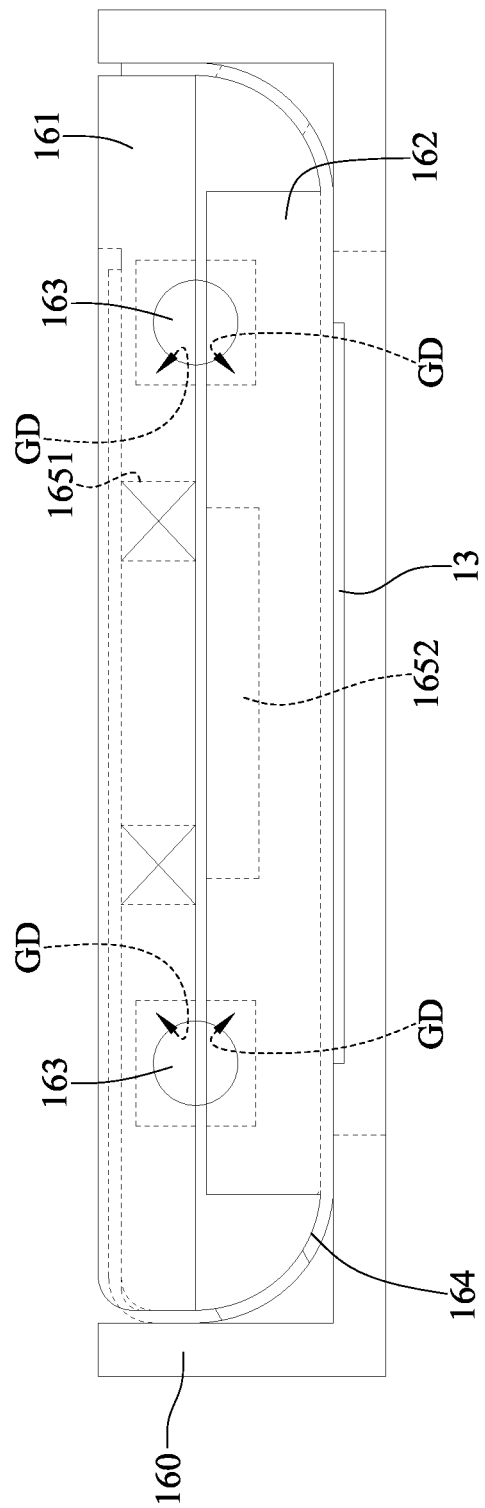
FIG. 17 to FIG. 19 are schematic views of the image sensor driving module driving the image sensor in FIG. 1.
Figure 18:
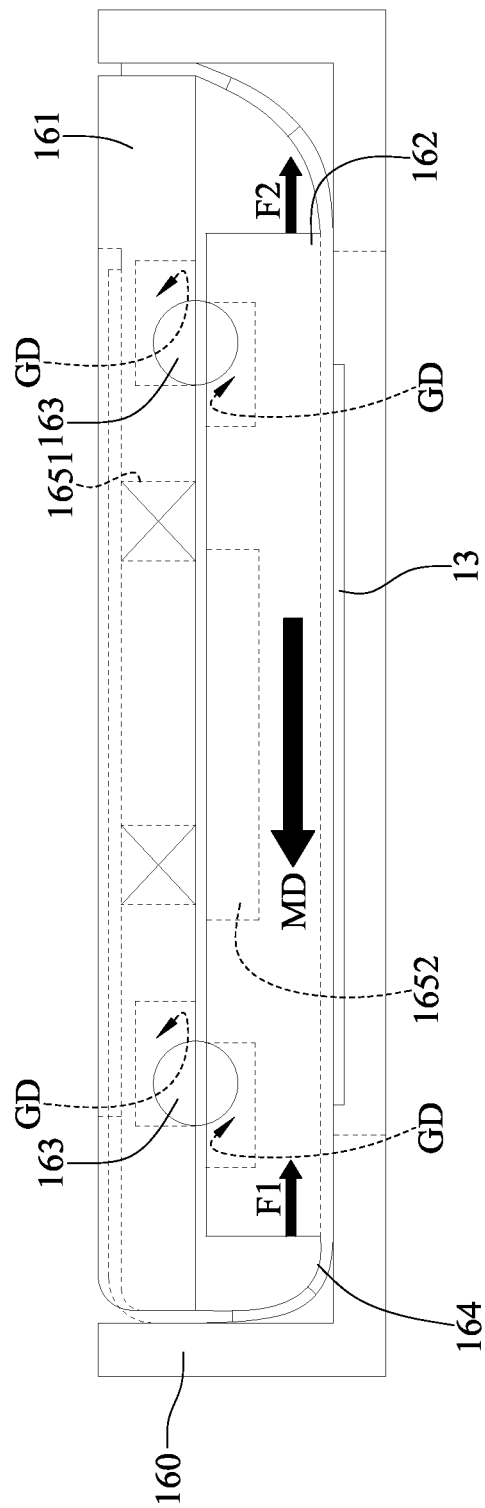
Figure 19:
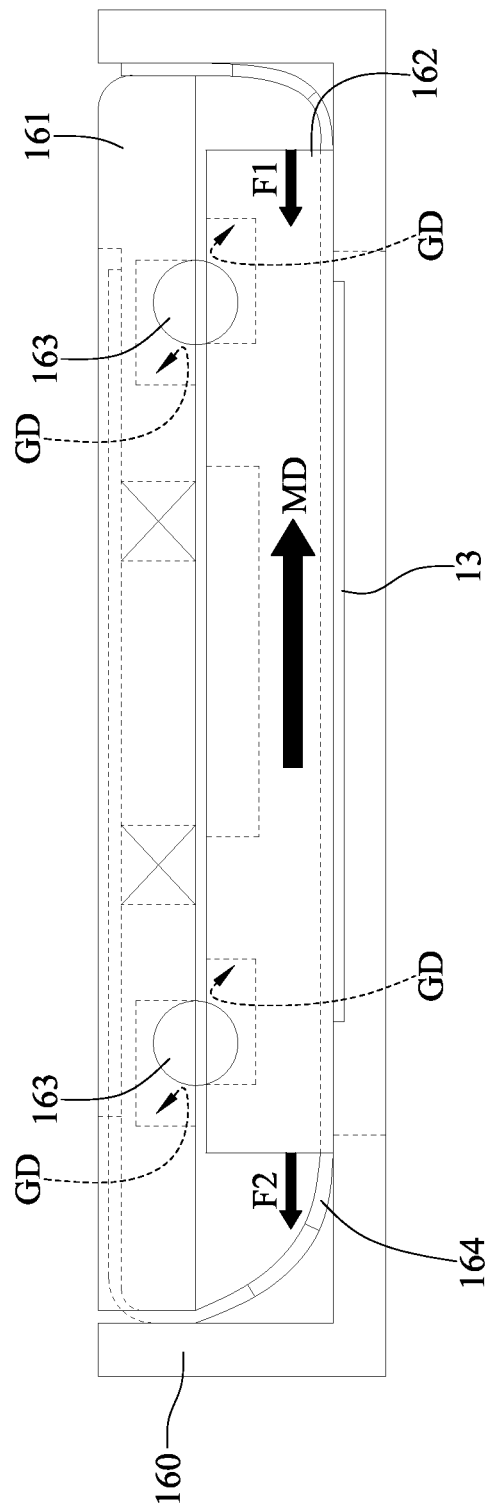

Please refer to FIG. 17 to FIG. 19, which show the image sensor being driven by the image sensor driving module in FIG. 1. FIG. 17 shows that the movable plate 162 is not driven by the second lateral voice coil motor 165 and located in an original position, and FIG. 18 and FIG. 19 respectively show that the movable plate 162 is driven by the second lateral voice coil motor 165 to move along the first dynamic axis MAL1 respectively to the left and to the right of the page.

The flexible printed circuit board 164 generates a force (e.g., restoring force) acting on the movable plate 162 after the movable plate 162 is driven to move. In specific, as shown in FIG. 18 and FIG. 19, after the movable plate 162 is driven by the second lateral voice coil motor 165 to move from the original position to the left or the right, the flexible printed circuit board 164 is pushed by the movable plate 162, then the flexible printed circuit board 164 deforms and thus generates a pushing force F1 and a pulling force F2 acting on the movable plate 162. When the movable plate 162 is no longer driven by the second lateral voice coil motor 165, the movable plate 162 is moved to the original position by the pushing force F1 and the pulling force F2 exerted by the flexible printed circuit board 164. Note that directions of the pushing force F1 and the pulling force F2 are opposite to a moving direction MD of the movable plate 162.

Figure 20:
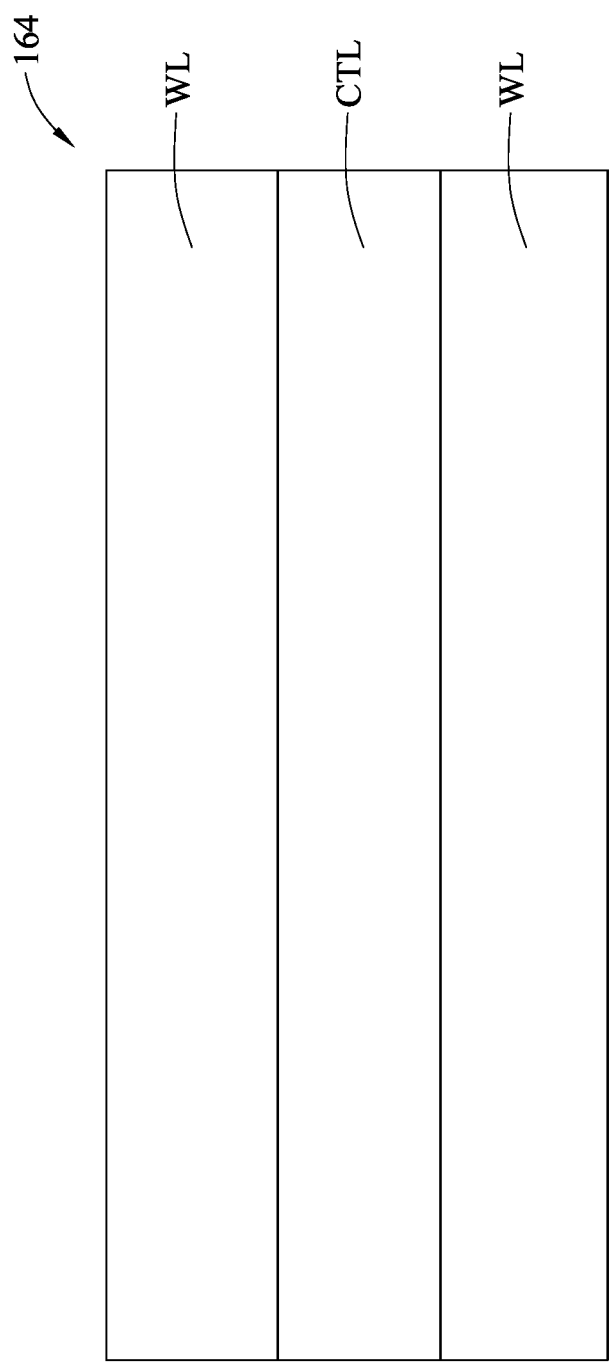
FIG. 20 is a cross-sectional view of a flexible printed circuit board of the image sensor driving module in FIG. 12.

Please refer to FIG. 20, which is a cross-sectional view of a flexible printed circuit board of the image sensor driving module in FIG. 12. In this embodiment, the flexible printed circuit board 164 of the image sensor driving module 16 includes two cladding layers WL and a wire layer CTL wrapped in the cladding layers WL, so that the wire layer CTL won't be damaged when the flexible printed circuit board 164 is deformed during the operation of the image sensor driving module 16.

In this embodiment, the photographing module 1 includes the reflection element driving module 15 and the image sensor driving module 16, and two-axis image stabilization can be provided by the reflection element driving module 15 and the image sensor driving module 16. Therefore, the two driving modules 15 and 16 each provides one-axis image stabilization, so that the thickness of the photographing module 1 can be reduced, and the control difficulty of the driving modules 15 and 16 can be reduced.

2nd Embodiment

Figure 21:
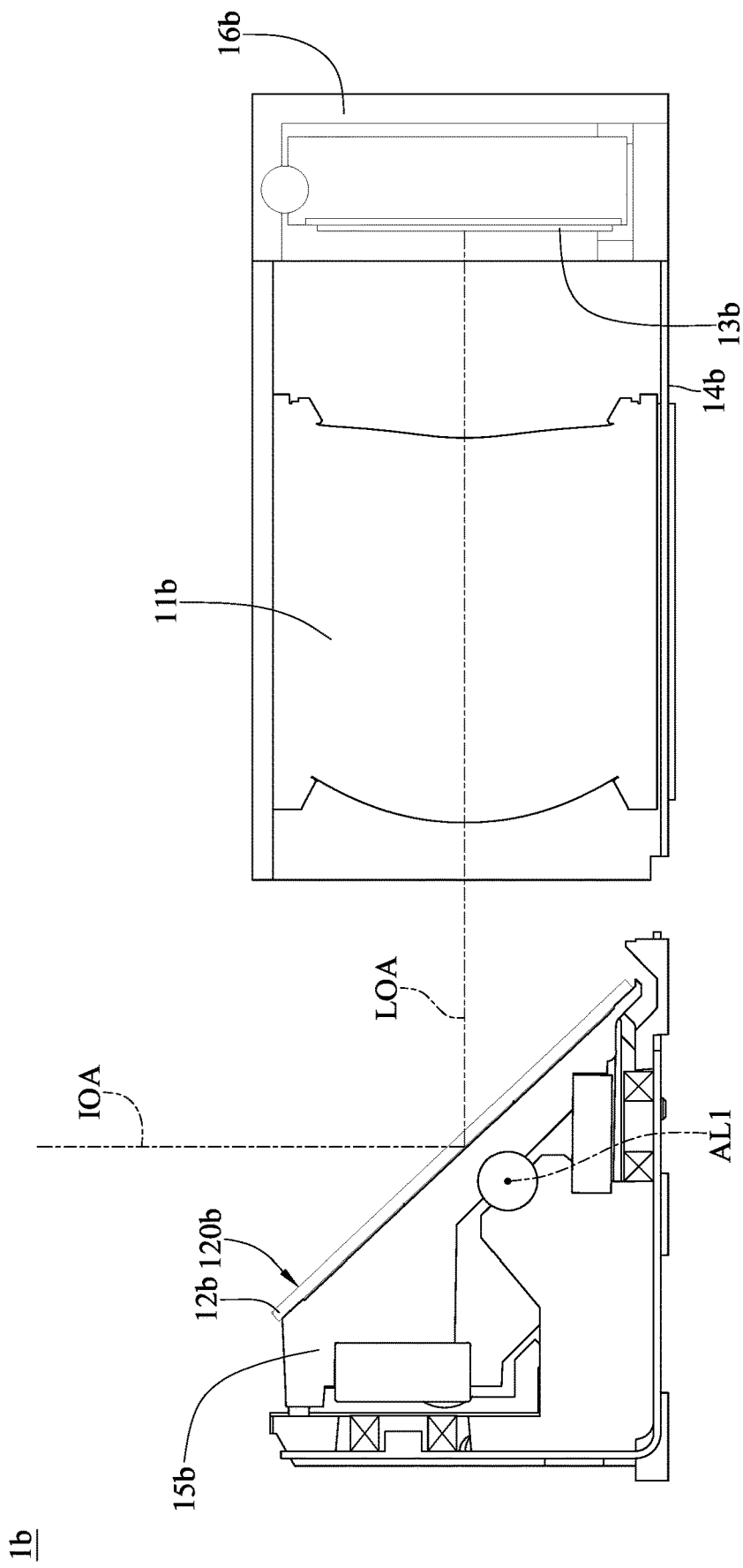
FIG. 21 is a cross-sectional view of a photographing module according to the 2nd embodiment of the present disclosure.
Figure 22:
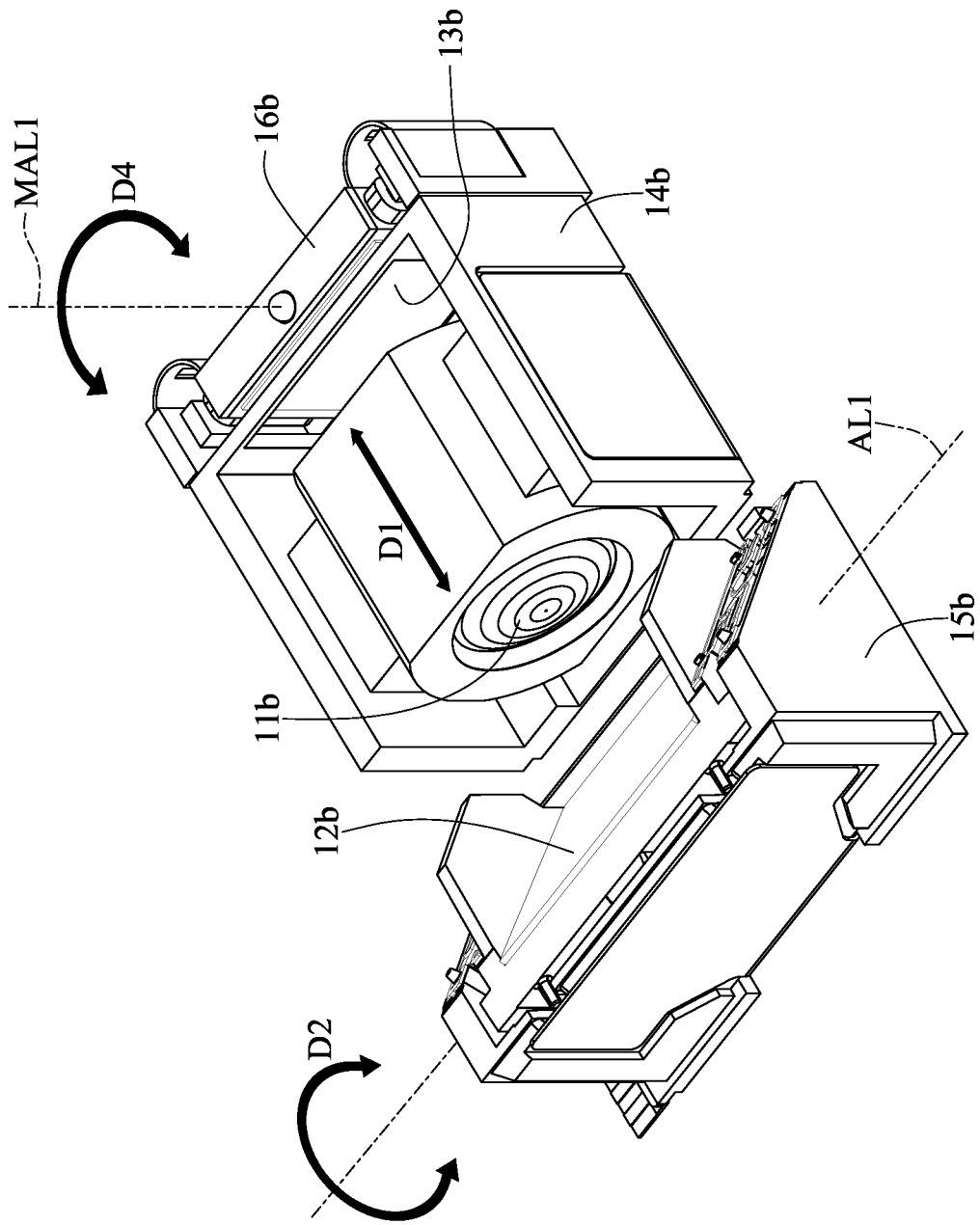
FIG. 22 is a schematic view of driving directions of driving modules of the photographing module in FIG. 21.
Figure 23:
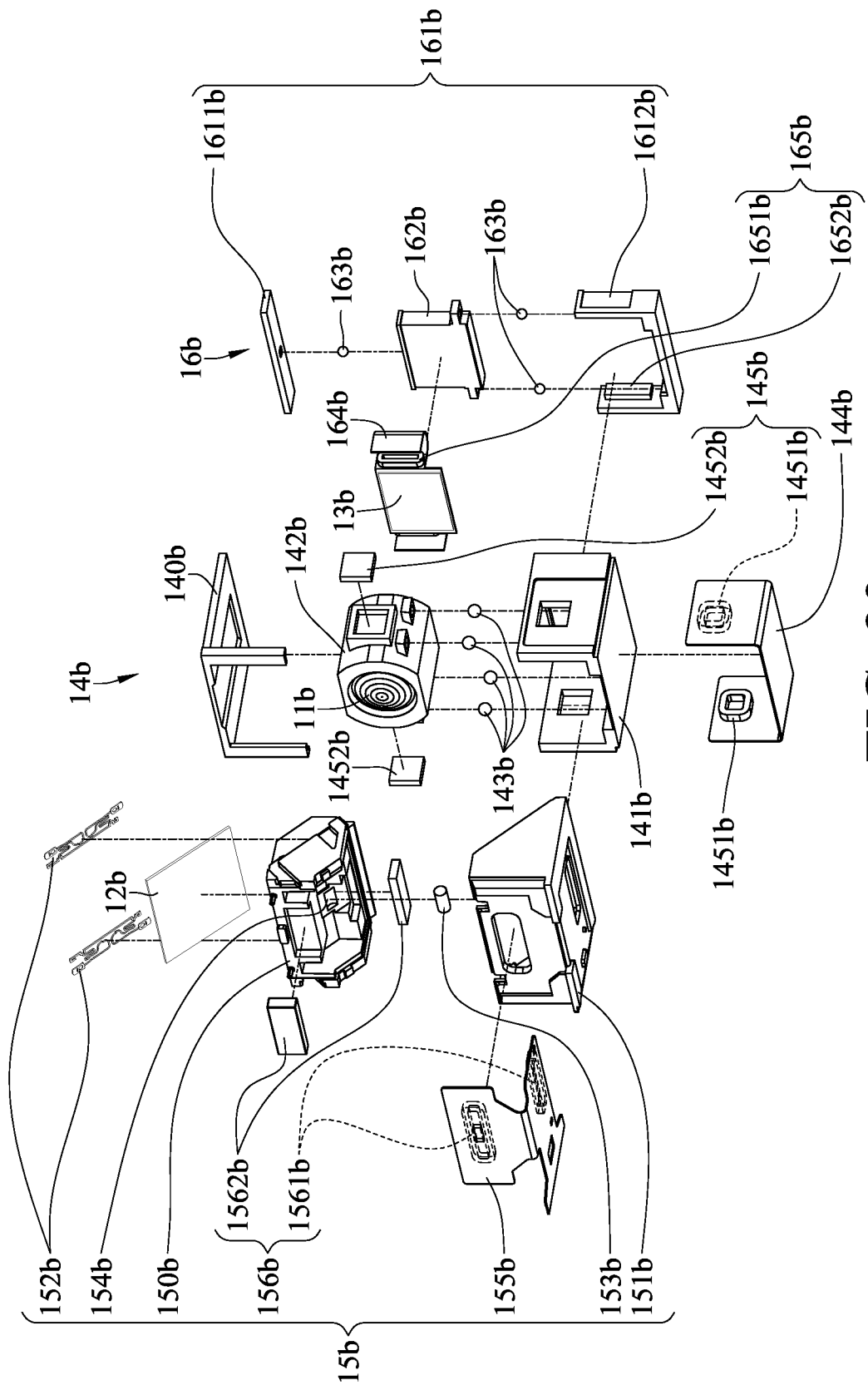
FIG. 23 is an exploded view of the photographing module in FIG. 21.
Figure 24:
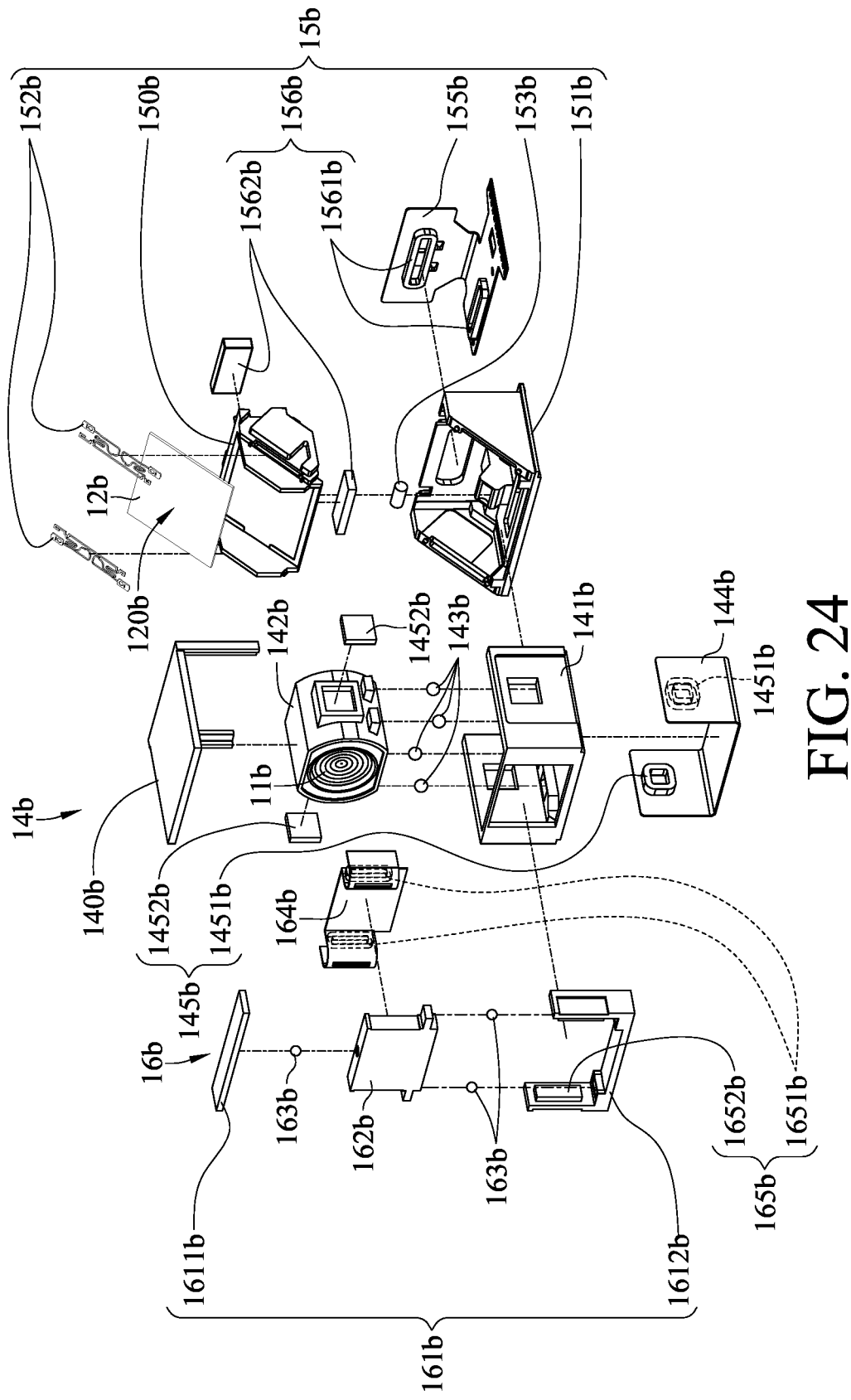
FIG. 24 is another exploded view of the photographing module in FIG. 21.
Figure 25:
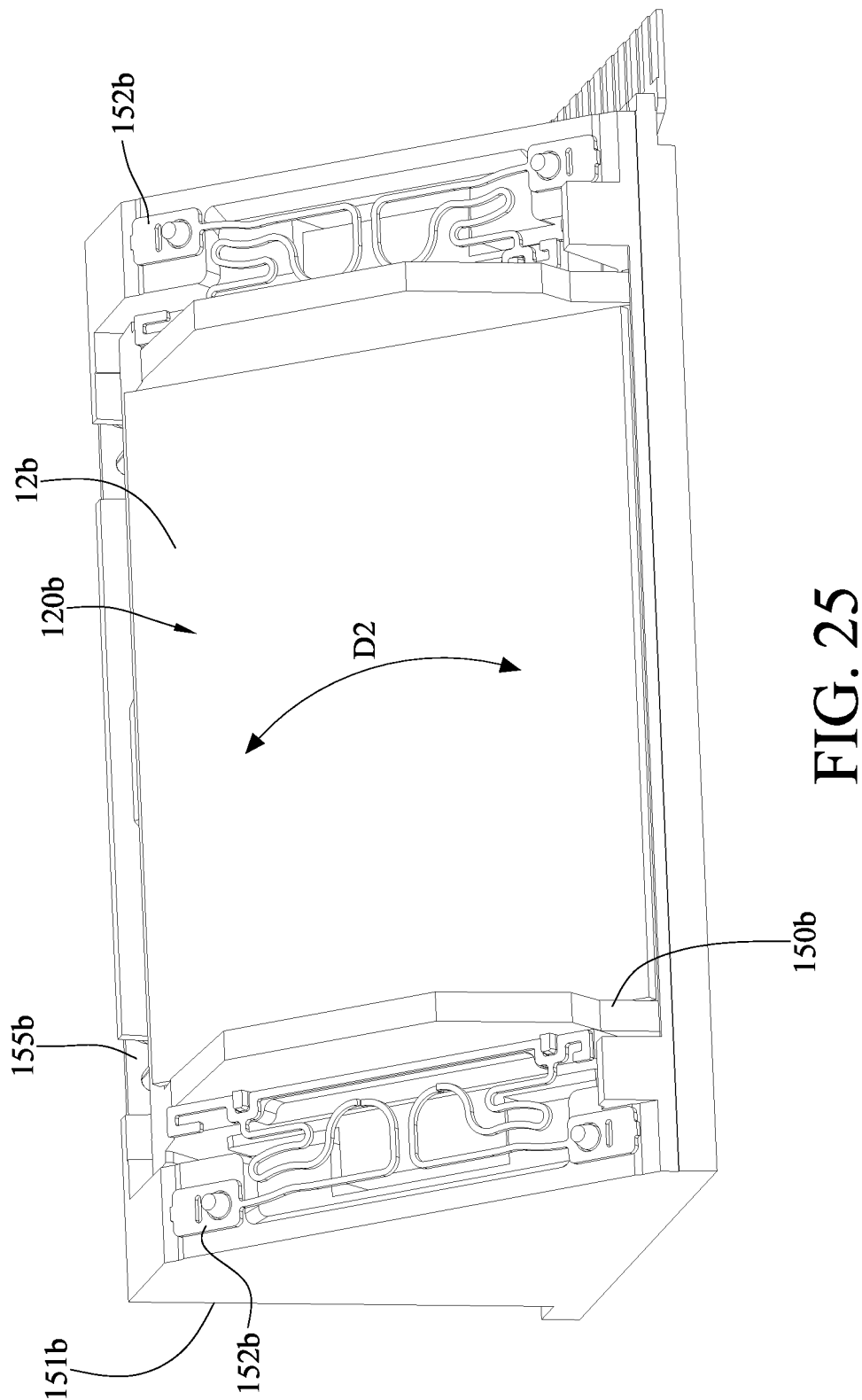
FIG. 25 is a perspective view of a reflection element and a reflection element driving module in FIG. 21.
Figure 26:
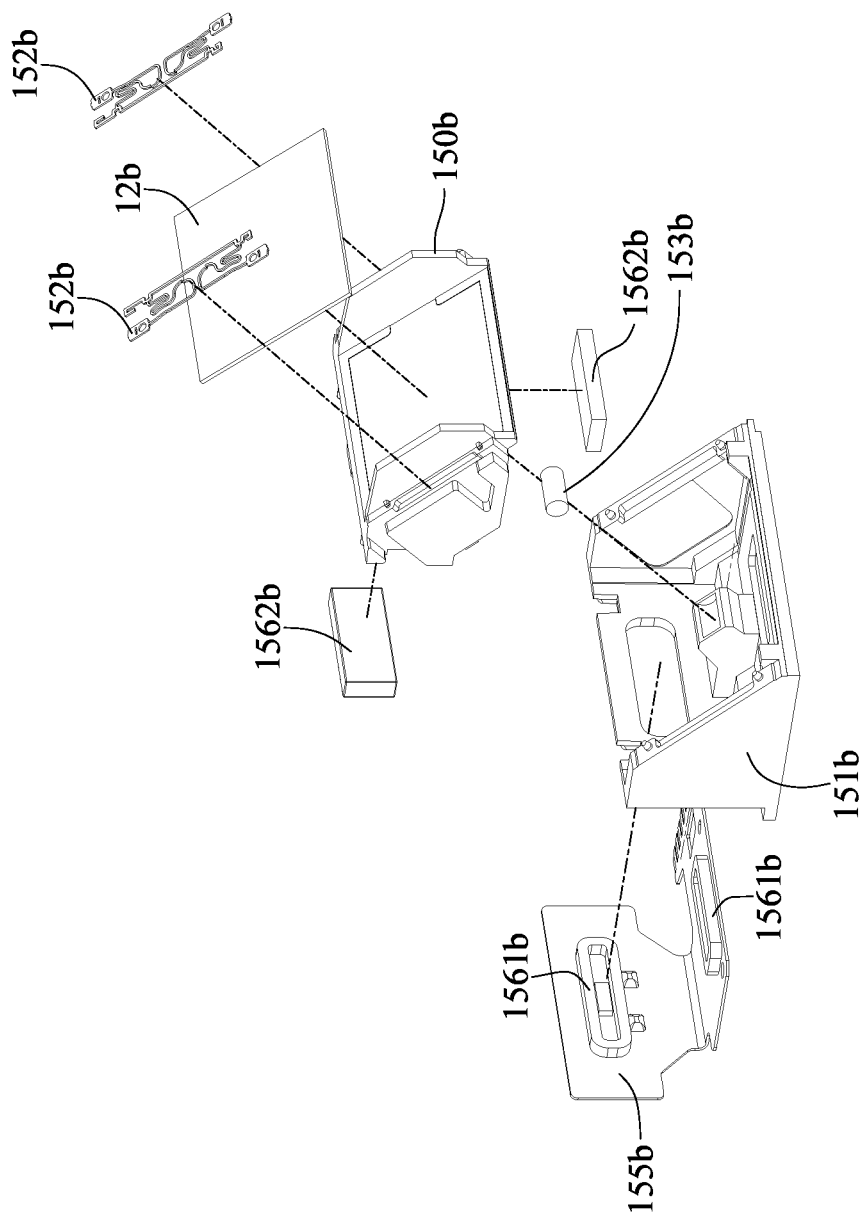
FIG. 26 is an exploded view of the reflection element and the reflection element driving module in FIG. 21.
Figure 27:
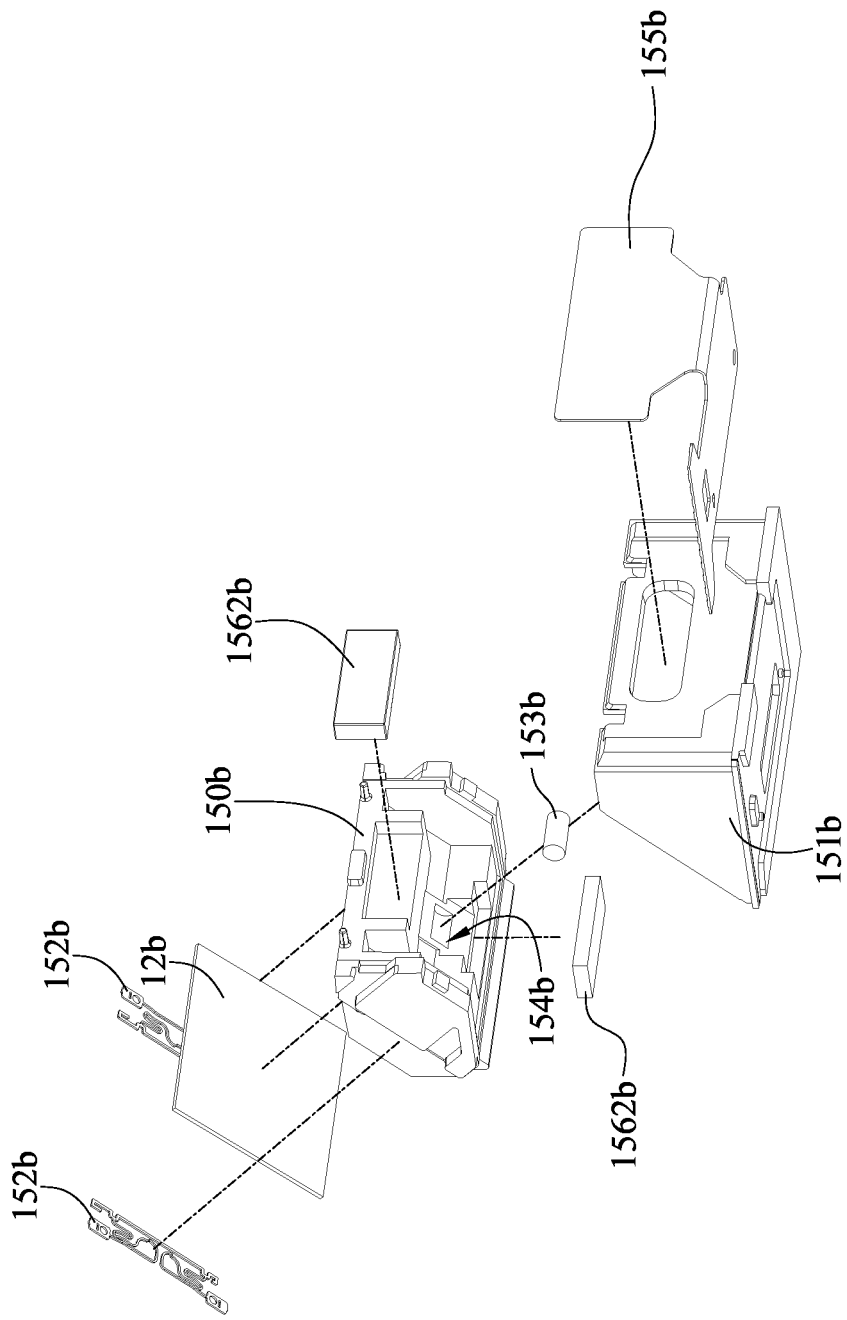
FIG. 27 is another exploded view of the reflection element and the reflection element driving module in FIG. 21.
Figure 28:
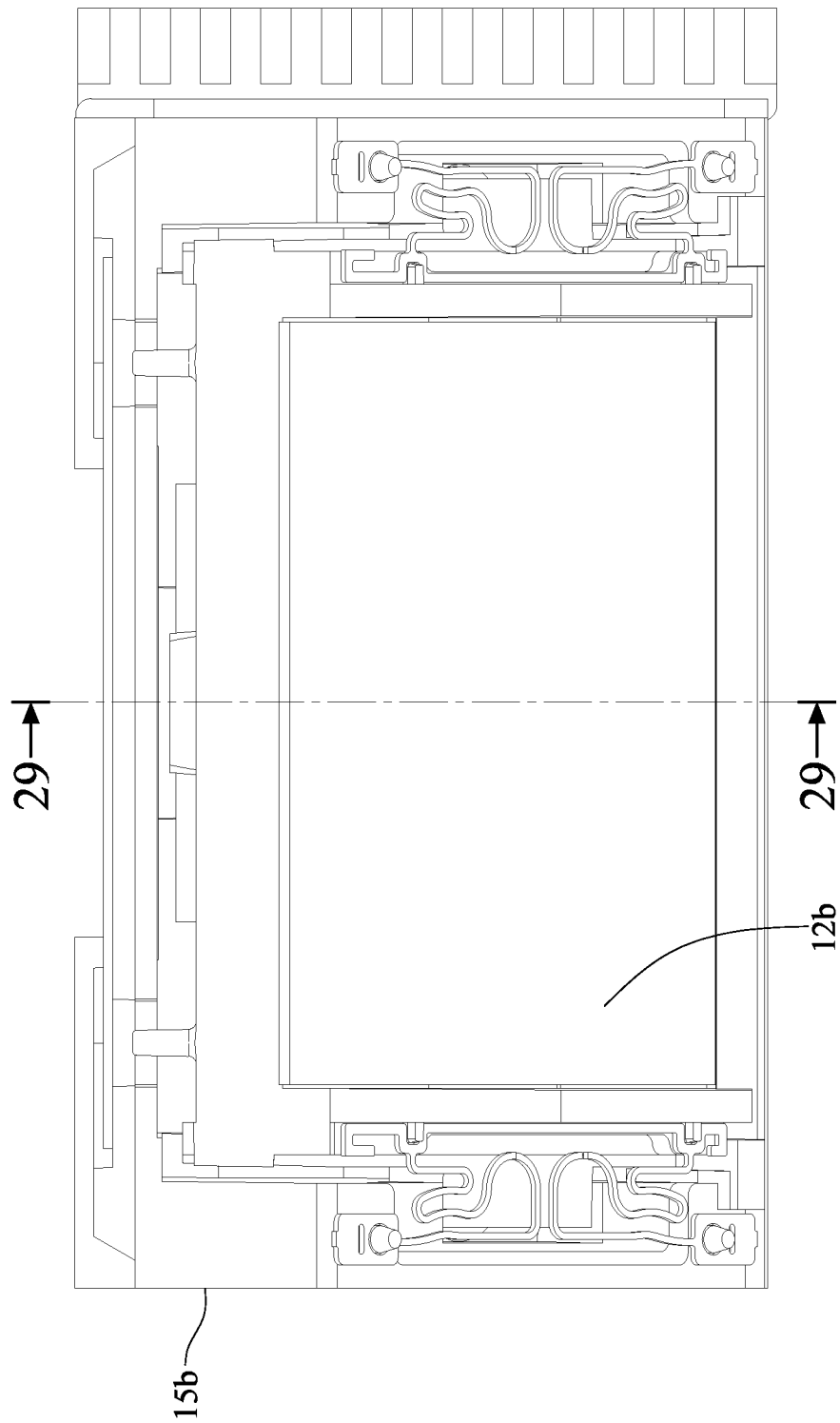
FIG. 28 is a top view of the reflection element and the reflection element driving module in FIG. 21.
Figure 29:
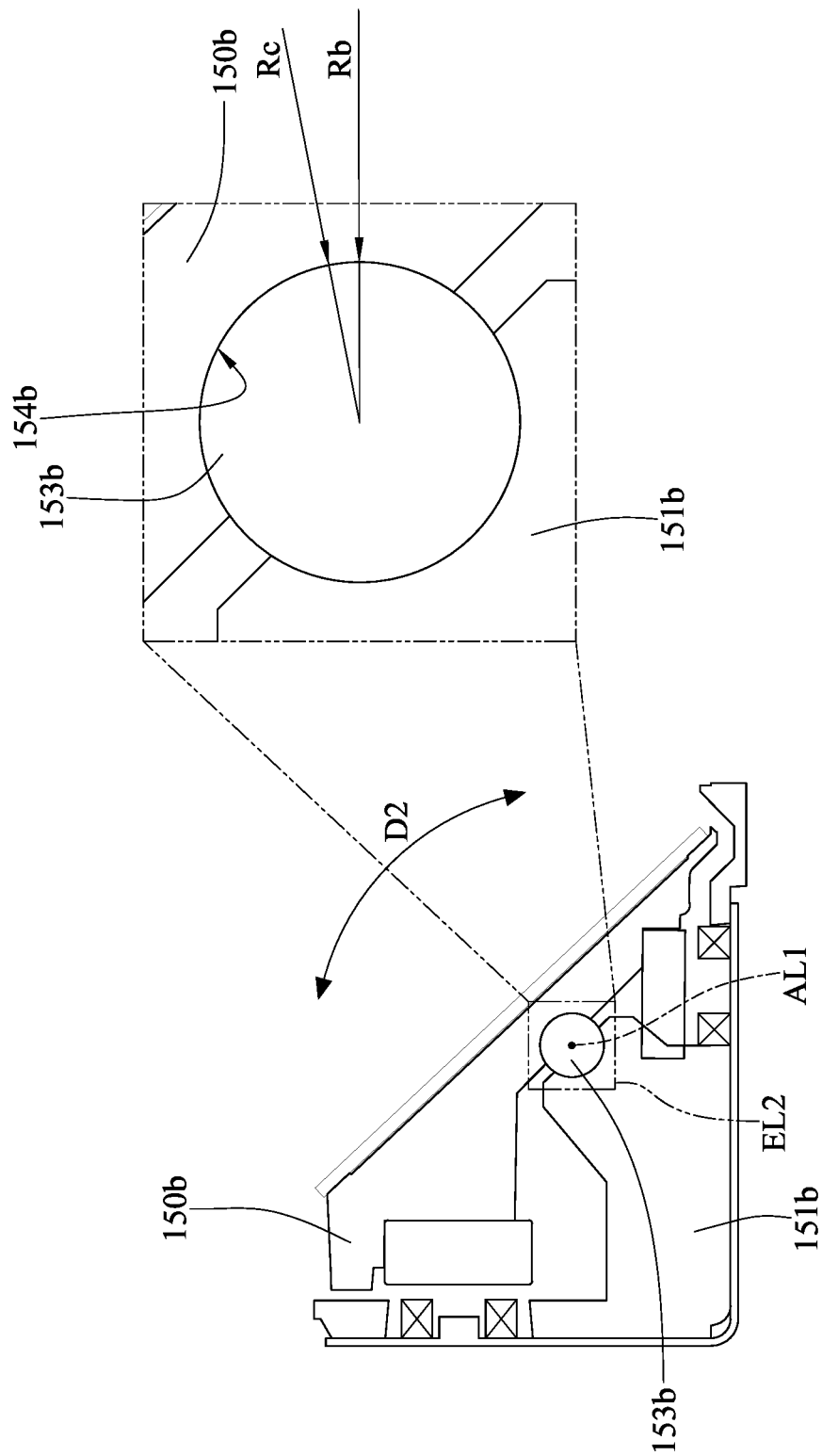
FIG. 29 is a cross-sectional view of the reflection element and the reflection element driving module along line 29-29 in FIG. 28 and an enlarged view of region EL2.
Figure 30:
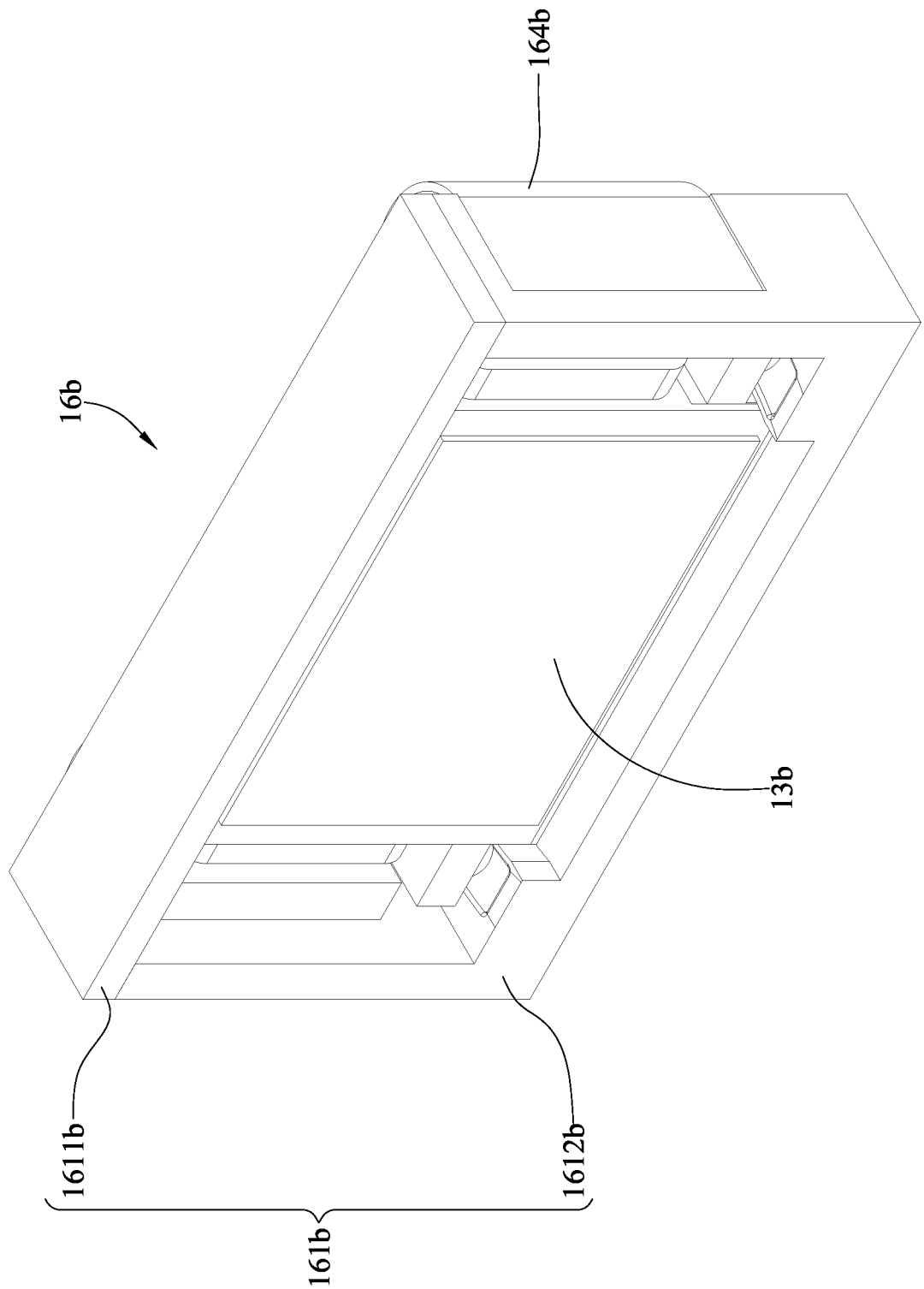
FIG. 30 is a perspective view of an image sensor and an image sensor driving module in FIG. 21.
Figure 31:
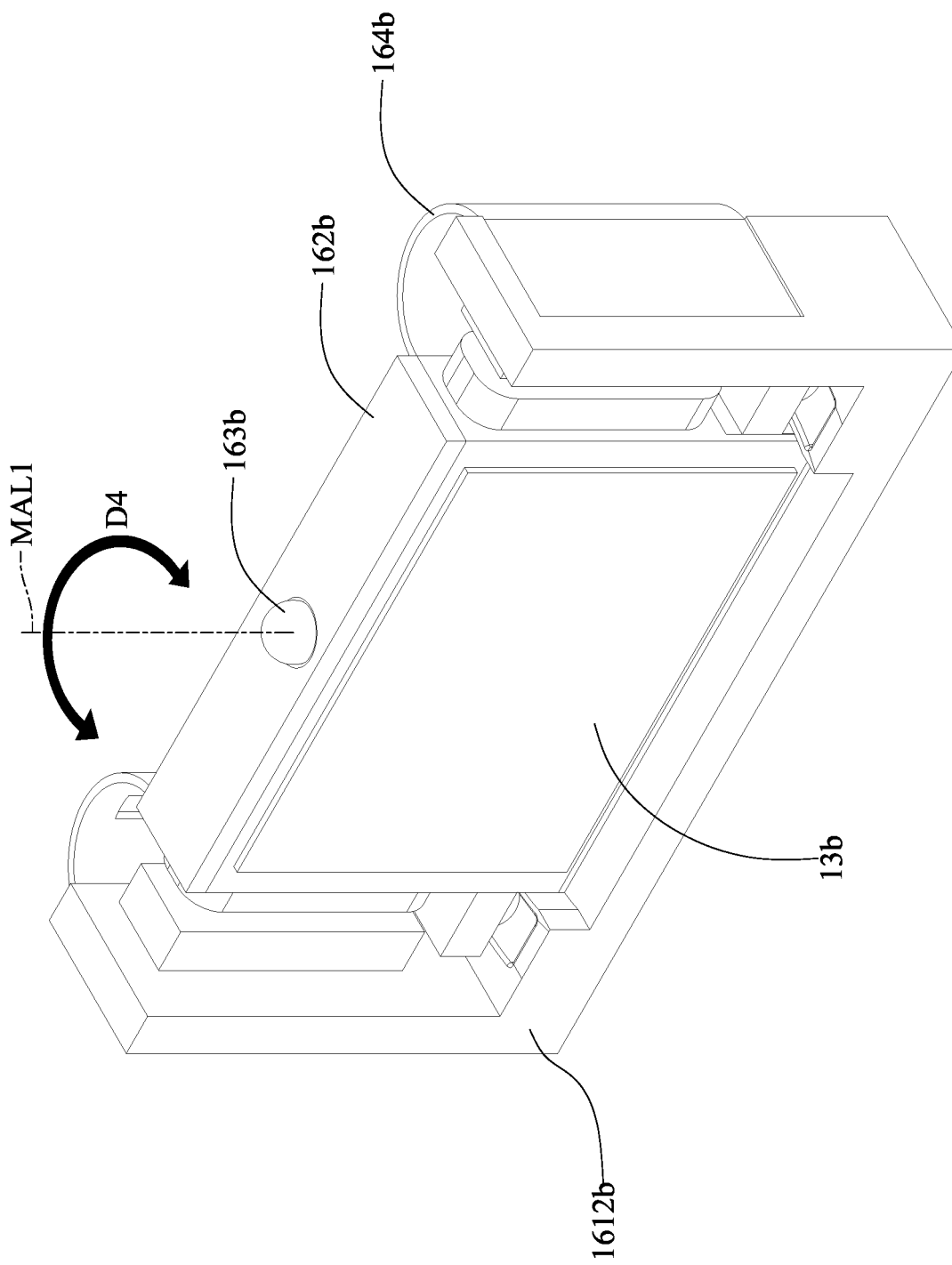
FIG. 31 is a perspective view of the image sensor and the image sensor driving module in FIG. 21 omitting a part of a fixed member.
Figure 32:
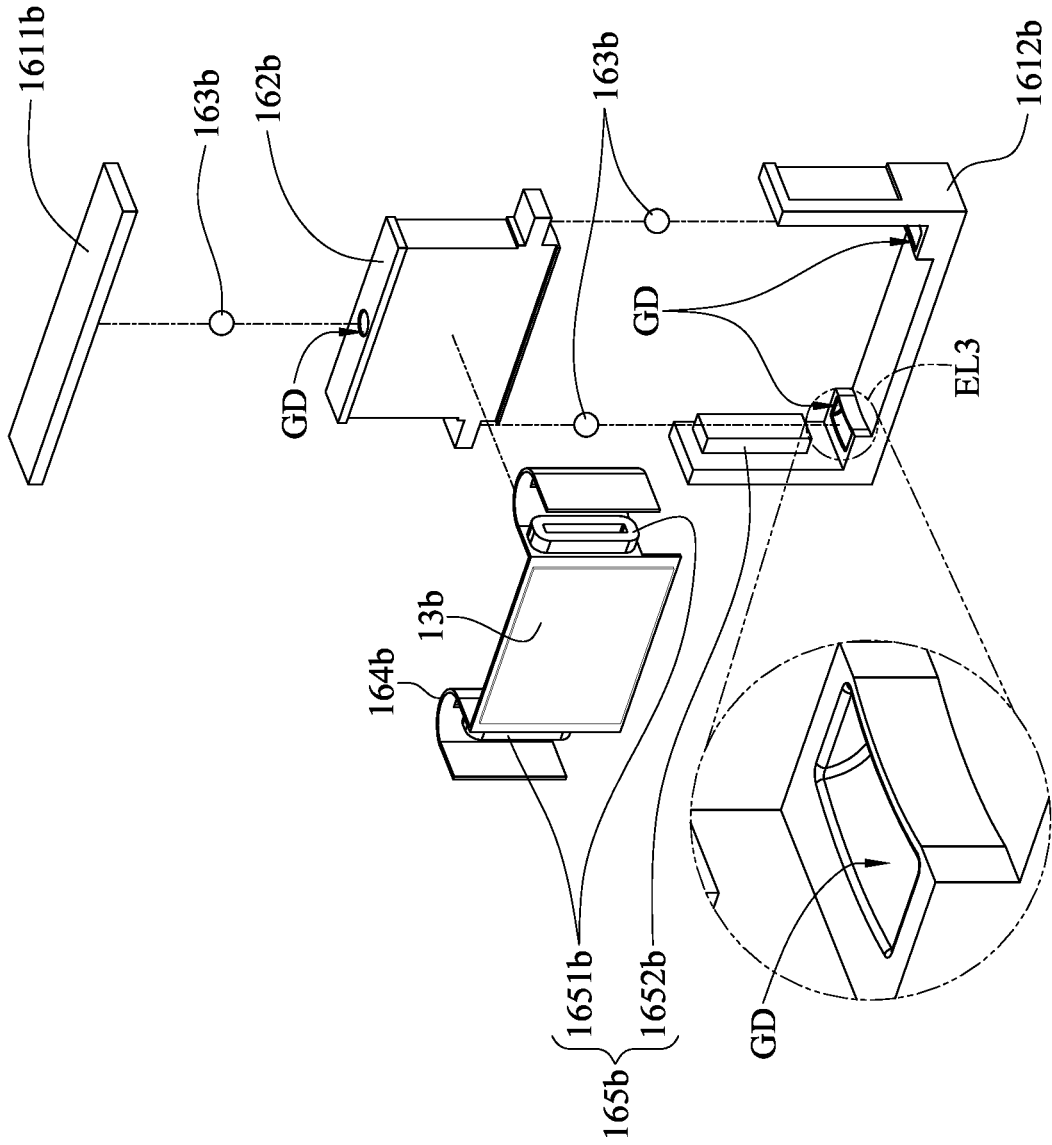
FIG. 32 is an exploded view of the image sensor and the image sensor driving module in FIG. 21 and an enlarged view of region EL3.
Figure 33:
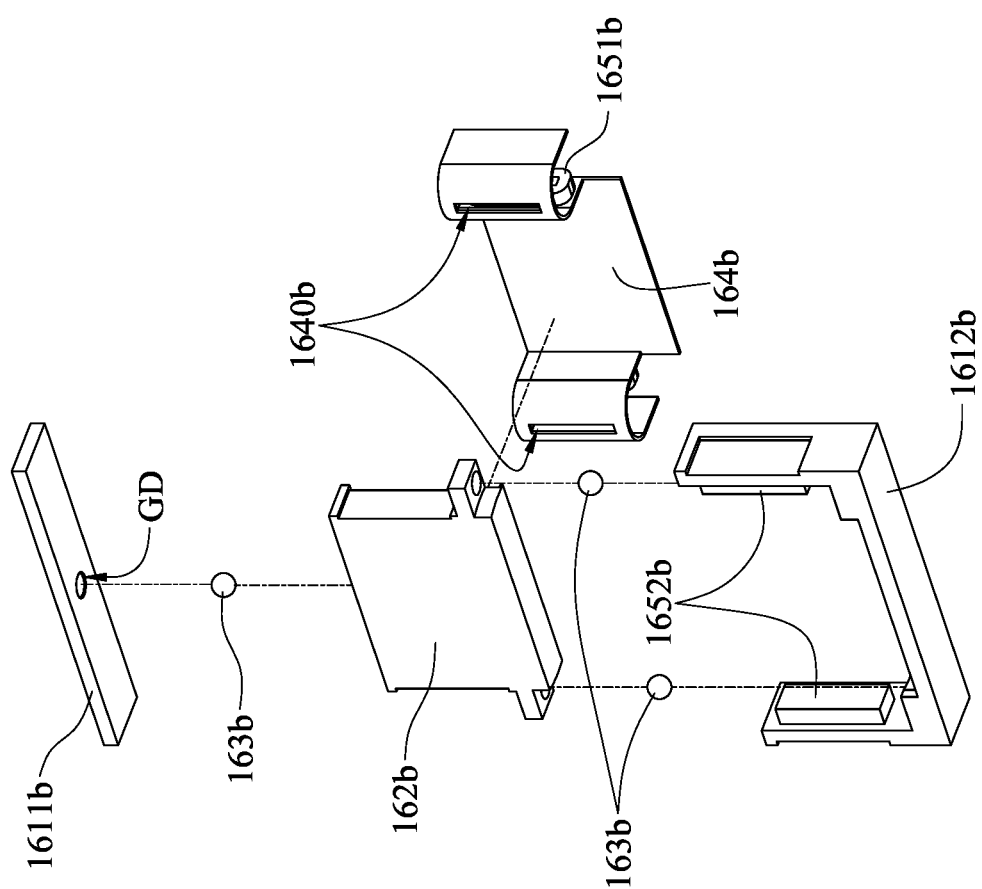
FIG. 33 is another exploded view of the image sensor and the image sensor driving module in FIG. 21.

FIG. 21 is a cross-sectional view of a photographing module according to the 2nd embodiment of the present disclosure, FIG. 22 is a schematic view of driving directions of driving modules of the photographing module in FIG. 21, FIG. 23 is an exploded view of the photographing module in FIG. 21, FIG. 24 is another exploded view of the photographing module in FIG. 21, FIG. 25 is a perspective view of a reflection element and a reflection element driving module in FIG. 21, FIG. 26 is an exploded view of the reflection element and the reflection element driving module in FIG. 21, FIG. 27 is another exploded view of the reflection element and the reflection element driving module in FIG. 21, FIG. 28 is a top view of the reflection element and the reflection element driving module in FIG. 21, FIG. 29 is a cross-sectional view of the reflection element and the reflection element driving module along line 29-29 in FIG. 28 and an enlarged view of region EL2, FIG. 30 is a perspective view of an image sensor and an image sensor driving module in FIG. 21, FIG. 31 is a perspective view of the image sensor and the image sensor driving module in FIG. 21 omitting a part of a fixed member, FIG. 32 is an exploded view of the image sensor and the image sensor driving module in FIG. 21 and an enlarged view of region EL3, and FIG. 33 is another exploded view of the image sensor and the image sensor driving module in FIG. 21.

In this embodiment, a photographing module 1b includes a lens assembly 11b, a reflection element 12b, an image sensor 13b, a lens element driving module 14b, a reflection element driving module 15b and an image sensor driving module 16b.

The lens assembly 11b includes at least one lens element. The reflection element 12b is a reflection mirror and located on an object side of the lens assembly 11b, and the reflection element 12b has a reflection surface 120b configured to redirect an incident light traveling along an incident optical axis IOA towards the lens assembly 11b. The image sensor 13b is disposed on an image surface of the lens assembly 11b, and the image sensor 13b is configured to receive light coming from the lens assembly 11b. As shown in FIG. 21, light traveling along the incident optical axis IOA hits the reflection surface 120b and is reflected by the reflection surface 120b, and the light reflected by the reflection surface 120b changes direction and travels into the lens assembly 11b and passes through the at least one lens element to thereby reach the image sensor 13b.

The lens element driving module 14b includes an upper cover 140b, a fixed base 141b, a lens element holding member 142b, a plurality of rollable connection members 143b, a flexible printed circuit board 144b and an axial voice coil motor 145b.

The upper cover 140b is disposed on the fixed base 141b and together form an accommodation space. The lens element holding member 142b is disposed in the accommodation space, and the lens assembly 11b is disposed on the lens element holding member 142b. The rollable connection members 143b are located between and in physical contact with the fixed base 141b and the lens element holding member 142b, so that the lens element holding member 142b is movable relative to the fixed base 141b. In this embodiment, the rollable connection members 143b are, for example, balls.

The flexible printed circuit board 144b is attached to the fixed base 141b. The axial voice coil motor 145b includes two axial motor coils 1451b and two axial motor magnets 1452b. The axial motor coils 1451b are disposed on the flexible printed circuit board 144b, and the axial motor magnets 1452b are disposed on the lens element holding member 142b. Each of the axial motor coil 1451b and the axial motor magnet 1452b corresponding to each other has an axial motor corresponsive surface, and the axial motor corresponsive surfaces of the corresponding axial motor coil 1451b and axial motor magnet 1452b face each other. The lens element driving module 14b is configured to drive the lens assembly 11b to move in a direction D1 parallel to a lens optical axis LOA of the lens assembly 11b (as shown in FIG. 21 and FIG. 22) by applying a force generated by an electromagnetic interaction between the axial motor coils 1451b and the axial motor magnets 1452b of the axial voice coil motor 145b.

As shown in FIG. 25 to FIG. 28, the reflection element driving module 15b includes a carrier 150b, a holder 151b, a rotating connection part 153b, a curved recess structure 154b, a flexible printed circuit board 155b, a first lateral voice coil motor 156b and two elastic elements 152b.

The reflection element 12b is disposed on the carrier 150b, and the holder 151b and the carrier 150b are disposed corresponding to each other. Furthermore, the carrier 150b is movable relative to the holder 151b.

In detail, the rotating connection part 153b and the curved recess structure 154b are located between the holder 151b and the carrier 150b, the rotating connection part 153b is a cylinder and disposed on the holder 151b, and the curved recess structure 154b is disposed on the carrier 150b. The rotating connection part 153b is in physical contact with the curved recess structure 154b, and the curved recess structure 154b is rotatable relative to the rotating connection part 153b, so that the carrier 150b is movable relative to the holder 151b. As shown in FIG. 29, when a curvature radius of the curved recess structure 154b is Rc, and a curvature radius of the rotating connection part 153b is Rb, the following conditions are satisfied: Rc=0.5 mm; Rb=0.5 mm; and Rb/Rc=1.0.

The flexible printed circuit board 155b is disposed on the holder 151b.

The first lateral voice coil motor 156b includes two first lateral motor coils 1561b and two first lateral motor magnets 1562b, the first lateral motor coils 1561b are disposed on the flexible printed circuit board 155b, and the first lateral motor magnets 1562b are disposed on the carrier 150b. The reflection element driving module 15b is configured to drive the carrier 150b to rotate in a rotation direction D2 around a first axis AL1 (as shown in FIG. 22, FIG. 25 and FIG. 29) by applying a force generated by an electromagnetic interaction between the first lateral motor coils 1561b and the first lateral motor magnets 1562b of the first lateral voice coil motor 156b. The first axis AL1 passes through the rotating connection part 153b, and the first axis AL1 is orthogonal to the incident optical axis IOA and orthogonal to the lens optical axis LOA.

The elastic elements 152b are connected to the holder 151b and the carrier 150b, and the elastic elements 152b exert a preload force on the carrier 150b in a direction towards the holder 151b, so that the carrier 150b can remain stable when the carrier 150b is not driven.

As shown in FIG. 30 to FIG. 33, the image sensor driving module 16b includes a fixed member 161b, a movable plate 162b, a plurality of rollable elements 163b, a flexible printed circuit board 164b and a second lateral voice coil motor 165b.

The fixed member 161b includes a top cover 1611b and a base portion 1612b, and the top cover 1611b is disposed on the base portion 1612b and together form a storage space to accommodate the movable plate 162b.

The rollable elements 163b are balls, and the rollable elements 163b are located between and in physical contact with the fixed member 161b and the movable plate 162b. In specific, each of the top cover 1611b, the base portion 1612b and the movable plate 162b has a plurality of guiding grooves GD for the rollable elements 163b to be movably disposed therein, and the rollable elements 163b can be guided by the guiding grooves GD to move in a predetermined direction. As shown in FIG. 32, each of the two guiding grooves GD of the base portion 1612b is in an arc shape, so that the rollable elements 163b guided by the guiding grooves GD are movable in a non-linear path. Therefore, the movable plate 162b has a degree of freedom and is movable relative to the fixed member 161b. The degree of freedom is defined by a first dynamic axis MAL1, and the first dynamic axis MAL1 is orthogonal to the lens optical axis LOA. In this embodiment, the degree of freedom of the movable plate 162b is rotation around the first dynamic axis MAL1, and the first dynamic axis MAL1 is parallel to the incident optical axis IOA.

In this embodiment, the movable plate 162b has one degree of freedom as an example, but the present disclosure is not limited thereto. In this and other embodiments, the movable plate may further have another degree of freedom (i.e., the movable plate may have two degrees of freedom), where said another degree of freedom is defined by a second dynamic axis, and the first dynamic axis, the second dynamic axis and the lens optical axis are orthogonal to one another. In addition, said another degree of freedom may be linear motion along the second dynamic axis or may be rotation around the second dynamic axis.

The image sensor 13b is disposed on the flexible printed circuit board 164b, the flexible printed circuit board 164b is connected to the movable plate 162b and the fixed member 161b, and the flexible printed circuit board 164b is movable along with the movable plate 162b relative to the fixed member 161b, so that the image sensor 13b is also movable relative to the fixed member 161b. That is, the image sensor 13b is disposed on the movable plate 162b via the flexible printed circuit board 164b and movable along with the movable plate 162b. In this embodiment, the flexible printed circuit board 164b includes an elastic adjustment structure 1640b, and the elastic adjustment structure 1640b is a plurality of through holes.

The second lateral voice coil motor 165b includes two second lateral motor coils 1651b and two second lateral motor magnets 1652b. The second lateral motor coils 1651b are disposed on the flexible printed circuit board 164b, and the second lateral motor magnets 1652b are disposed on the base portion 1612b of the fixed member 161b. Each of the second lateral motor coil 1651b and the second lateral motor magnet 1652b corresponding to each other has a second lateral motor corresponsive surface, and the second lateral motor corresponsive surfaces of the corresponding second lateral motor coil 1651b and second lateral motor magnet 1652b face each other. The image sensor driving module 16b is configured to drive the movable plate 162b to rotation in a rotation direction D4 around the first dynamic axis MAL1 (as shown in FIG. 22 and FIG. 31) by applying a force generated by an electromagnetic interaction between the second lateral motor coils 1651b and the second lateral motor magnets 1652b of the second lateral voice coil motor 165b, so that the image sensor 13b disposed on the flexible printed circuit board 164b can be moved in direction(s) based on the first dynamic axis MAL1. In this embodiment, the axial motor corresponsive surfaces and the second lateral motor corresponsive surfaces are parallel to the incident optical axis IOA.

In this embodiment, the photographing module 1b includes the reflection element driving module 15b and the image sensor driving module 16b, and two-axis image stabilization can be provided by the reflection element driving module 15b and the image sensor driving module 16b. Therefore, the two driving modules 15b and 16b each provides one-axis image stabilization, so that the thickness of the photographing module 1b can be reduced, and the control difficulty of the driving modules 15b and 16b can be reduced.

3rd Embodiment

Figure 34:
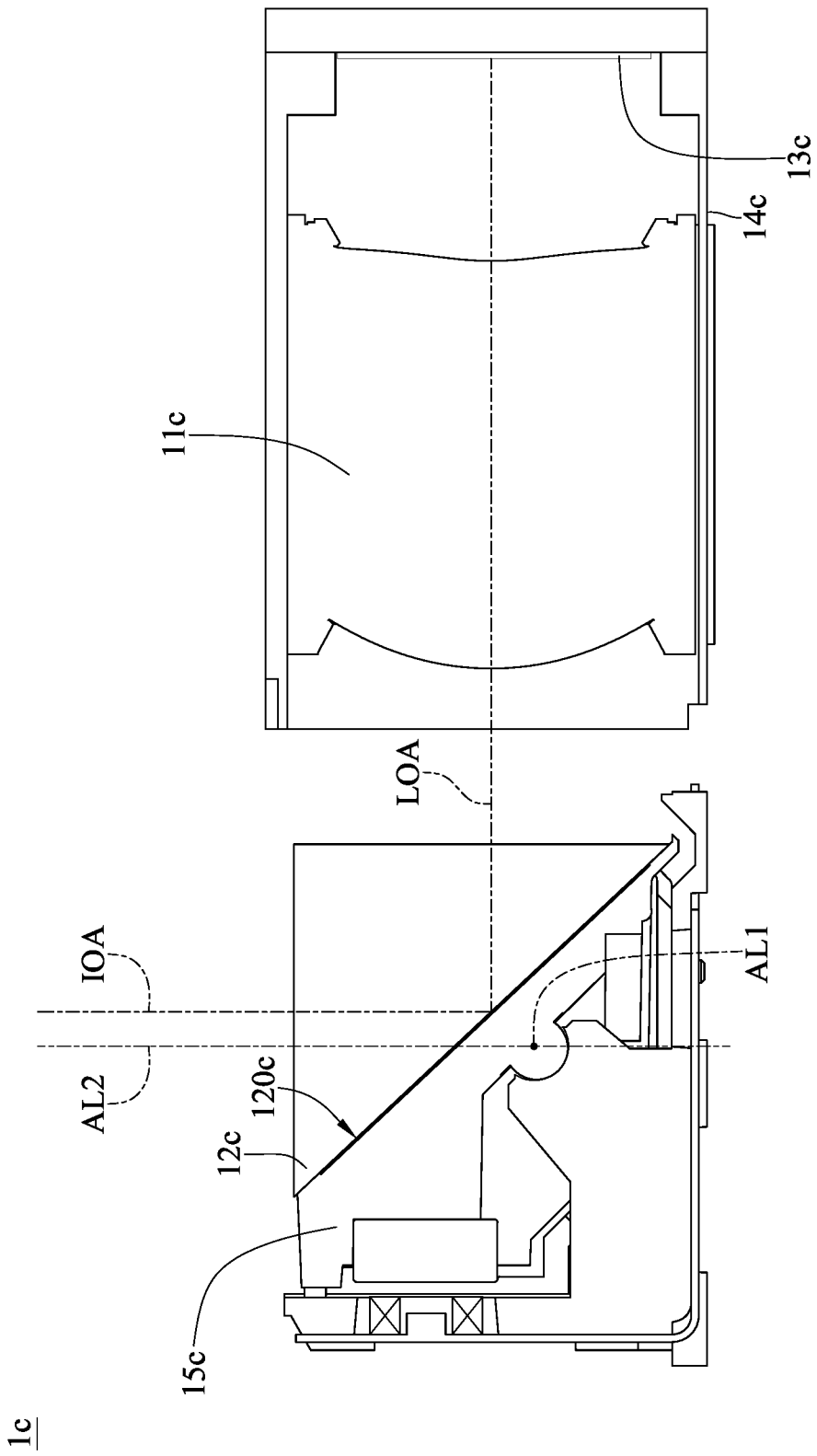
FIG. 34 is a cross-sectional view of a photographing module according to the 3rd embodiment of the present disclosure.
Figure 35:
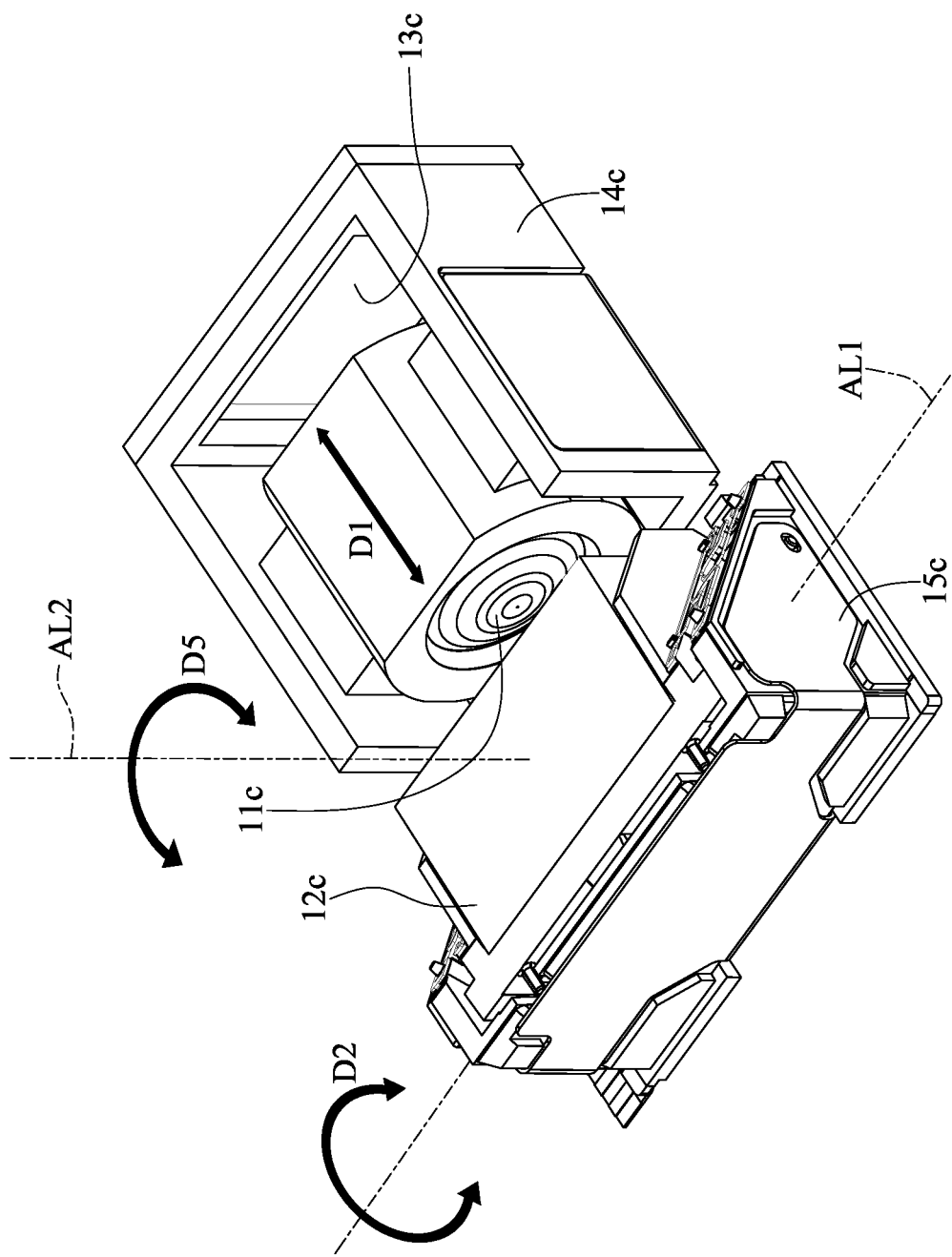
FIG. 35 is a schematic view of driving directions of driving modules of the photographing module in FIG. 34.
Figure 36:
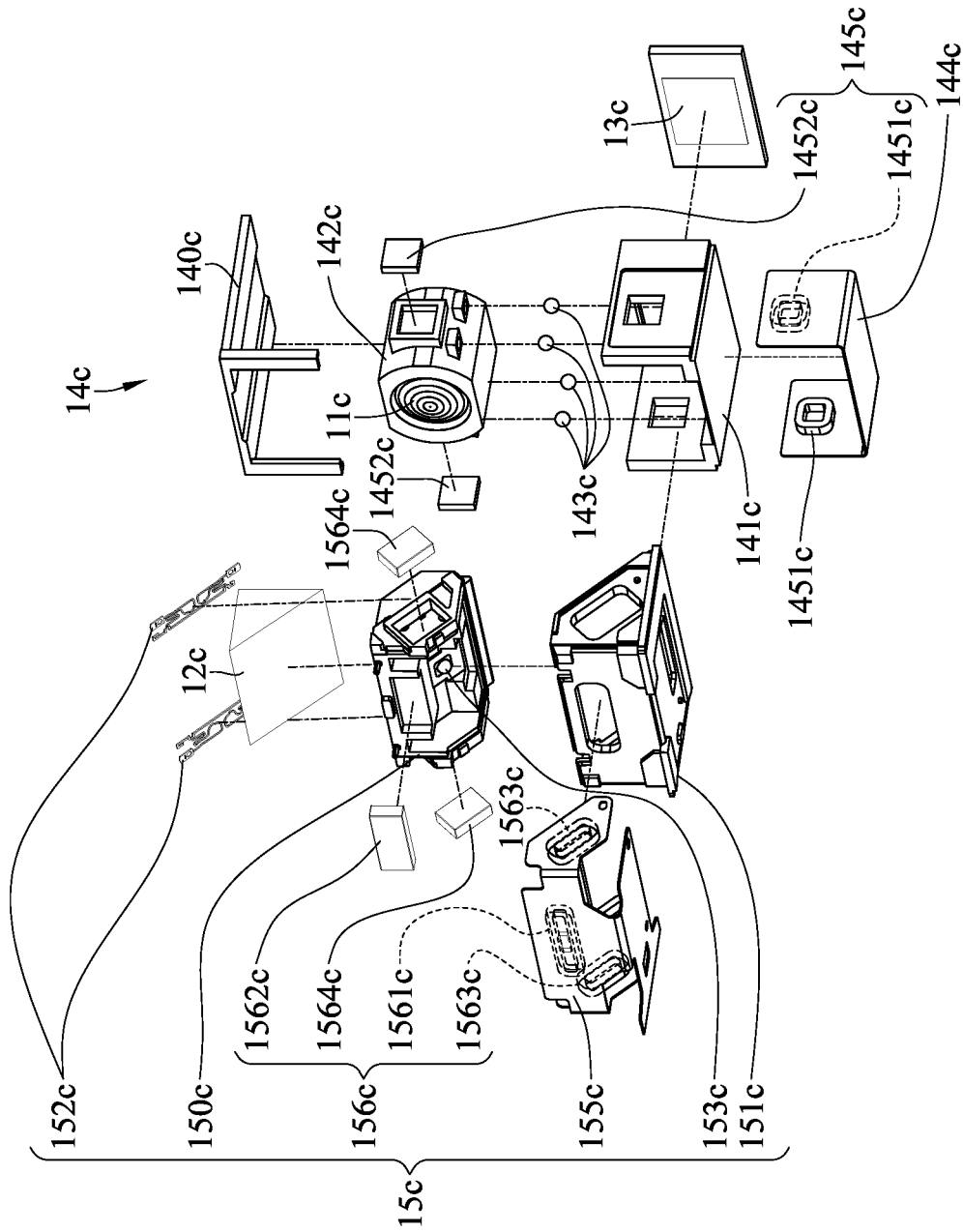
FIG. 36 is an exploded view of the photographing module in FIG. 34.
Figure 37:
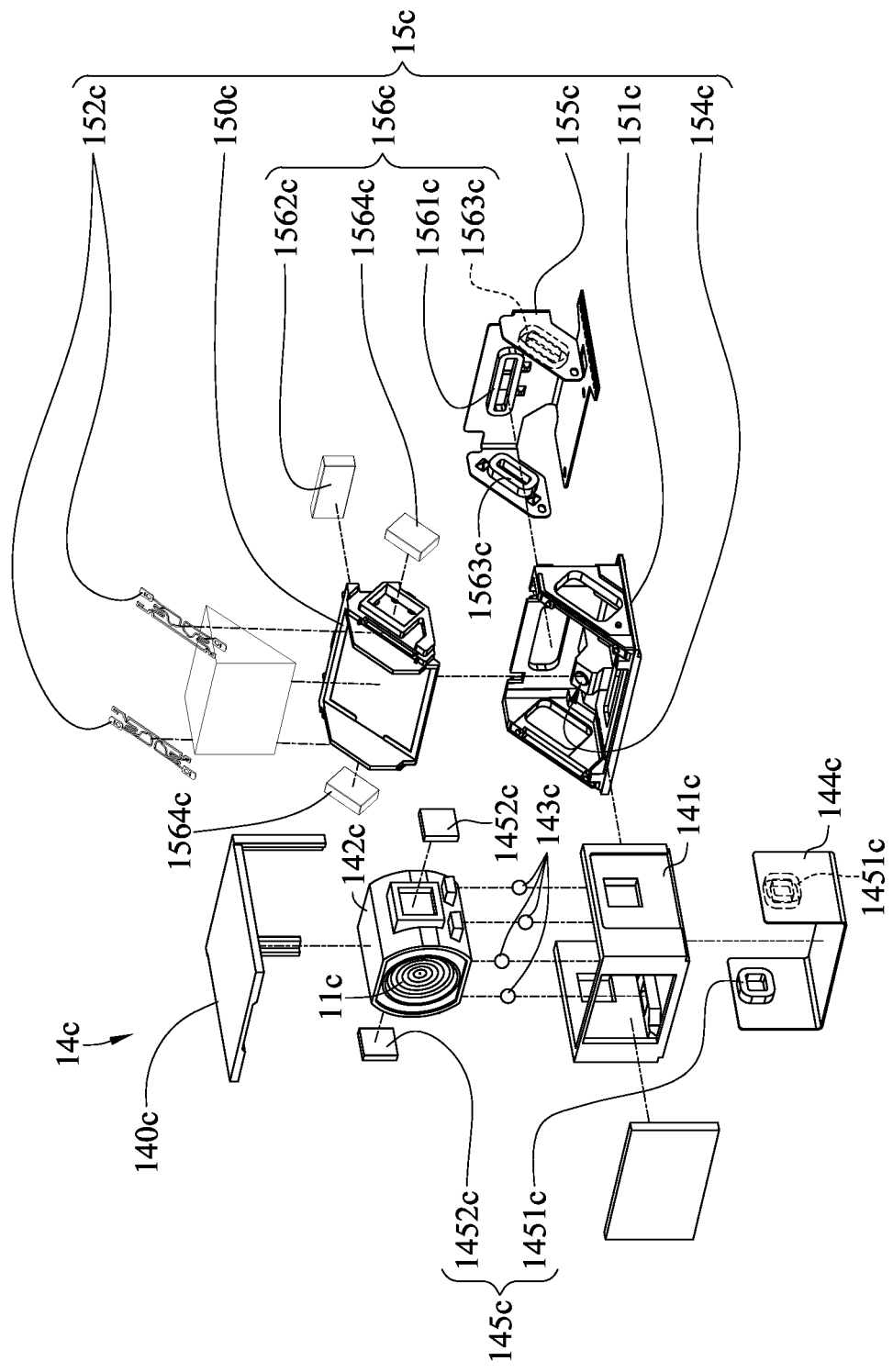
FIG. 37 is another exploded view of the photographing module in FIG. 34.
Figure 38:
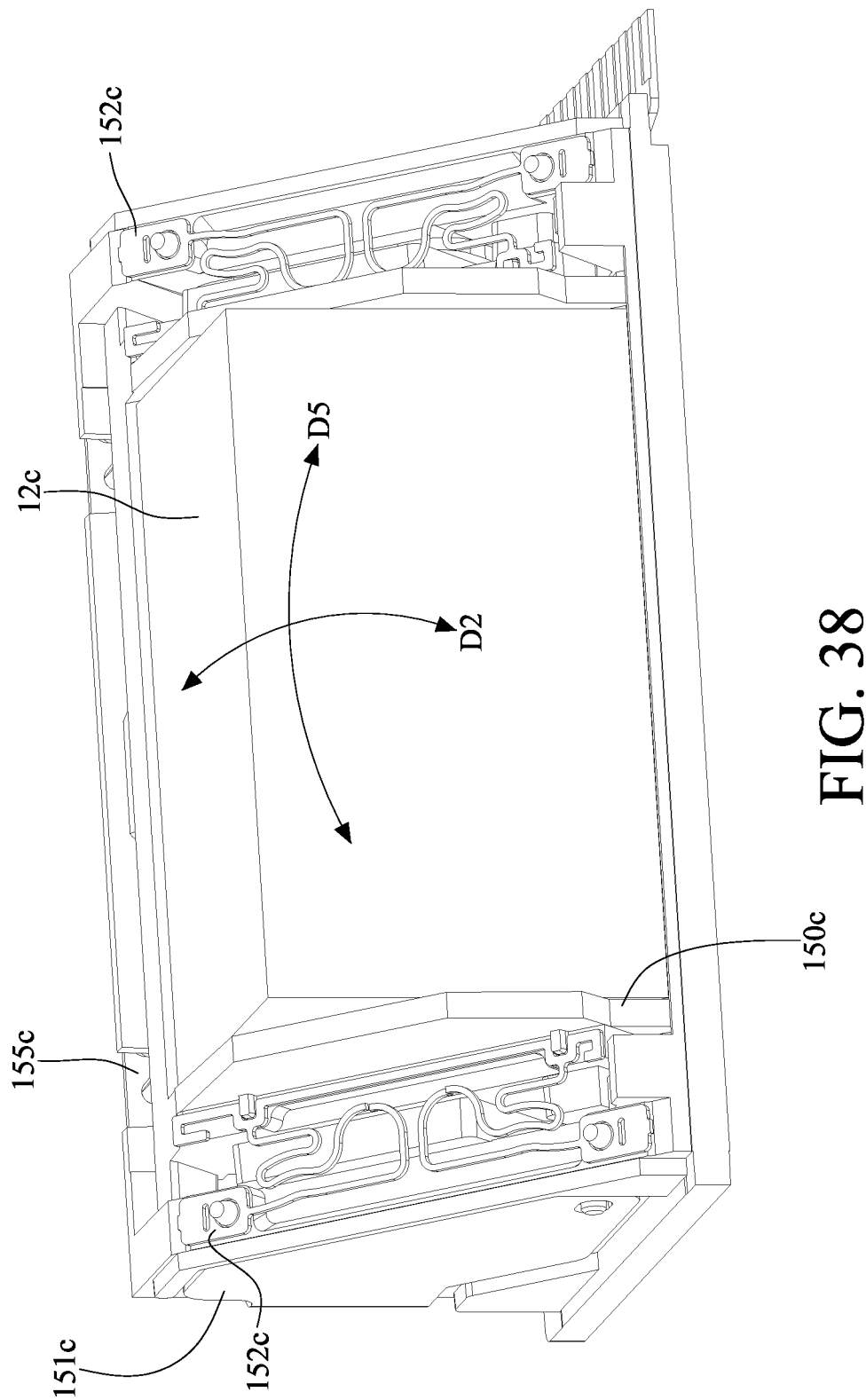
FIG. 38 is a perspective view of a reflection element and a reflection element driving module in FIG. 34.
Figure 39:
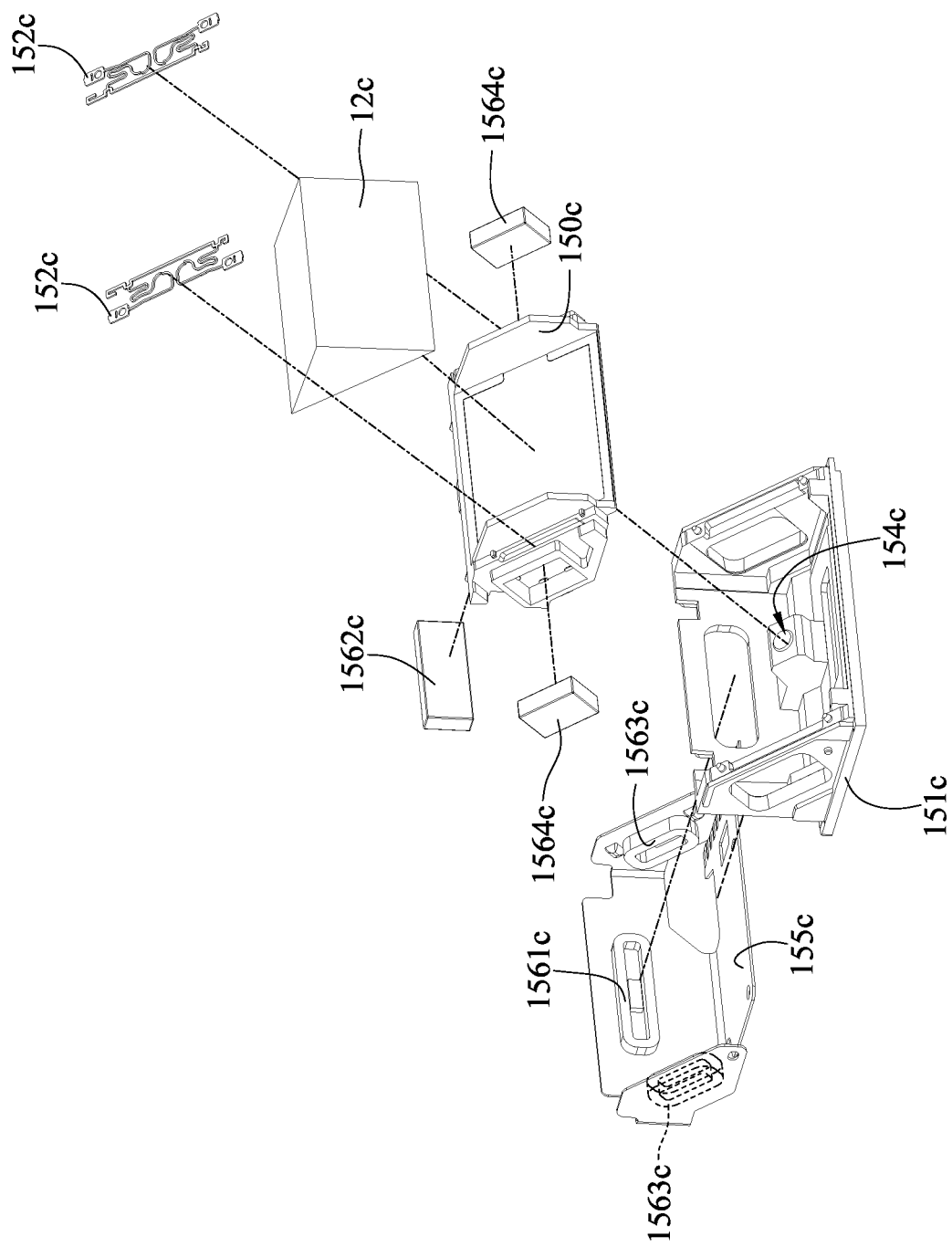
FIG. 39 is an exploded view of the reflection element and the reflection element driving module in FIG. 34.
Figure 40:
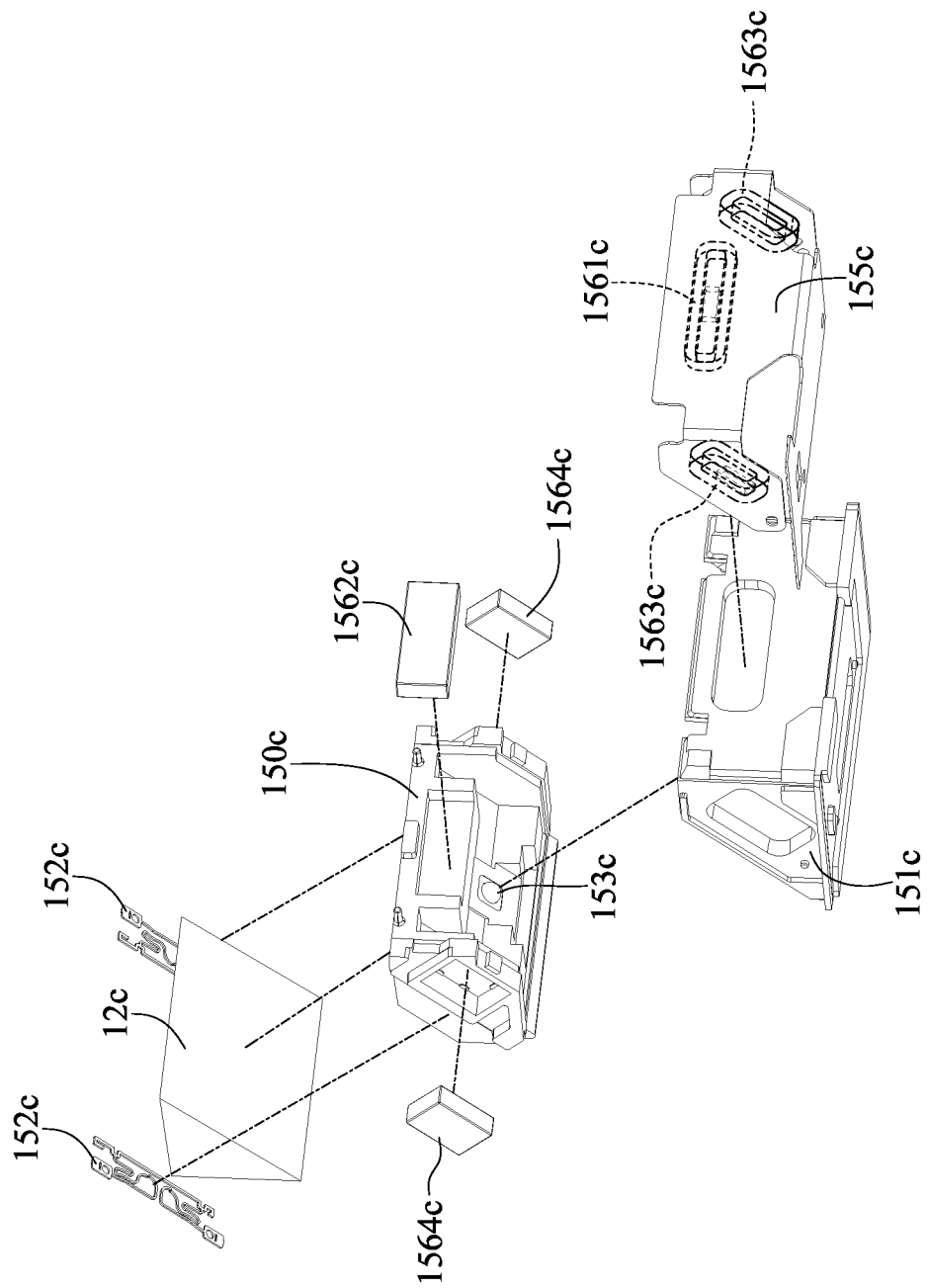
FIG. 40 is another exploded view of the reflection element and the reflection element driving module in FIG. 34.
Figure 41:
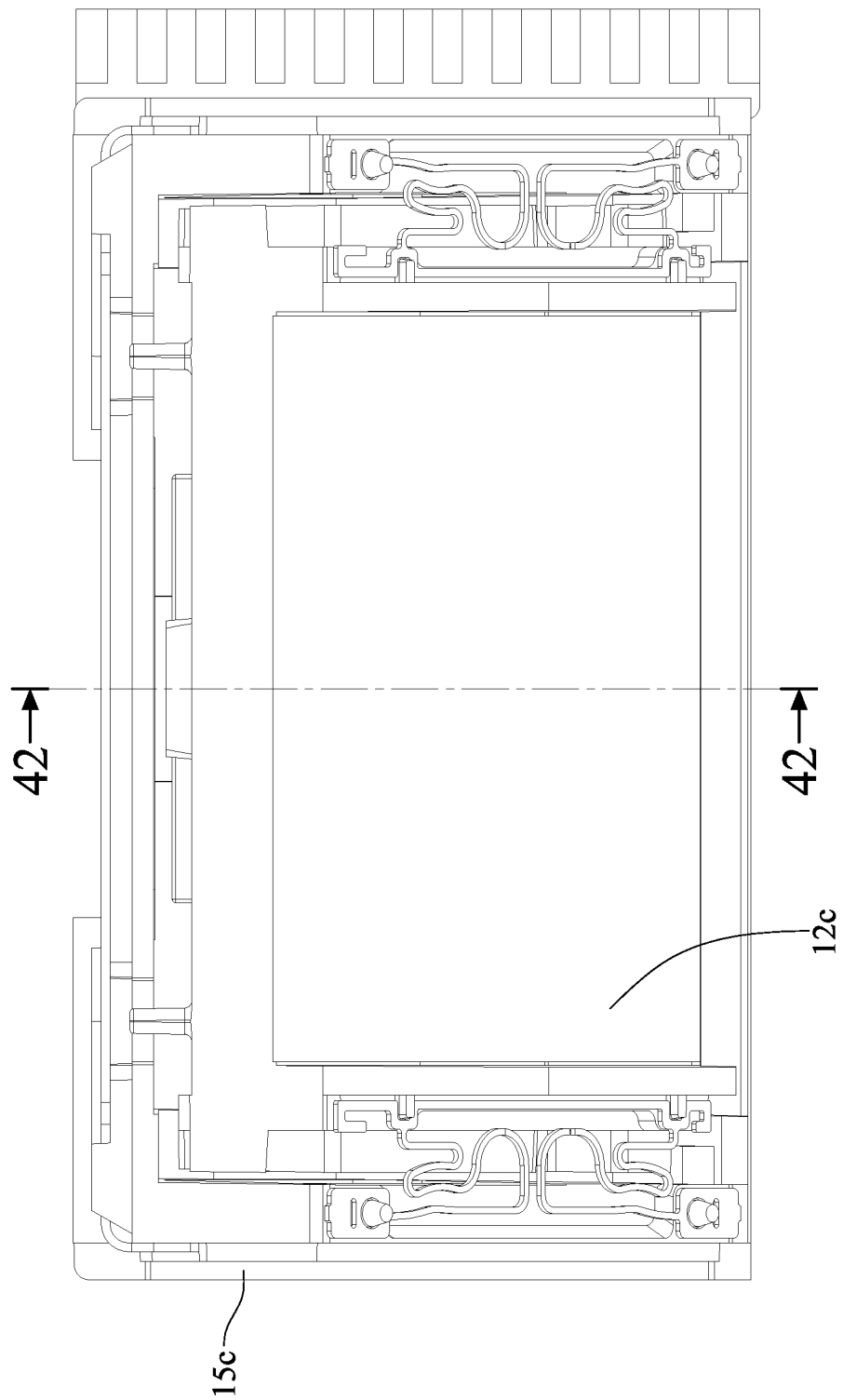
FIG. 41 is a top view of the reflection element and the reflection element driving module in FIG. 34.
Figure 42:
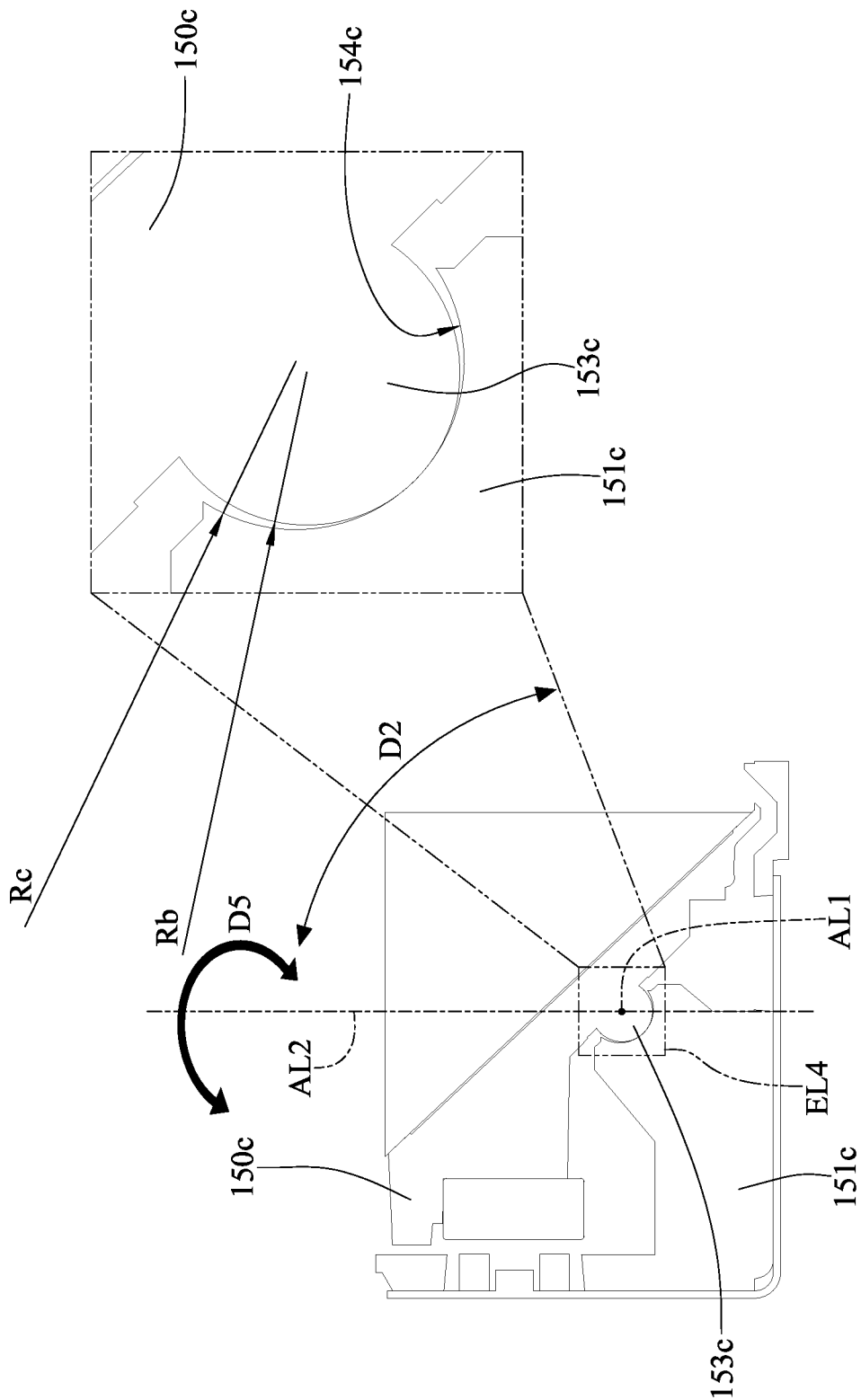
FIG. 42 is a cross-sectional view of the reflection element and the reflection element driving module along line 42-42 in FIG. 41 and an enlarged view of region EL4.

FIG. 34 is a cross-sectional view of a photographing module according to the 3rd embodiment of the present disclosure, FIG. 35 is a schematic view of driving directions of driving modules of the photographing module in FIG. 34, FIG. 36 is an exploded view of the photographing module in FIG. 34, FIG. 37 is another exploded view of the photographing module in FIG. 34, FIG. 38 is a perspective view of a reflection element and a reflection element driving module in FIG. 34, FIG. 39 is an exploded view of the reflection element and the reflection element driving module in FIG. 34, FIG. 40 is another exploded view of the reflection element and the reflection element driving module in FIG. 34, FIG. 41 is a top view of the reflection element and the reflection element driving module in FIG. 34, and FIG. 42 is a cross-sectional view of the reflection element and the reflection element driving module along line 42-42 in FIG. 41 and an enlarged view of region EL4.

In this embodiment, a photographing module 1c includes a lens assembly 11c, a reflection element 12c, an image sensor 13c, a lens element driving module 14c and a reflection element driving module 15c.

The lens assembly 11c includes at least one lens element. The reflection element 12c is a prism and located on an object side of the lens assembly 11c, and the reflection element 12c has a reflection surface 120c configured to redirect an incident light traveling along an incident optical axis IOA towards the lens assembly 11c. The image sensor 13c is disposed on an image surface of the lens assembly 11c, and the image sensor 13c is configured to receive light coming from the lens assembly 11c. As shown in FIG. 34, light traveling along the incident optical axis IOA hits the reflection surface 120c and is reflected by the reflection surface 120c, and the light reflected by the reflection surface 120c changes direction and travels into the lens assembly 11c and passes through the at least one lens element to thereby reach the image sensor 13c.

The lens element driving module 14c includes an upper cover 140c, a fixed base 141c, a lens element holding member 142c, a plurality of rollable connection members 143c, a flexible printed circuit board 144c and an axial voice coil motor 145c.

The upper cover 140c is disposed on the fixed base 141c and together form an accommodation space. The lens element holding member 142c is disposed in the accommodation space, and the lens assembly 11c is disposed on the lens element holding member 142c. The rollable connection members 143c are located between and in physical contact with the fixed base 141c and the lens element holding member 142c, so that the lens element holding member 142c is movable relative to the fixed base 141c. In this embodiment, the rollable connection members 143c are, for example, balls.

The flexible printed circuit board 144c is attached to the fixed base 141c. The axial voice coil motor 145c includes two axial motor coils 1451c and two axial motor magnets 1452c. The axial motor coils 1451c are disposed on the flexible printed circuit board 144c, and the axial motor magnets 1452c are disposed on the lens element holding member 142c. Each of the axial motor coil 1451c and the axial motor magnet 1452c corresponding to each other has an axial motor corresponsive surface, and the axial motor corresponsive surfaces of the corresponding axial motor coil 1451c and axial motor magnet 1452c face each other. The lens element driving module 14c is configured to drive the lens assembly 11c to move in a direction D1 parallel to a lens optical axis LOA of the lens assembly 11c (as shown in FIG. 34 and FIG. 35) by applying a force generated by an electromagnetic interaction between the axial motor coils 1451c and the axial motor magnets 1452c of the axial voice coil motor 145c.

As shown in FIG. 38 to FIG. 41, the reflection element driving module 15c includes a carrier 150c, a holder 151c, a rotating connection part 153c, a curved recess structure 154c, a flexible printed circuit board 155c, a first lateral voice coil motor 156c and two elastic elements 152c.

The reflection element 12c is disposed on the carrier 150c, and the holder 151c and the carrier 150c are disposed corresponding to each other. Furthermore, the carrier 150c is movable relative to the holder 151c.

In detail, the rotating connection part 153c and the curved recess structure 154c are located between the holder 151c and the carrier 150c. The rotating connection part 153c is a spherical protrusion, and the rotating connection part 153c and the carrier 150c are one-piece formed. The curved recess structure 154c is disposed on the holder 151c. The rotating connection part 153c is in physical contact with the curved recess structure 154c, and the curved recess structure 154c is rotatable relative to the rotating connection part 153c, so that the carrier 150c is movable relative to the holder 151c. As shown in FIG. 42, when a curvature radius of the curved recess structure 154c is Rc, and a curvature radius of the rotating connection part 153c is Rb, the following conditions are satisfied: Rc=0.55 mm; Rb=0.5 mm; and Rb/Rc=0.91.

The flexible printed circuit board 155c is disposed on the holder 151c.

The first lateral voice coil motor 156c includes a pitching lateral motor coil 1561c, a pitching lateral motor magnet 1562c, two yawing lateral motor coils 1563c and two yawing lateral motor magnets 1564c. The pitching lateral motor coil 1561c and the yawing lateral motor coils 1563c are disposed on the flexible printed circuit board 155c, and the pitching lateral motor magnet 1562c and the yawing lateral motor magnets 1564c are disposed on the carrier 150c. The carrier 150c can be driven to rotate in a rotation direction D2 around a first axis AL1 (as shown in FIG. 35, FIG. 38 and FIG. 42) by a force generated by an electromagnetic interaction between the pitching lateral motor coil 1561c and the pitching lateral motor magnet 1562c of the first lateral voice coil motor 156c, and the carrier 150c can also be driven to rotate in a rotation direction D5 around a second axis AL2 (as shown in FIG. 35, FIG. 38 and FIG. 42) by a force generated by an electromagnetic interaction between the yawing lateral motor coils 1563c and the yawing lateral motor magnets 1564c of the first lateral voice coil motor 156c. The first axis AL1 and the second axis AL2 pass through the rotating connection part 153c, the first axis AL1 is orthogonal to the incident optical axis IOA and orthogonal to the lens optical axis LOA, and the second axis AL2 is parallel to the incident optical axis IOA.

Each of the pitching lateral motor coil 1561c and the pitching lateral motor magnet 1562c has a pitching lateral motor corresponsive surface, and the two pitching lateral motor corresponsive surfaces face each other. Each of the yawing lateral motor coil 1563c and the yawing lateral motor magnet 1564c corresponding to each other has a yawing lateral motor corresponsive surface, and the yawing lateral motor corresponsive surfaces of the corresponding yawing lateral motor coil 1563c and yawing lateral motor magnet 1564c face each other. In this embodiment, the axial motor corresponsive surfaces, the pitching lateral motor corresponsive surfaces and the yawing lateral motor corresponsive surfaces are parallel to the incident optical axis IOA.

The elastic elements 152c are connected to the holder 151c and the carrier 150c, and the elastic elements 152c exert a preload force on the carrier 150c in a direction towards the holder 151c, so that the carrier 150c can remain stable when the carrier 150c is not driven.

In this embodiment, the photographing module 1c includes the reflection element driving module 15c but not include an image sensor driving module, and two-axis image stabilization can be provided by the reflection element driving module 15c, so that the thickness of the photographing module 1c can be reduced.

4th Embodiment

Figure 43:
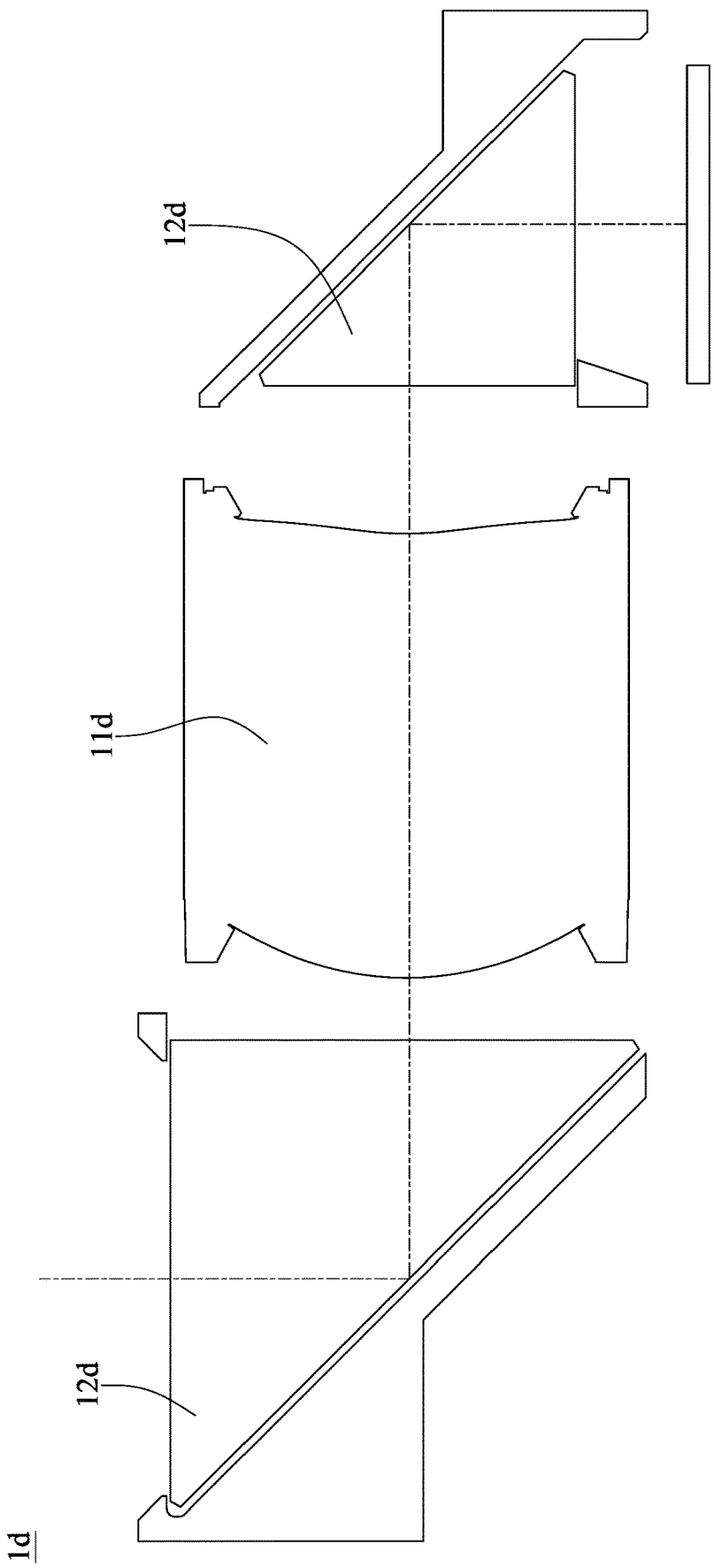
FIG. 43 is a cross-sectional view of a photographing module according to the 4th embodiment of the present disclosure.

Please refer to FIG. 43, which is a cross-sectional view of a photographing module according to the 4th embodiment of the present disclosure.

In this embodiment, a photographing module 1d is provided. The photographing module 1d has a configuration similar to that of the photographing module 1 as disclosed in the 1st embodiment, and they are different from each other in that in this embodiment, the photographing module 1d includes two reflection elements 12d, and the reflection elements 12d are prisms and respectively disposed on an object side and an image side of the assembly 11d, so that light changes direction multiple times in the photographing module 1d so as to be applicable to various optical systems of different requirements.

The present disclosure is not limited to the numbers of reflection element in the embodiments as described above. In other examples, a photographing module may include more than two reflection elements.

5th Embodiment

Figure 44:
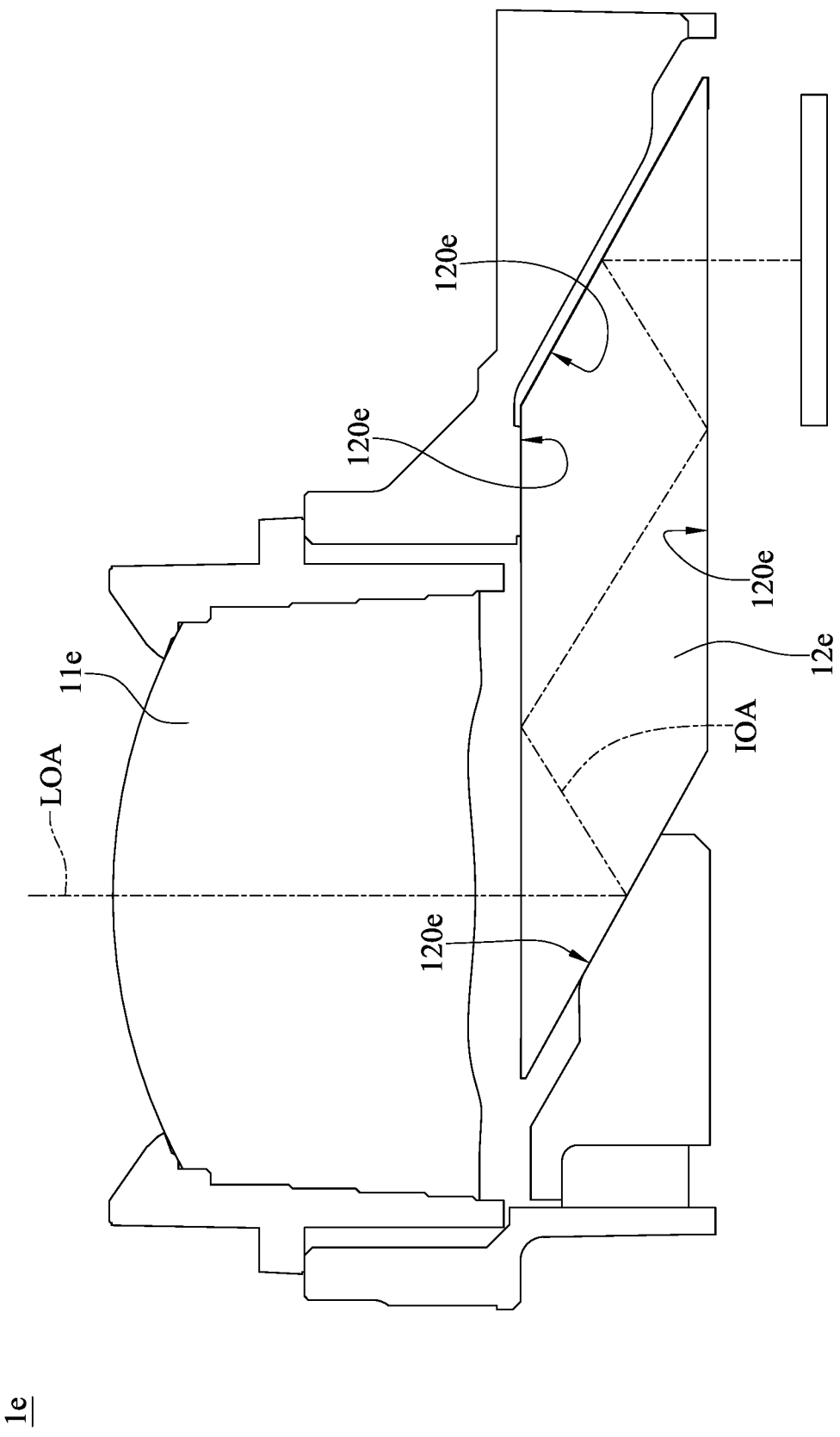
FIG. 44 is a cross-sectional view of a photographing module according to the 5th embodiment of the present disclosure.

Please refer to FIG. 44, which is a cross-sectional view of a photographing module according to the 5th embodiment of the present disclosure.

In this embodiment, a photographing module 1e is provided. The photographing module 1e has a configuration similar to that of the photographing module 1 as disclosed in the 1st embodiment, and they are different from each other in that in this embodiment, a reflection element 12e of the photographing module 1e is disposed on an image side of the lens assembly 11e, so that light traveling along a lens optical axis LOA of the lens assembly 11e and passing through the lens element(s) enters the reflection element 12e, hits and is reflected by a reflection surface 120e, and then changes direction to travel along an incident optical axis IOA. Moreover, in this embodiment, the reflection element 12e has several reflection surfaces 120e, so that light changes direction multiple times in the reflection element 12e, and thus, the photographing module 1e is applicable to various optical systems of different requirements.

According to the present disclosure, a single reflection element may have one or more reflection surfaces, and the present disclosure is not limited thereto.

6th Embodiment

Figure 45:
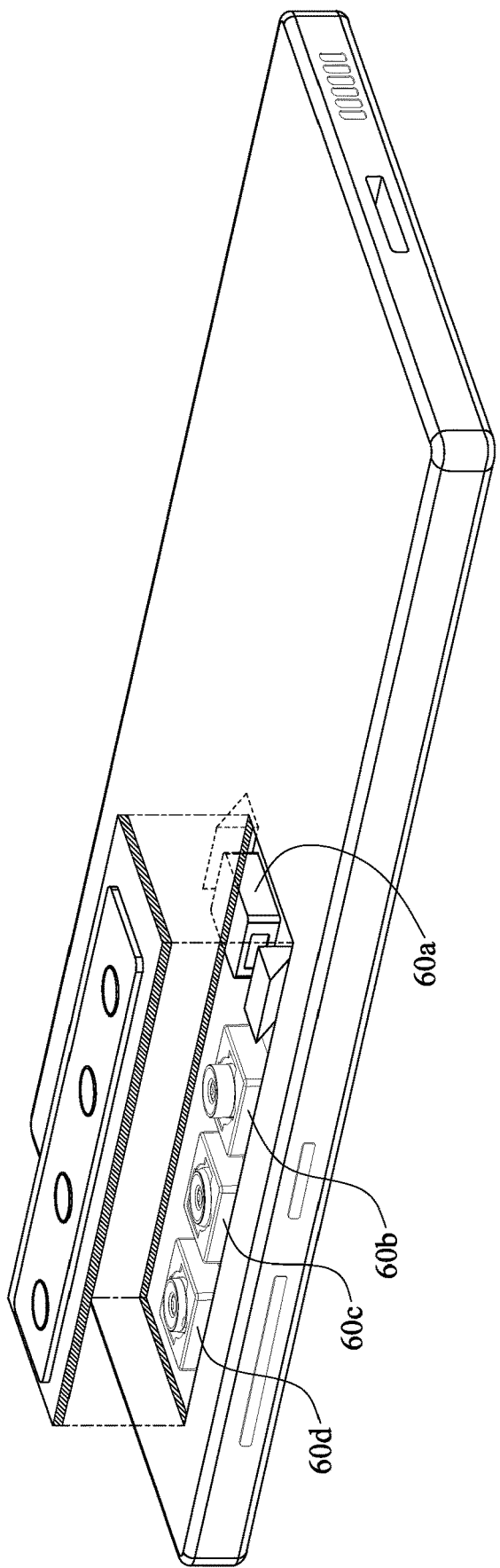
FIG. 45 is an exploded view of an electronic device according to the 6th embodiment of the present disclosure.

Please refer to FIG. 45, which is an exploded view of an electronic device according to the 6th embodiment of the present disclosure.

In this embodiment, an electronic device 6 is a smartphone including an image capturing unit 60a, an image capturing unit 60b, an image capturing unit 60c, an image capturing unit 60d, a flash module, an image signal processor, a display module and an image software processor (not shown). The image capturing unit 60a, the image capturing unit 60b, the image capturing unit 60c and the image capturing unit 60d are disposed on the same side of the electronic device 6, and the display module is disposed on the opposite side of the electronic device 6. The image capturing unit 60a is the photographing module 1d as disclosed in the 4th embodiment, but the present disclosure is not limited thereto. The image capturing unit 60a may be one of the photographing modules as disclosed in the above embodiments of the present disclosure.

The image capturing unit 60a is an ultra-long-focus telephoto camera, the image capturing unit 60b is a long-focus telephoto camera, the image capturing unit 60c is a wide-angle main camera, and the image capturing unit 60d is an ultra-wide-angle camera. The maximum field of view of the image capturing unit 60a ranges, for example, between 5 degrees and 30 degrees, the maximum field of view of the image capturing unit 60b ranges, for example, between 30 degrees and 60 degrees, the maximum field of view of the image capturing unit 60c ranges, for example, between 65 degrees and 90 degrees, and the maximum field of view of the image capturing unit 60d ranges, for example, between 93 degrees and 175 degrees. In this embodiment, the image capturing unit 60a, the image capturing unit 60b, the image capturing unit 60c and the image capturing unit 60d have different fields of view, such that the electronic device 6 can have various magnification ratios so as to meet the requirement of optical zoom functionality. In addition, the image capturing unit 60a is an ultra-long-focus telephoto camera having a light-folding element configuration, such that it is favorable for the miniaturization of the electronic device 6. In this embodiment, the electronic device 6 includes multiple image capturing units 60a, 60b, 60c and 60d, but the present disclosure is not limited to the number and arrangement of image capturing unit. When a user captures images of an object, the light rays converge in the image capturing unit 60a, the image capturing unit 60b, the image capturing unit 60c or the image capturing unit 60d to generate an image(s), and the flash module is activated for light supplement. The focus assist module detects the object distance of the imaged object to achieve fast auto focusing. The image signal processor is configured to optimize the captured image to improve image quality and provided zooming function. The light beam emitted from the focus assist module can be either conventional infrared or laser. The display module can be a touch screen or a physical button. The user is able to interact with the display module and the image software processor having multiple functions to capture images and complete image processing. The image processed by the image software processor can be displayed on the display module.

Note that the camera cover plate being separated from the main body of the device shown in FIG. 45 is only for the convenience of showing the camera modules inside the electronic device 6, which does not necessary indicate that the camera cover plate is detachable from the main body, and the present disclosure is not limited thereto.

7th Embodiment

Figure 46:
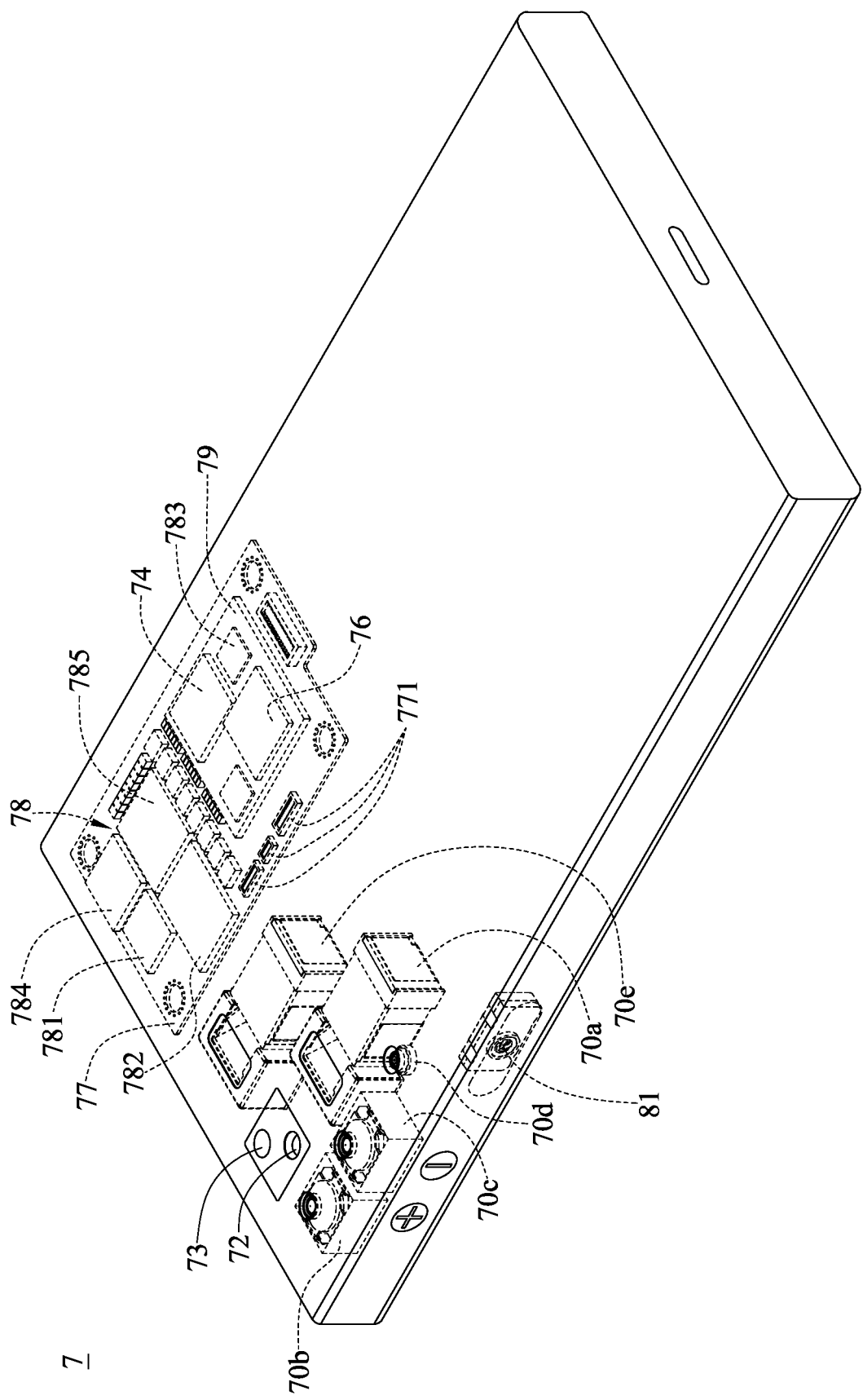
FIG. 46 is one perspective view of an electronic device according to the 7th embodiment of the present disclosure.
Figure 47:
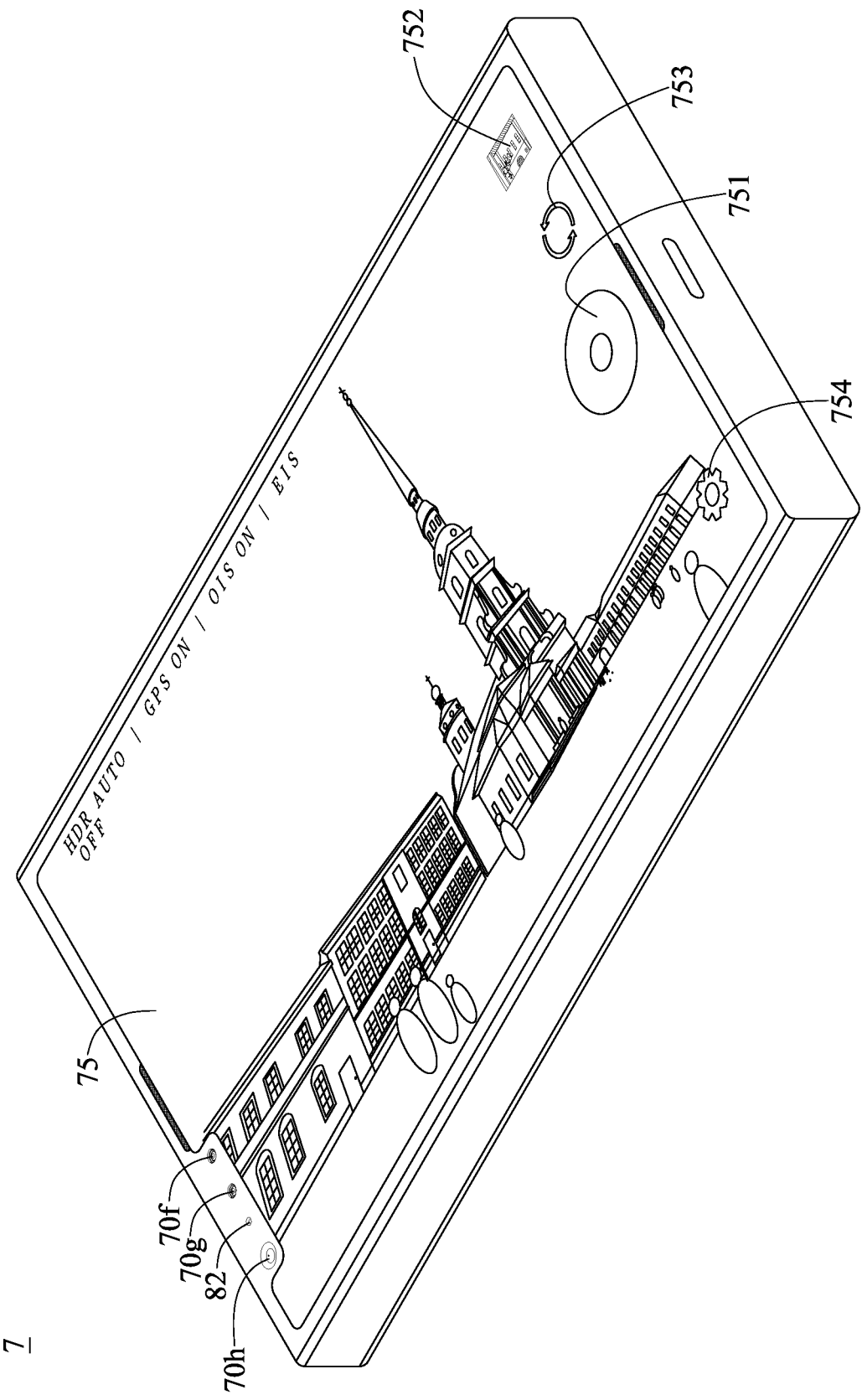
FIG. 47 is another perspective view of the electronic device in FIG. 46.
Figure 48:
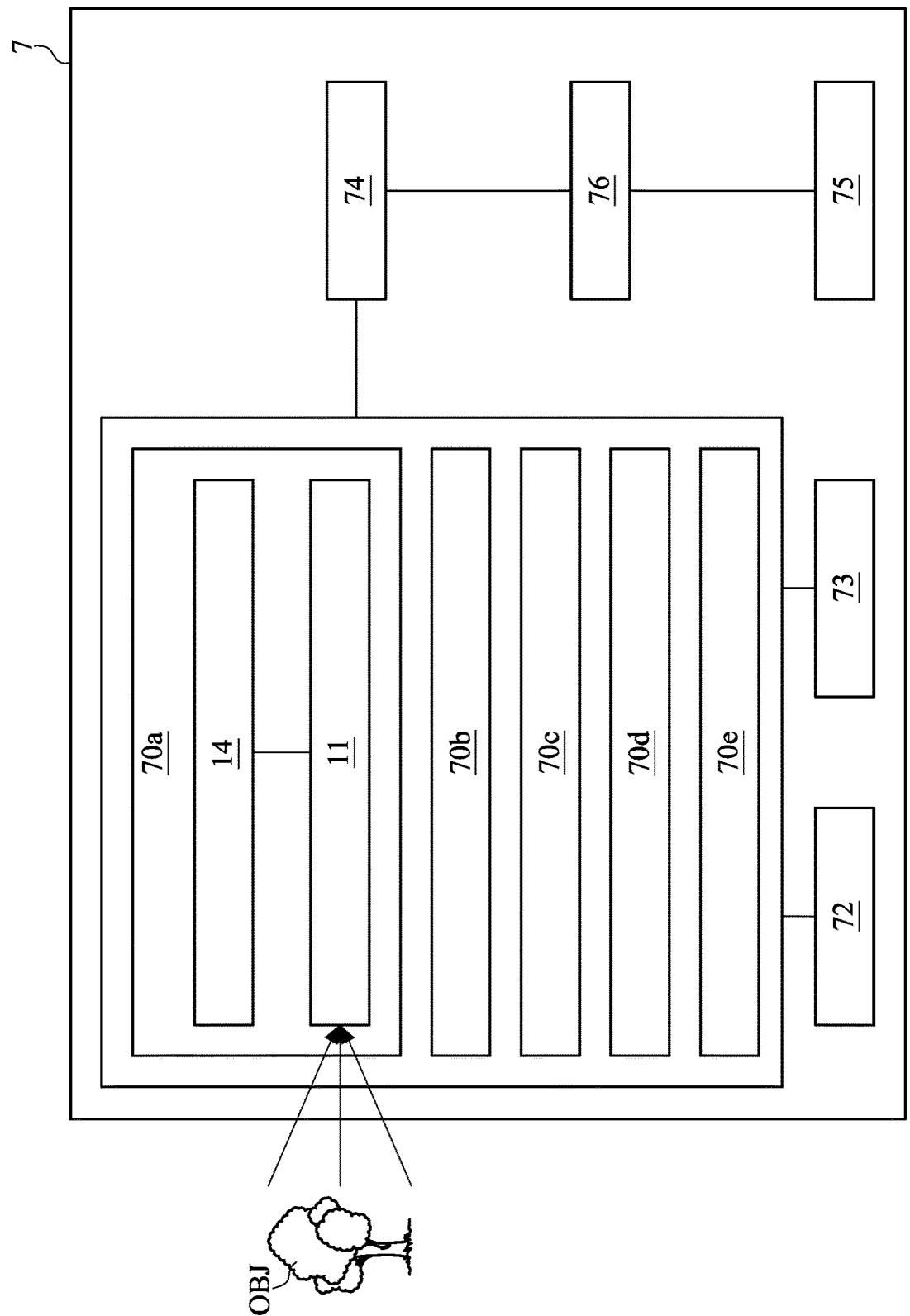
FIG. 48 is a block diagram of the electronic device in FIG. 46.

Please refer to FIG. 46 to FIG. 48. FIG. 46 is one perspective view of an electronic device according to the 7th embodiment of the present disclosure, FIG. 47 is another perspective view of the electronic device in FIG. 46, and FIG. 48 is a block diagram of the electronic device in FIG. 46.

In this embodiment, an electronic device 7 is a mobile device such as a computer, a smartphone, a smart wearable device, a camera drone, a driving recorder and displayer, and the present disclosure is not limited thereto. The electronic device 7 includes an image capturing unit 70a, an image capturing unit 70b, an image capturing unit 70c, an image capturing unit 70d, an image capturing unit 70e, an image capturing unit 70f, an image capturing unit 70g, an image capturing unit 70h, a flash module 72, a focus assist module 73, an image signal processor 74, a display module 75, an image software processor 76 and a biometric identification device 81. In addition, the image capturing unit 70a is the photographing module 1 as disclosed in the 1st embodiment and the image capturing unit 70e is the photographing module 1b as disclosed in the 2nd embodiment, but the present disclosure is not limited thereto. Each of the image capturing units 70a and 70e may be one of the photographing modules as disclosed in the above embodiments of the present disclosure. In addition, each of the image capturing unit 70b, the image capturing unit 70c, the image capturing unit 70d, the image capturing unit 70f, the image capturing unit 70g and the image capturing unit 70h may be the photographing module of the present disclosure.

The image capturing unit 70a, the image capturing unit 70b, the image capturing unit 70c, the image capturing unit 70d and the image capturing unit 70e are disposed on the same side of the electronic device 7. The image capturing unit 70f, the image capturing unit 70g, the image capturing unit 70h and the display module 75 are disposed on the opposite side of the electronic device 7. The display module 75 can be a user interface, such that the image capturing unit 70f and the image capturing unit 70g can be front-facing cameras of the electronic device 7 for taking selfies, but the present disclosure is not limited thereto.

Figure 49:
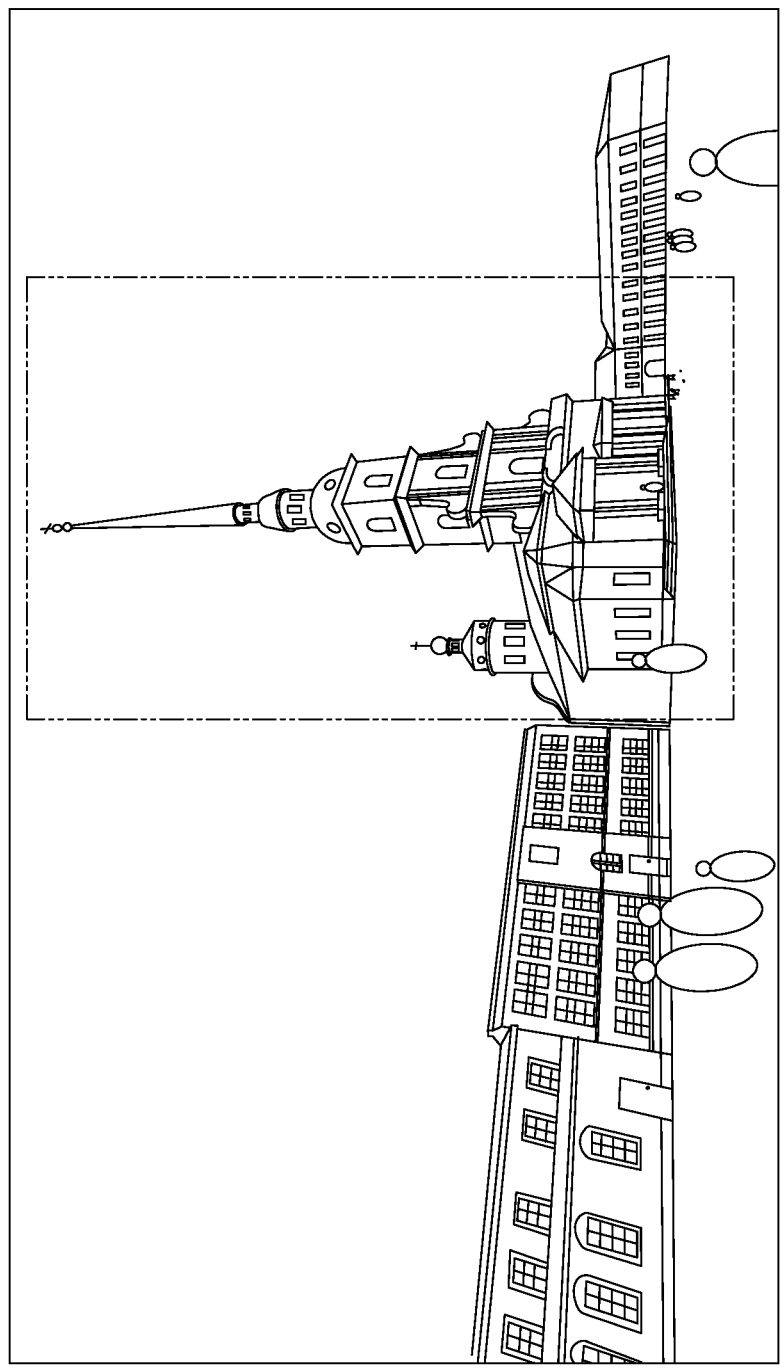
FIG. 49 shows an image captured by the electronic device in FIG. 46 with an equivalent focal length ranging between 11 mm and 14 mm.
Figure 50:
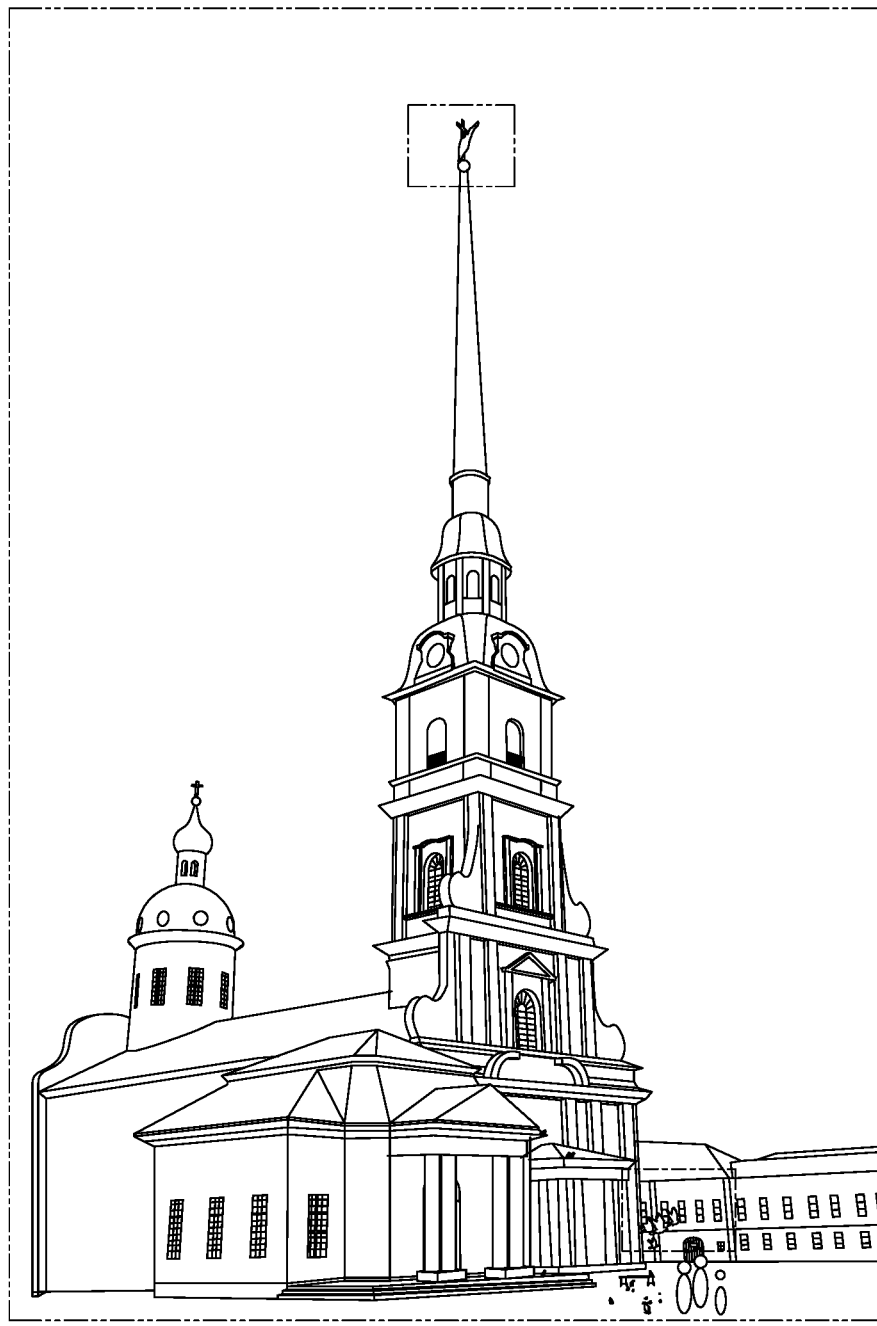
FIG. 50 shows an image captured by the electronic device in FIG. 46 with an equivalent focal length ranging between 22 mm and 30 mm.
Figure 51:
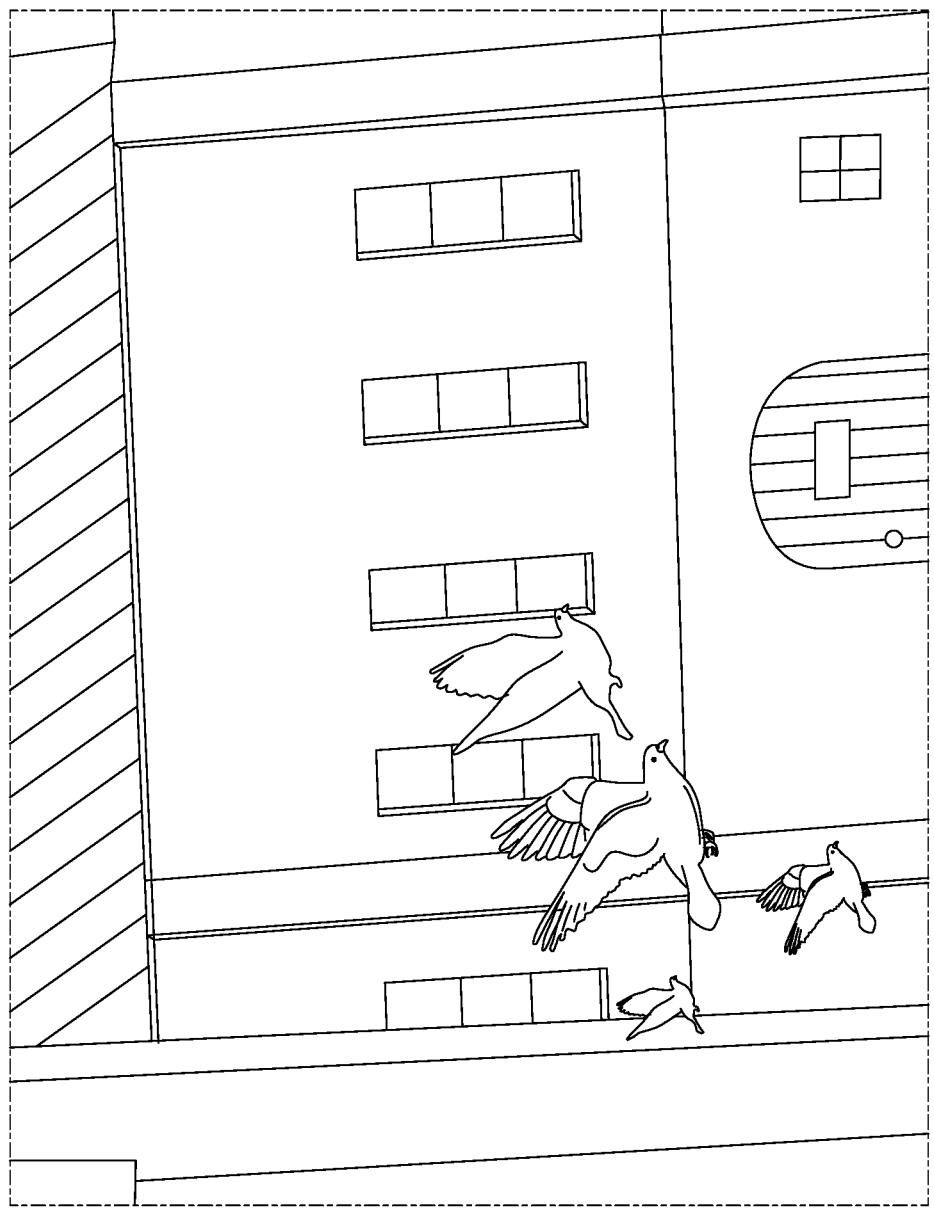
FIG. 51 shows an image captured by the electronic device in FIG. 46 with an equivalent focal length ranging between 60 mm and 300 mm.
Figure 52:
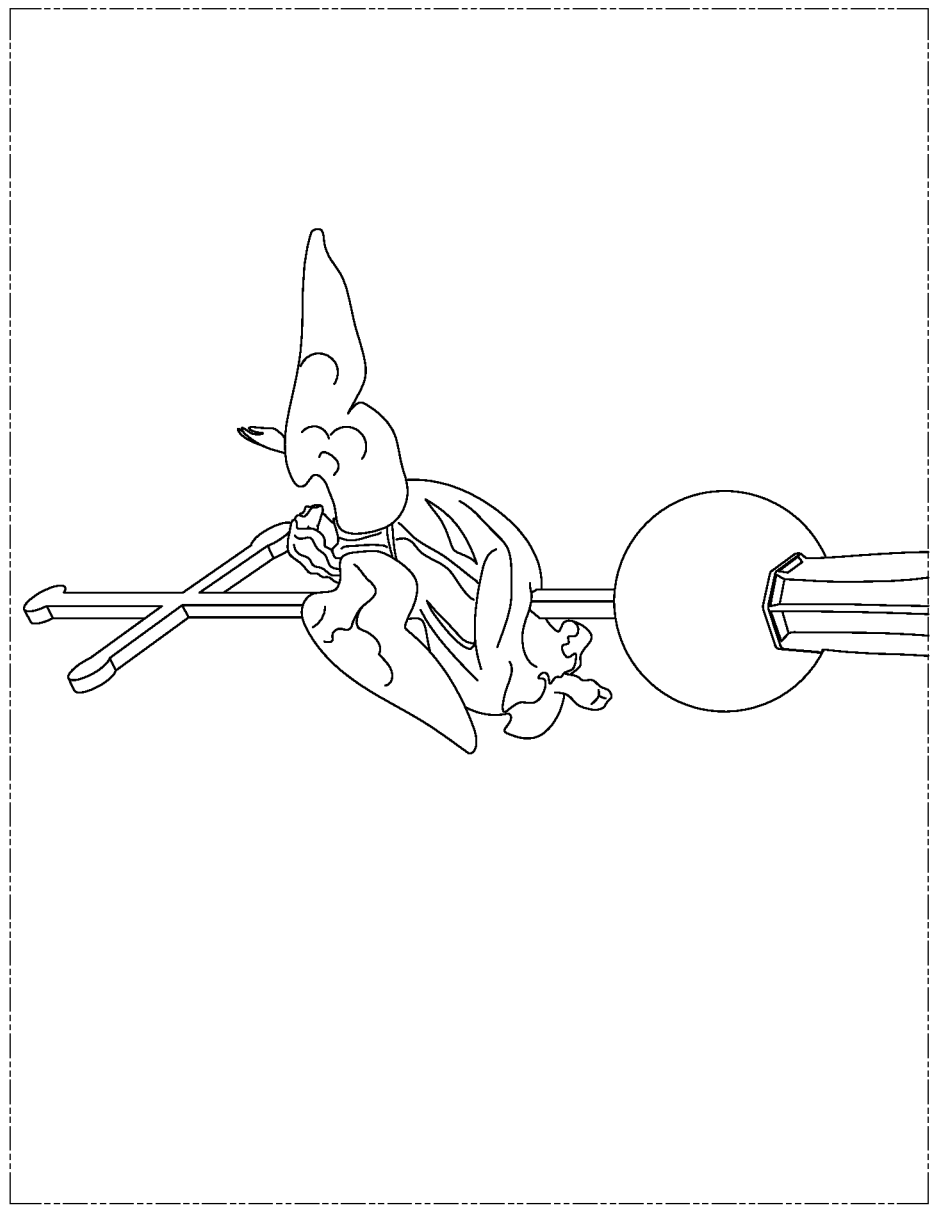
FIG. 52 shows an image captured by the electronic device in FIG. 46 with an equivalent focal length ranging between 400 mm and 600 mm.

In this embodiment, the image capturing unit 70a is an ultra-long-focus telephoto camera, the image capturing unit 70b is a wide-angle image capturing unit, the image capturing unit 70c is an ultra-wide-angle image capturing unit, the image capturing unit 70d is a macro-photo image capturing unit, the image capturing unit 70e is a zoom-telephoto image capturing unit, the image capturing unit 70f is a ultra-wide-angle image capturing unit, the image capturing unit 70g is a wide-angle image capturing unit, and the image capturing unit 70h is a ToF (time of flight) image capturing unit. In this embodiment, the image capturing unit 70a, the image capturing unit 70b, the image capturing unit 70c, the image capturing unit 70d and the image capturing unit 70e have different fields of view, such that the electronic device 7 can have various magnification ratios so as to meet the requirement of optical zoom functionality. For example, the ultra-wide-angle image capturing unit 70c or 70f with the maximum field of view ranging between 105 degrees and 125 degrees can achieve an image with an equivalent focal length between 11 mm and 14 mm. In this case, the image captured by the ultra-wide-angle image capturing unit 70c or 70f can refer to FIG. 49, which shows an image captured by the electronic device 7 with an equivalent focal length ranging between 11 mm and 14 mm, and the captured image as shown in FIG. 49 includes the whole cathedral, surrounding buildings and people on the square. The captured image as shown in FIG. 49 has a relatively large field of view and depth of view, but it often has a relatively large degree of distortion. The wide-angle image capturing unit 70b or 70g with the maximum field of view ranging between 70 degrees and 90 degrees can achieve an image with an equivalent focal length between 22 mm and 30 mm. In this case, the image captured by the wide-angle image capturing unit 70b or 70g can refer to FIG. 50, which shows an image captured by the electronic device 7 with an equivalent focal length ranging between 22 mm and 30 mm, and the captured image as shown in FIG. 50 includes the whole cathedral and people in front of the cathedral. The zoom-telephoto image capturing unit 70e with the maximum field of view ranging between 10 degrees and 40 degrees can achieve an image with an equivalent focal length between 60 mm and 300 mm, and the zoom-telephoto image capturing unit 70e can be regarded as able to provide 5× magnification. In this case, the image captured by the zoom-telephoto image capturing unit 70e can refer to FIG. 51, which shows an image captured by the electronic device 7 with an equivalent focal length ranging between 60 mm and 300 mm, and the captured image as shown in FIG. 51 includes the birds flying in front of the cathedral. The captured image as shown in FIG. 51 has a relatively small field of view and depth of view, and the zoom-telephoto image capturing unit 70e can be used for shooting moving targets. For this, the axial voice coil motor of the lens element driving module can drive the lens element holding member and thus move the lens assembly to quickly and continuously autofocus on the target, such that the captured image of the target would not be blurred due to long focusing distance. When imaging, the zoom-telephoto image capturing unit 70e can further perform optical zoom for imaged objects so as to obtain more clear images. Said magnification ratio of one image capturing unit is defined as a ratio of the maximum focal length to the minimum focal length of the image capturing unit. For instance, the magnification ratio of the zoom-telephoto image capturing unit 70e is 5× magnification. The ultra-long-focus telephoto camera 70a with the maximum field of view ranging between 4 degrees and 8 degrees can achieve an image with an equivalent focal length between 400 mm and 600 mm. In this case, the image captured by the ultra-long-focus telephoto camera 70a can refer to FIG. 52, which shows an image captured by the electronic device 7 with an equivalent focal length ranging between 400 mm and 600 mm, and the captured image as shown in FIG. 52 includes the angel-and-cross-topped spire of the cathedral. The captured image as shown in FIG. 52 has a smaller field of view and depth of view, and the lens assembly 11 of the image captured by the ultra-long-focus telephoto camera 70a may be easier to capture an out of focus image due to slight camera shake. For this, the lens element driving module 14 can provide a feedback force to correct the shake so as to achieve optical image stabilization while providing a force to drive the lens assembly 11 of the ultra-long-focus telephoto camera 70a to focus on a target. In addition, the image capturing unit 70h can determine depth information of the imaged object. In this embodiment, the electronic device 7 includes multiple image capturing units 70a, 70b, 70c, 70d, 70e, 70f, 70g, and 70h, but the present disclosure is not limited to the number and arrangement of image capturing units. The equivalent focal lengths to which the abovementioned image capturing units correspond are estimated values based on particular conversion functions, and the estimated values may be different from actual focal lengths of the image capturing units due to designs of the lens assemblies and sizes of the image sensors.

When a user captures images of an object OBJ, light rays converge in the image capturing unit 70a, the image capturing unit 70b, the image capturing unit 70c, the image capturing unit 70d or the image capturing unit 70e to generate images, and the flash module 72 is activated for light supplement. The focus assist module 73 detects the object distance of the imaged object OBJ to achieve fast auto focusing. The image signal processor 74 is configured to optimize the captured image to improve image quality. The light beam emitted from the focus assist module 73 can be either conventional infrared or laser.

In addition, the light rays may converge in the image capturing unit 70f, 70g or 70h to generate images. The electronic device 7 can include a reminder light 82 that can be illuminated to remind the user that the image capturing unit 70f, 70g or 70h of the electronic device 7 is working. The display module 75 can be a touch screen or a physical button 751. The user is able to interact with the display module 75 and the image software processor 76 having multiple functions to capture images and complete image processing. The image processed by the image software processor 76 can be displayed on the display module 75. The user can replay the previously captured image through an image playback button 752 of the display module 75, can choose a suitable image capturing unit for shooting through an image capturing units switching button 753 of the display module 75, and can properly adjust shooting parameters according to current shooting situations through an integrated menu button 754 of the display module 75.

Further, the electronic device 7 further includes a circuit board 77 and a plurality of electronic components 78 disposed on the circuit board 77. The image capturing units 70a, 70b, 70c, 70d, 70e, 70f, 70g, and 70h are electrically connected to the electronic components 78 via connectors 771 on the circuit board 77. The electronic components 78 can include a signal emitting module 781 and can transmit image(s) to other electronic device or a cloud storage via the signal emitting module 781. The signal emitting module 781 can be a wireless fidelity (WiFi) module, a Bluetooth module, an infrared module, a network service module or an integrated module for transmitting various signals mentioned above, and the present disclosure is not limited thereto.

The electronic components 78 can also include a storage unit 782, a random access memory 783 for storing image information, a gyroscope 784, and a position locator 785 for facilitating the navigation or positioning of the electronic device 7. In this embodiment, the image signal processor 74, the image software processor 76 and the random access memory 783 are integrated into a single chip system 79, but the present disclosure is not limited thereto. In some other embodiments, the electronic components can also be integrated in the image capturing unit or can also be disposed on one of the circuit boards. In addition, the user can use the biometric identification device 81 to turn on and unlock the electronic device 7.

The smartphone in this embodiment is only exemplary for showing the photographing module of the present disclosure installed in an electronic device, and the present disclosure is not limited thereto. The photographing module can be optionally applied to optical systems with a movable focus. Furthermore, the photographing module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing module comprising:
a lens assembly comprising at least one lens element;
a reflection element located on an object side of the lens assembly, wherein the reflection element has a reflection surface, and the reflection surface is configured to redirect an incident light traveling along an incident optical axis towards the lens assembly;
an image sensor disposed on an image surface of the lens assembly, wherein the image sensor is configured to receive light coming from the lens assembly;
a lens element driving module comprising an axial voice coil motor, wherein the lens element driving module drives the lens assembly to move along a lens optical axis of the lens assembly by the axial voice coil motor;
a reflection element driving module comprising:
a carrier, wherein the reflection element is disposed on the carrier;
a holder disposed corresponding to the carrier, wherein the carrier is movable relative to the holder;
a rotating connection part located between the holder and the carrier, wherein the rotating connection part is disposed on one of the holder and the carrier;
a curved recess structure located between the holder and the carrier, wherein the curved recess structure is disposed on another one of the holder and the carrier, the rotating connection part is in physical contact with the curved recess structure, and the curved recess structure is rotatable relative to the rotating connection part; and
a first lateral voice coil motor configured to drive the carrier to rotate around a first axis, wherein the first axis passes through the rotating connection part; and
an image sensor driving module comprising:
a fixed member;
a movable plate, wherein the image sensor is disposed on the movable plate, the movable plate has a degree of freedom and is movable relative to the fixed member, the degree of freedom is defined by a first dynamic axis, and the first dynamic axis is orthogonal to the lens optical axis;
a plurality of rollable elements located between and in physical contact with the fixed member and the movable plate; and
a second lateral voice coil motor configured to drive the movable plate to move so that the image sensor can be moved in directions based on the first dynamic axis.

2. The photographing module of claim 1, wherein the axial voice coil motor comprises an axial motor coil and an axial motor magnet, each of the axial motor coil and the axial motor magnet has an axial motor corresponsive surface, the two axial motor corresponsive surfaces face each other, the second lateral voice coil motor of the image sensor driving module comprises a second lateral motor coil and a second lateral motor magnet, each of the second lateral motor coil and the second lateral motor magnet has a second lateral motor corresponsive surface, and the two second lateral motor corresponsive surfaces face each other;
wherein the axial motor corresponsive surfaces and the second lateral motor corresponsive surfaces are parallel to the incident optical axis.

3. The photographing module of claim 2, wherein the lens element driving module further comprises:
a fixed base;
a lens element holding member, wherein the lens assembly is disposed on the lens element holding member, and the lens element holding member is movable relative to the fixed base; and
a plurality of rollable connection members located between and in physical contact with the fixed base and the lens element holding member.

4. The photographing module of claim 3, wherein the axial motor magnet is disposed on the lens element holding member.

5. The photographing module of claim 1, wherein the first axis is orthogonal to the incident optical axis, and the first axis is orthogonal to the lens optical axis.

6. The photographing module of claim 5, wherein the reflection element driving module further comprises an elastic element, the elastic element is connected to the holder and the carrier, the elastic element exerts a preload force on the carrier, and a direction of the preload force is towards the holder.

7. The photographing module of claim 1, wherein a curvature radius of the curved recess structure is Rc, a curvature radius of the rotating connection part is Rb, and the following condition is satisfied:

$$0.7 \leq Rb/Rc \leq 1.$$

8. The photographing module of claim 1, wherein the first dynamic axis is orthogonal to the incident optical axis.

9. The photographing module of claim 1, wherein the first dynamic axis is parallel to the incident optical axis.

10. The photographing module of claim 1, wherein the image sensor driving module further comprises a flexible printed circuit board, the flexible printed circuit board is connected to the movable plate and the fixed member, and the flexible printed circuit board generates a force acting on the movable plate after the movable plate is driven to move.

11. The photographing module of claim 10, wherein the flexible printed circuit board comprises an elastic adjustment structure.

12. The photographing module of claim 1, wherein the reflection element further has another reflection surface, or the photographing module further comprises another reflection element located on the object side or an image side of the lens assembly, so that light changes directions at least twice in the photographing module.

13. An electronic device comprising:
the photographing module of claim 1.

14. A photographing module comprising:
a lens assembly comprising at least one lens element;
a reflection element located on an object side of the lens assembly, wherein the reflection element has a reflection surface, and the reflection surface is configured to redirect an incident light traveling along an incident optical axis towards the lens assembly;
an image sensor disposed on an image surface of the lens assembly, wherein the image sensor is configured to receive light coming from the lens assembly;
a lens element driving module comprising an axial voice coil motor, wherein the lens element driving module drives the lens assembly to move along a lens optical axis of the lens assembly by the axial voice coil motor; and a reflection element driving module comprising:
   a carrier, wherein the reflection element is disposed on the carrier;
   a holder disposed corresponding to the carrier, wherein the carrier is movable relative to the holder;
   a rotating connection part located between the holder and the carrier, wherein the rotating connection part is disposed on one of the holder and the carrier;
   a curved recess structure located between the holder and the carrier, wherein the curved recess structure is disposed on another one of the holder and the carrier, the rotating connection part is in physical contact with the curved recess structure, and the curved recess structure is rotatable relative to the rotating connection part; and
   a lateral voice coil motor configured to drive the carrier to rotate around a first axis and rotate around a second axis, wherein the first axis is orthogonal to the incident optical axis, the first axis is orthogonal to the lens optical axis, the second axis is parallel to the incident optical axis, and both of the first axis and the second axis pass through the rotating connection part;

wherein a curvature radius of the curved recess structure is Rc, a curvature radius of the rotating connection part is Rb, and the following condition is satisfied:

$$0.7 \leq Rb/Rc \leq 1.$$

15. The photographing module of claim 14, wherein the curvature radius of the curved recess structure is Rc, the curvature radius of the rotating connection part is Rb, and the following condition is satisfied:

$$0.85 \leq Rb/Rc \leq 1.$$

16. The photographing module of claim 14, wherein the axial voice coil motor comprises an axial motor coil and an axial motor magnet, each of the axial motor coil and the axial motor magnet has an axial motor corresponsive surface, the two axial motor corresponsive surfaces face each other, the lateral voice coil motor of the reflection element driving module comprises a lateral motor coil and a lateral motor magnet, each of the lateral motor coil and the lateral motor magnet has a lateral motor corresponsive surface, and the two lateral motor corresponsive surfaces face each other;
   wherein the axial motor corresponsive surfaces and the lateral motor corresponsive surfaces are parallel to the incident optical axis.

17. The photographing module of claim 16, wherein the lens element driving module further comprises:
   a fixed base;
   a lens element holding member, wherein the lens assembly is disposed on the lens element holding member, and the lens element holding member is movable relative to the fixed base; and
   a plurality of rollable connection members located between and in physical contact with the fixed base and the lens element holding member.

18. The photographing module of claim 17, wherein the axial motor magnet is disposed on the lens element holding member.

19. The photographing module of claim 14, wherein the reflection element further has another reflection surface, or the photographing module further comprises another reflection element located on the object side or an image side of the lens assembly, so that light changes directions at least twice in the photographing module.

20. A photographing module comprising:
   a lens assembly comprising at least one lens element;
   a reflection element located on an object side of the lens assembly, wherein the reflection element has a reflection surface, and the reflection surface is configured to redirect an incident light traveling along an incident optical axis towards the lens assembly;
   an image sensor disposed on an image surface of the lens assembly, wherein the image sensor is configured to receive light coming from the lens assembly;
   a lens element driving module comprising an axial voice coil motor, wherein the lens element driving module drives the lens assembly to move along a lens optical axis of the lens assembly by the axial voice coil motor, the axial voice coil motor comprises an axial motor coil and an axial motor magnet, each of the axial motor coil and the axial motor magnet has an axial motor corresponsive surface, and the two axial motor corresponsive surfaces face each other; and
   an image sensor driving module comprising:
      a fixed member;
      a movable plate, wherein the image sensor is disposed on the movable plate, the movable plate has a degree of freedom and is movable relative to the fixed member, the degree of freedom is defined by a first dynamic axis, and the first dynamic axis is orthogonal to the lens optical axis;
      a plurality of rollable elements located between and in physical contact with the fixed member and the movable plate; and
      a lateral voice coil motor configured to drive the movable plate to move so that the image sensor can be moved in directions based on the first dynamic axis, wherein the lateral voice coil motor comprises a lateral motor coil and a lateral motor magnet, each of the lateral motor coil and the lateral motor magnet has a lateral motor corresponsive surface, and the two lateral motor corresponsive surfaces face each other;
   wherein the axial motor corresponsive surfaces and the lateral motor corresponsive surfaces are parallel to the incident optical axis.

21. The photographing module of claim 20, wherein the movable plate of the image sensor driving module further has another degree of freedom, the another degree of freedom is defined by a second dynamic axis, and the first dynamic axis, the second dynamic axis and the lens optical axis are orthogonal to one another.

22. The photographing module of claim 20, wherein the image sensor driving module further comprises a flexible printed circuit board, the flexible printed circuit board is connected to the movable plate and the fixed member, and the flexible printed circuit board generates a force acting on the movable plate after the movable plate is driven to move.

23. The photographing module of claim 22, wherein the flexible printed circuit board comprises an elastic adjustment structure.

24. The photographing module of claim 20, wherein the lens element driving module further comprises:
   a fixed base;
   a lens element holding member, wherein the lens assembly is disposed on the lens element holding member, and the lens element holding member is movable relative to the fixed base; and a plurality of rollable connection members located between and in physical contact with the fixed base and the lens element holding member.

25. The photographing module of claim 24, wherein the axial motor magnet is disposed on the lens element holding member.

26. The photographing module of claim 20, wherein the reflection element further has another reflection surface, or the photographing module further comprises another reflection element located on the object side or an image side of the lens assembly, so that light changes directions at least twice in the photographing module.

27. An electronic device comprising:
the photographing module of claim 20.

* * * * *